US006381559B1

(12) United States Patent
Huang

(10) Patent No.: US 6,381,559 B1
(45) Date of Patent: Apr. 30, 2002

(54) EMPIRICAL MODE DECOMPOSITION APPARATUS, METHOD AND ARTICLE OF MANUFACTURE FOR ANALYZING BIOLOGICAL SIGNALS AND PERFORMING CURVE FITTING

(75) Inventor: Norden E. Huang, Bethesda, MD (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 09/282,424

(22) Filed: Mar. 31, 1999

Related U.S. Application Data

(63) Continuation-in-part of application No. 08/872,586, filed on Jun. 10, 1997, now Pat. No. 5,983,162.
(60) Provisional application No. 60/023,411, filed on Aug. 14, 1996, and provisional application No. 60/023,822, filed on Aug. 12, 1996.

(51) Int. Cl.[7] .......................... G06F 15/00; G06F 19/00; H03F 1/26
(52) U.S. Cl. .......................... 702/194; 702/189; 702/19
(58) Field of Search .......................... 702/3, 4, 15–17, 702/19–21, 179–181, 22, 23, 27, 66, 70, 75–78, 106, 124, 126, 189–191, 193–199; 708/300, 303, 304, 317, 320

(56) References Cited

U.S. PATENT DOCUMENTS

| 3,994,284 A | * | 11/1976 | Voelker | 600/506 |
| 5,105,275 A | * | 4/1992 | Iizuka et al. | 348/607 |
| 5,119,432 A | * | 6/1992 | Hirsch | 324/76.19 |
| 5,568,206 A | * | 10/1996 | Goeckler | 348/726 |
| 5,893,054 A | * | 4/1999 | White | 702/189 |
| 5,983,162 A | * | 11/1999 | Huang | 702/4 |
| 6,131,071 A | * | 10/2000 | Partyka et al. | 702/16 |

OTHER PUBLICATIONS

Boashash, Boualem. "Estimating and Interpreting the Instantaneous Frequency of a Signal–Part 1 Fundamentals". Apr. 4, 1992. Proceedings of the IEEE, vol. 80, No. 4, pp 520–538.*
Norden E. Huang and Clifford D. Leitao, "Large–Scale Gulf Stream Frontal Study Using Geos 3 Radar Altimeter Data", Journal of Geophysical Research, vol. 83, No. C9, Sep. 20, 1978.

(List continued on next page.)

*Primary Examiner*—Marc S. Hoff
*Assistant Examiner*—Manuel L. Barbee

(57) ABSTRACT

A computer implemented physical signal analysis method includes four basic steps and the associated presentation techniques of the results. The first step is a computer implemented Empirical Mode Decomposition that extracts a collection of Intrinsic Mode Functions (IMF) from nonlinear, nonstationary physical signals. The decomposition is based on the direct extraction of the energy associated with various intrinsic time scales in the physical signal. Expressed in the IMF's, they have well-behaved Hilbert Transforms from which instantaneous frequencies can be calculated. The second step is the Hilbert Transform which produces a Hilbert Spectrum. Thus, the invention can localize any event on the time as well as the frequency axis. The decomposition can also be viewed as an expansion of the data in terms of the IMF's. Then, these IMF's, based on and derived from the data, can serve as the basis of that expansion. The local energy and the instantaneous frequency derived from the IMF's through the Hilbert transform give a full energy-frequency-time distribution of the data which is designated as the Hilbert Spectrum. The third step filters the physical signal by combining a subset of the IMFs. In the fourth step, a curve may be fitted to the filtered signal which may not have been possible with the original, unfiltered signal.

68 Claims, 78 Drawing Sheets

(6 of 78 Drawing Sheet(s) Filed in Color)

OTHER PUBLICATIONS

Norden E. Huang and Steven R. Long, "An Experimental Study of the Surface Elevation Probability Distribution and Statistics of Wind–Generated Waves", J. Fluid Mech., vol. 101, pp. 179–200 (1980).

Norden E. Huang, Steven R. Long and Zhen Shen, "The Mechanism for Frequency Downshift in Nonlinear Wave Evolution", Advances in Applied Mechanics, vol. 32, pp. 59–117 (Apr. 1996).

U.S. application No. 09/210,693, Huang, filed Dec. 14, 1998.

"Patent Disclosure for A New Instrumental Method for Bridge Safety Inspection Based on a Transient Test Load," Kang Huang, 13 pages, 36 figures, Dec. 5, 1997.

* cited by examiner

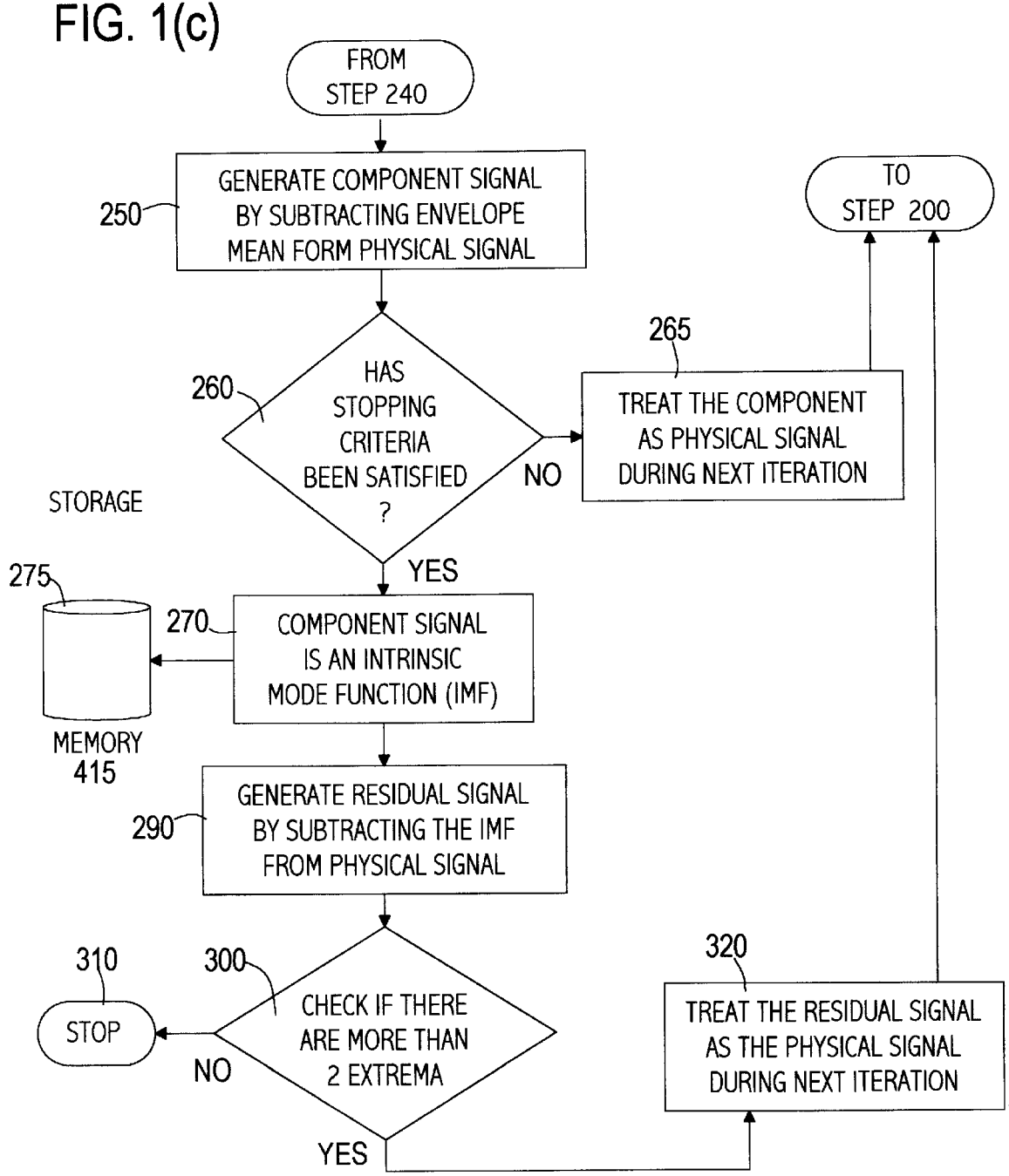

EMD-IMF without intermittency option

Wavelet Spectrum for Laboratory Wind Data

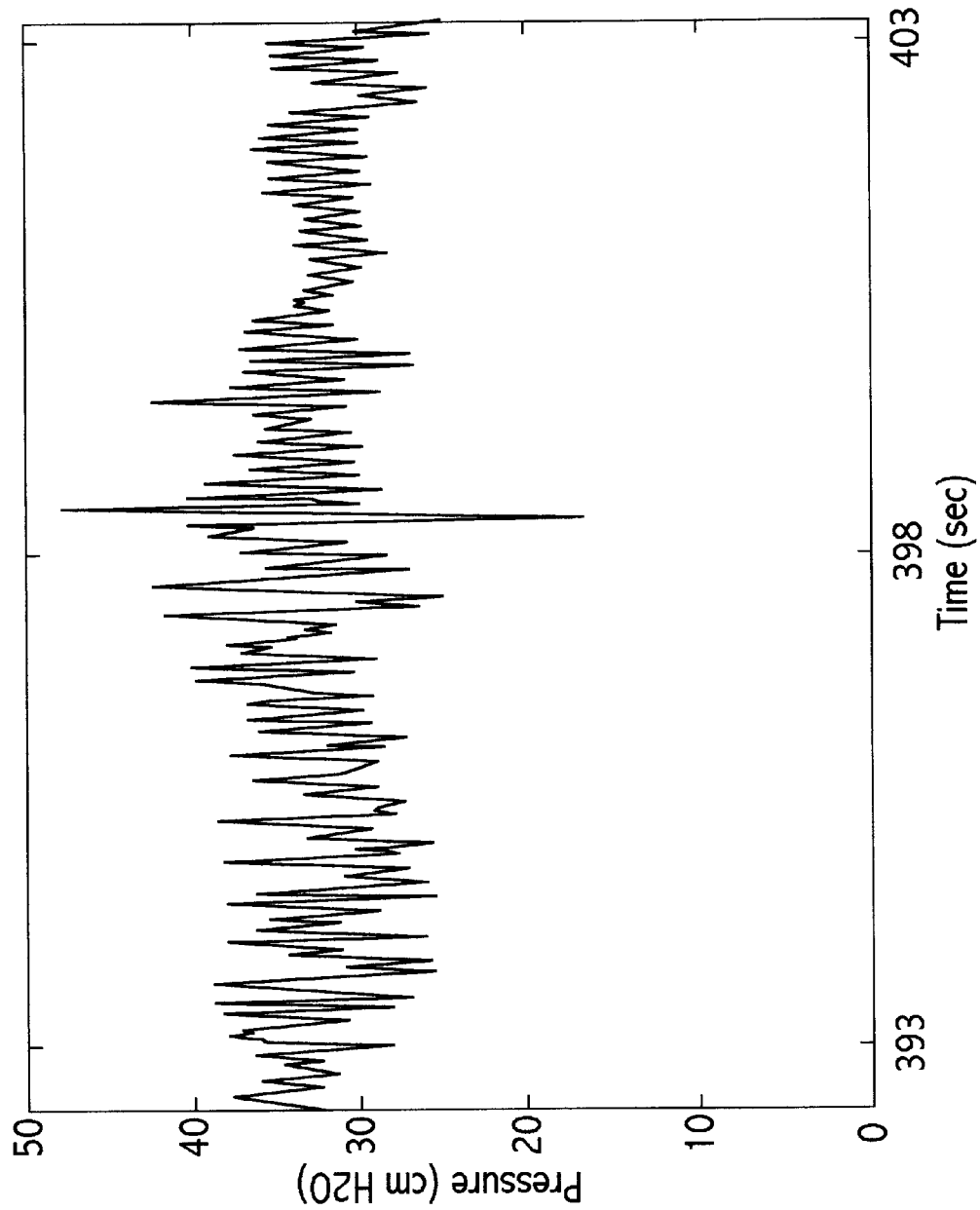

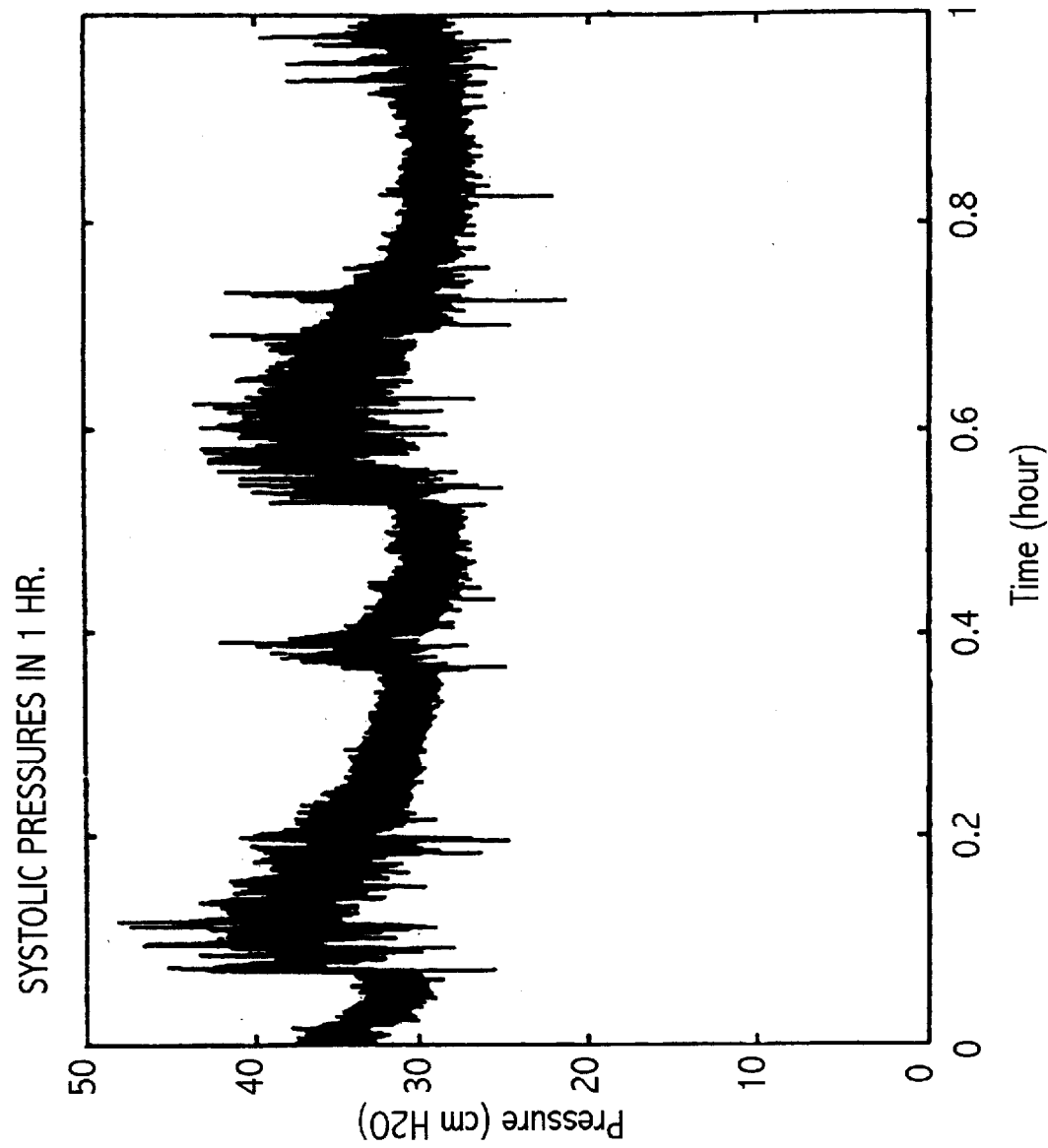

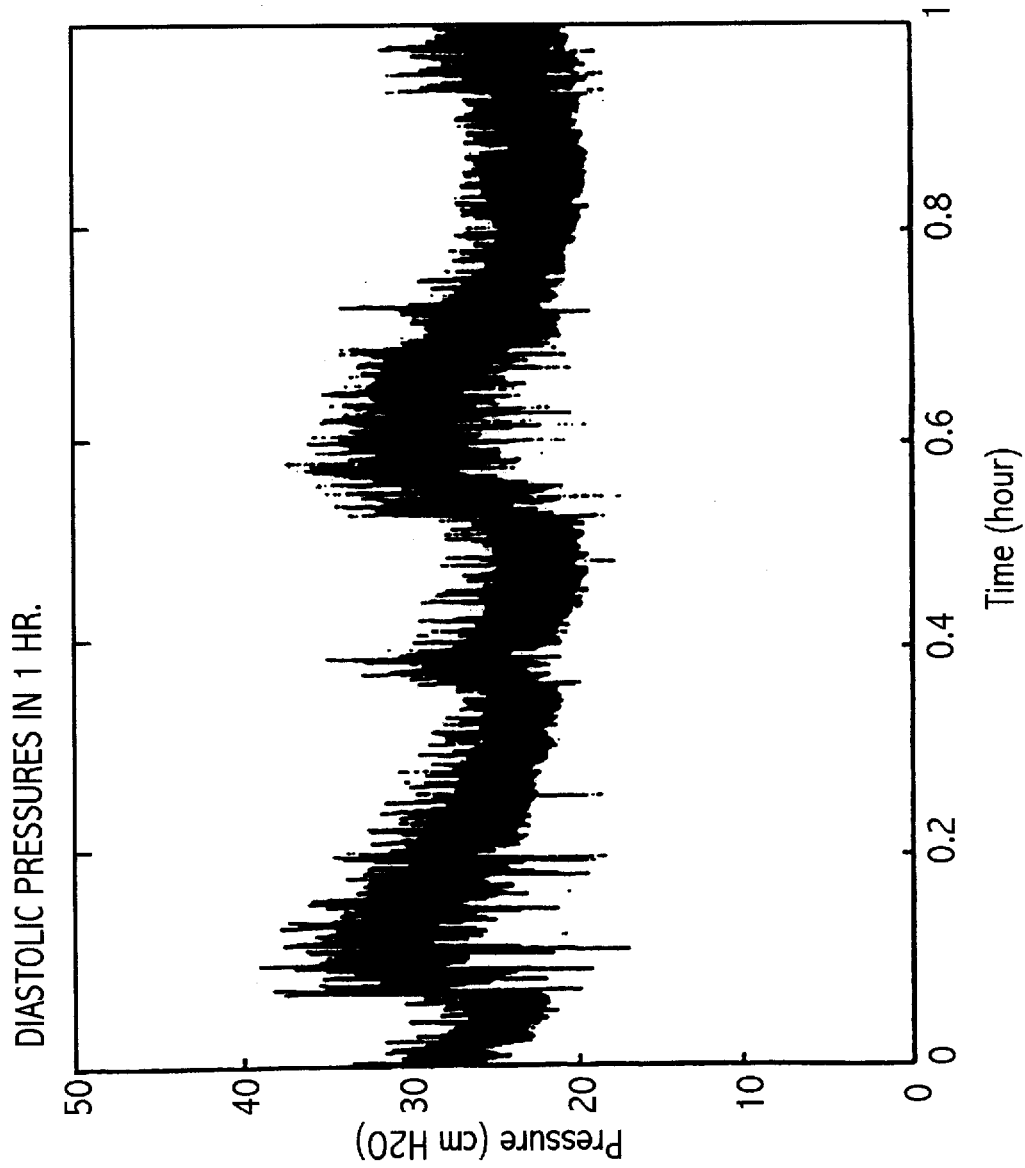

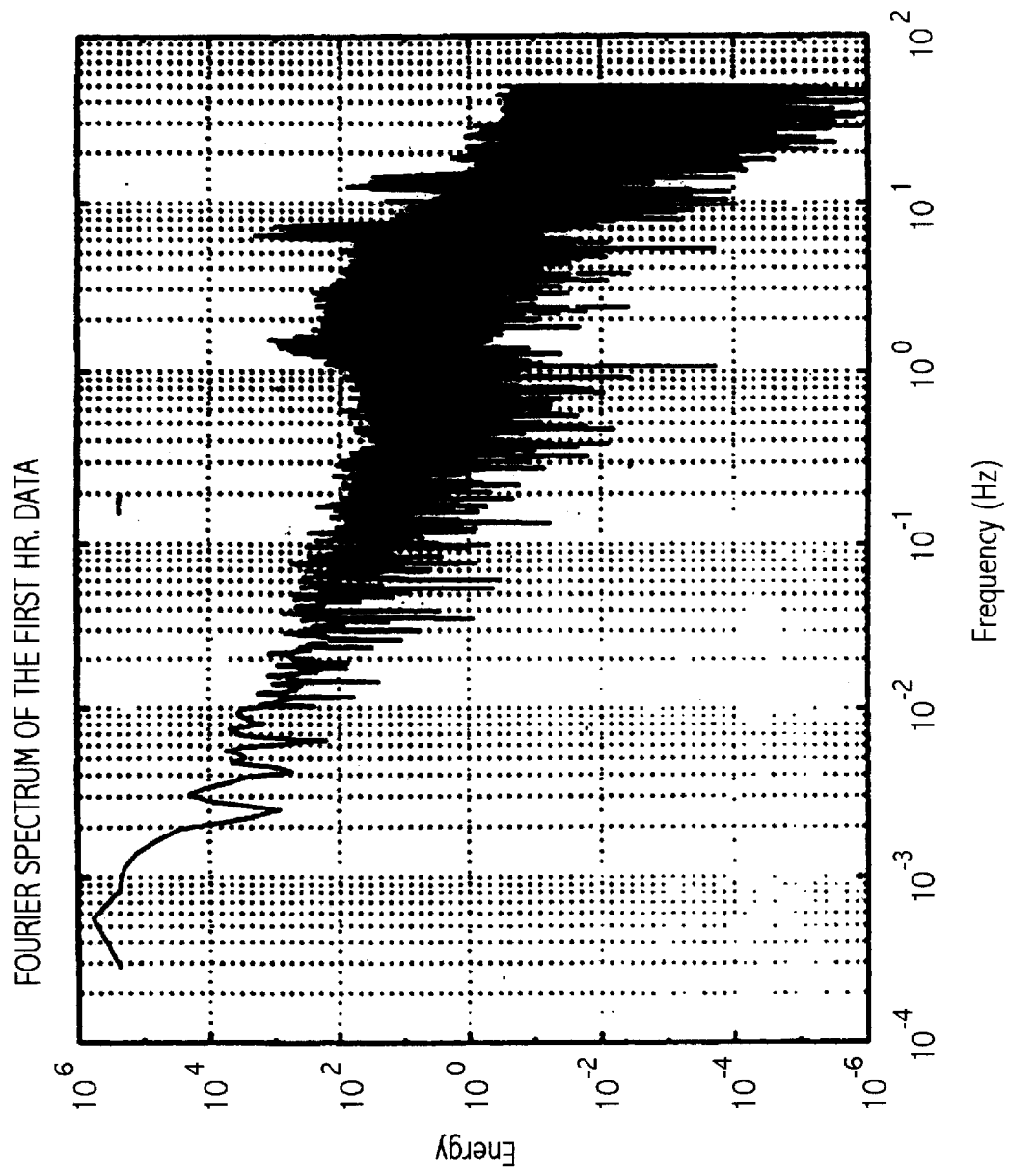

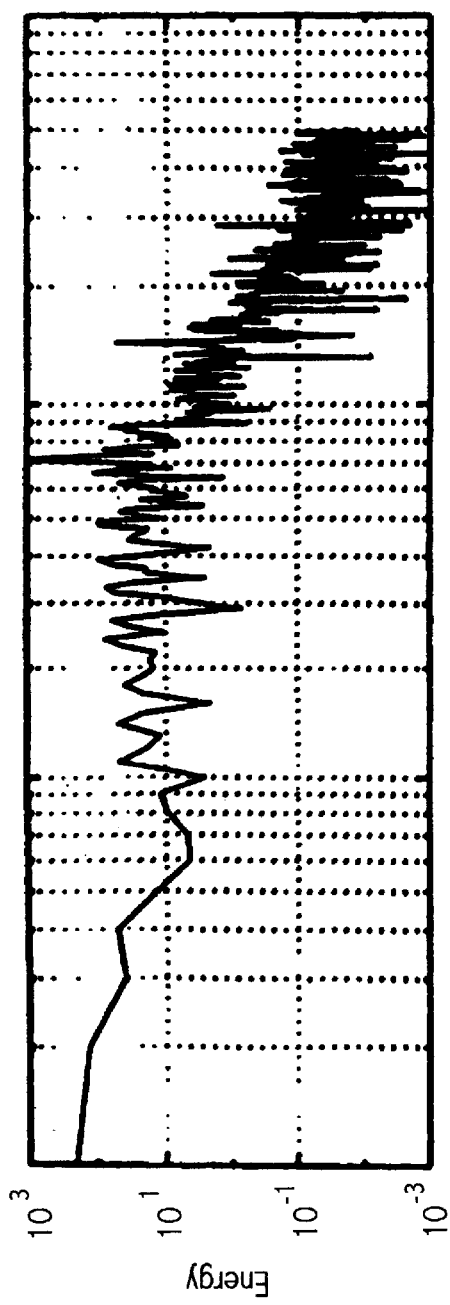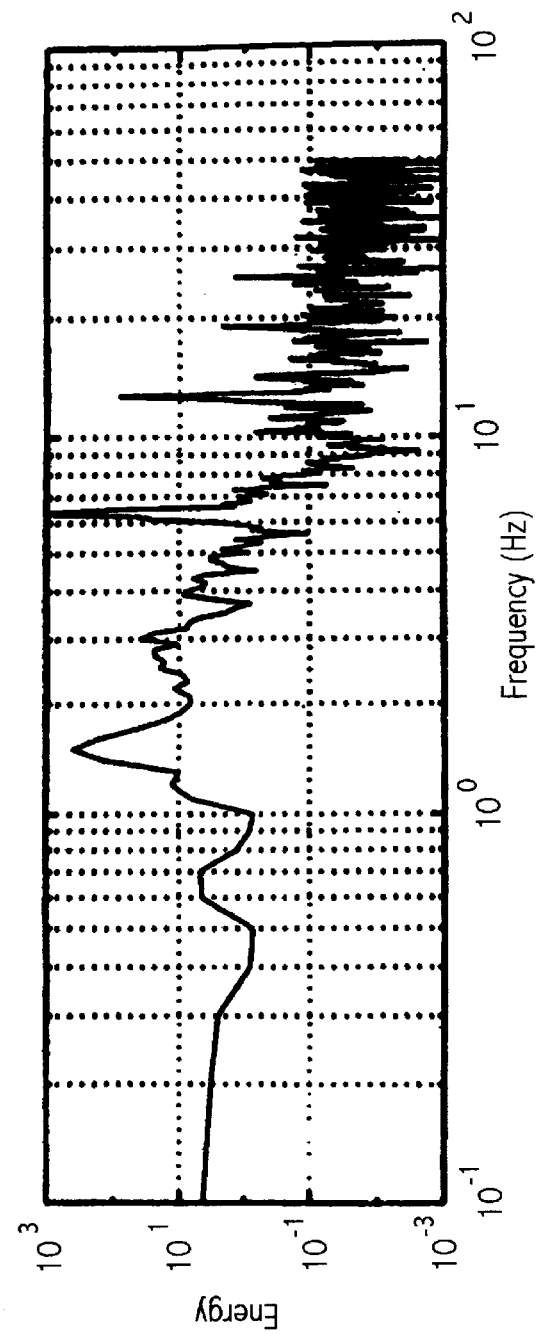
FIG. 10(b)
FIG. 10(c)

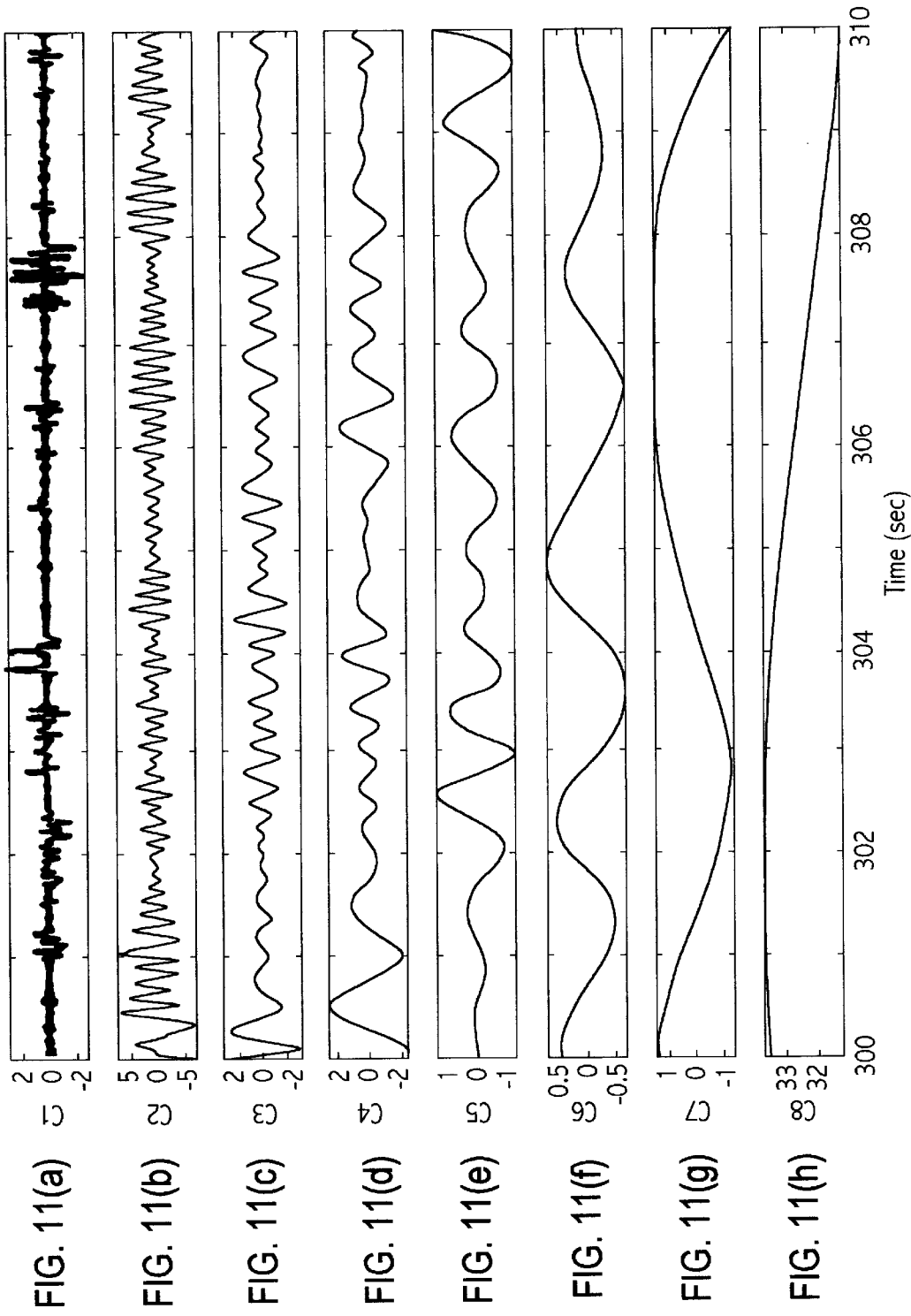

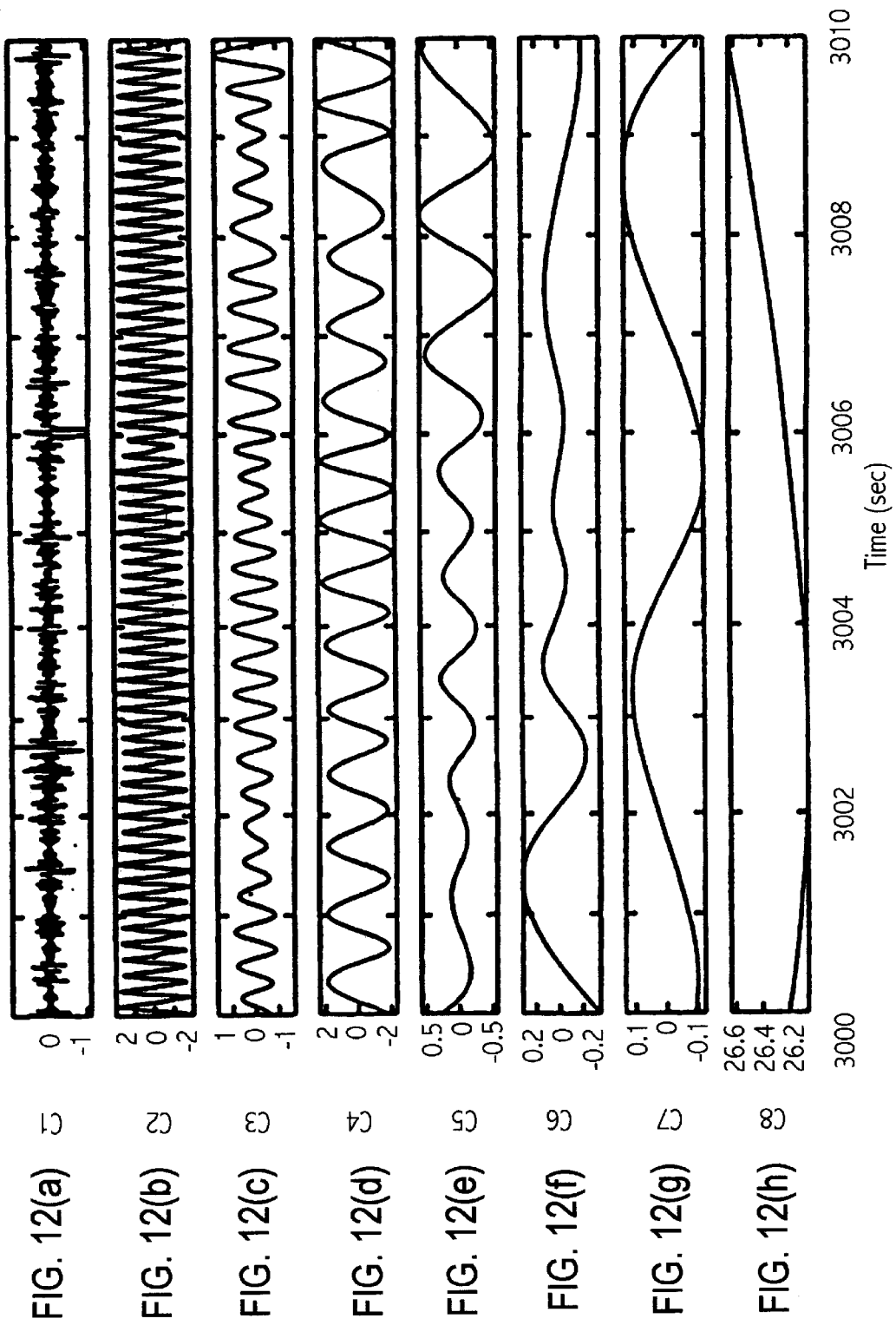

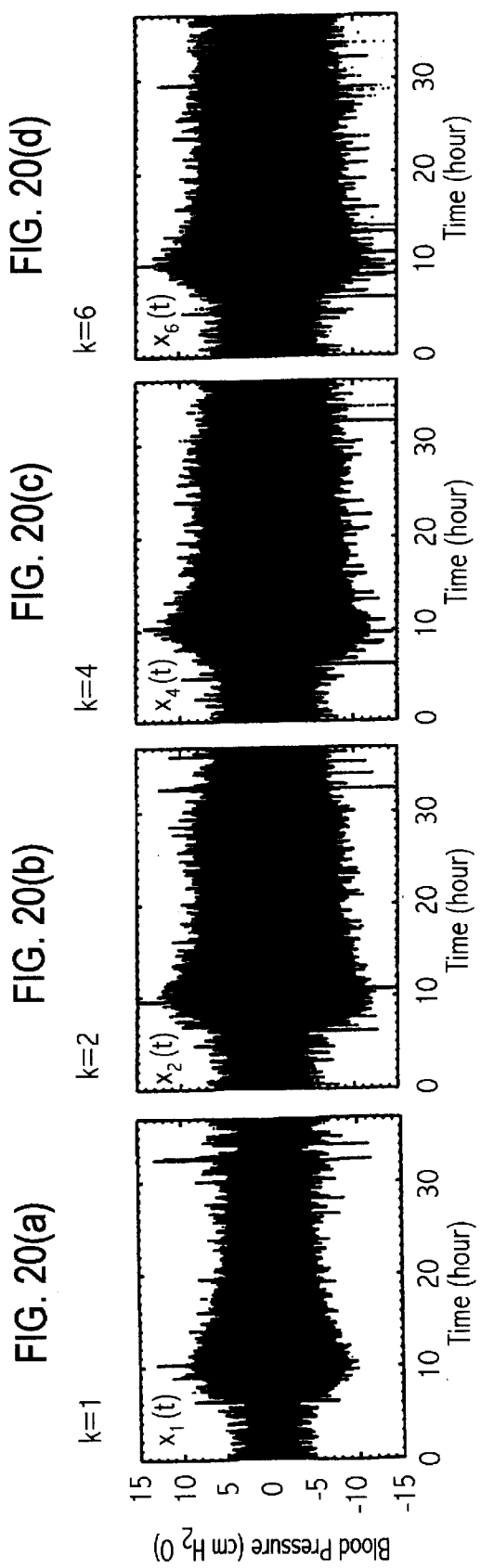

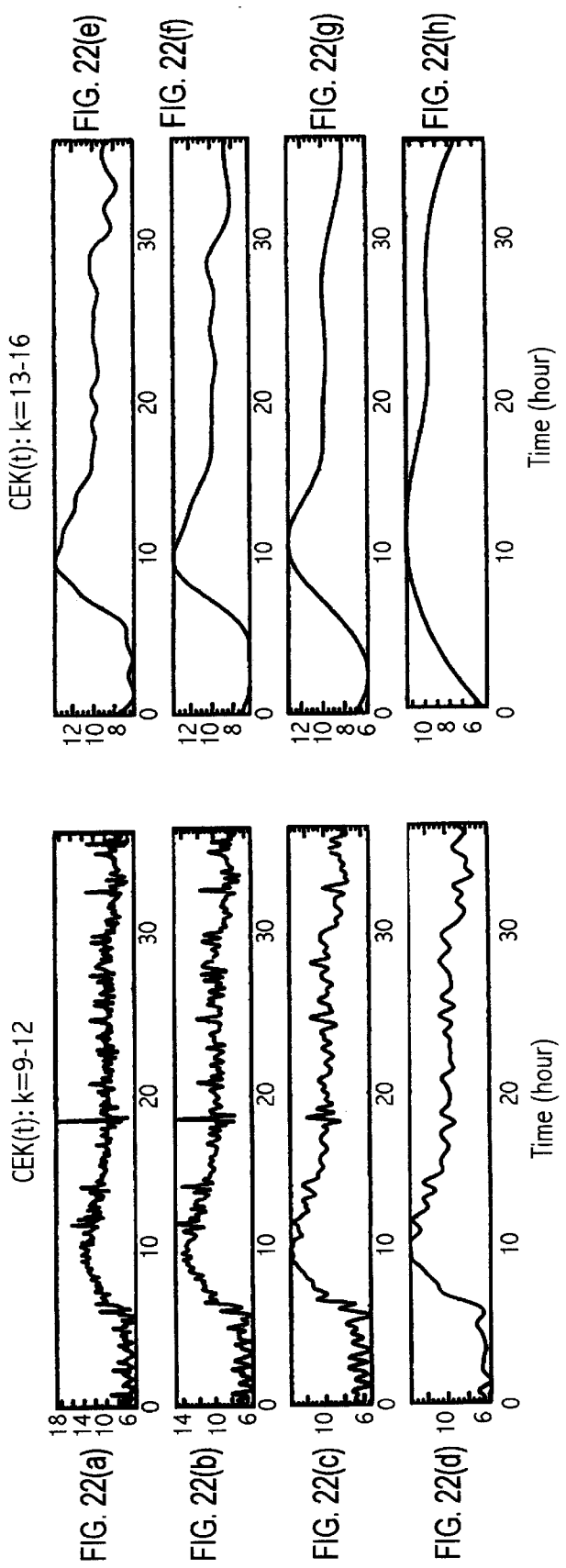

Seizure Data

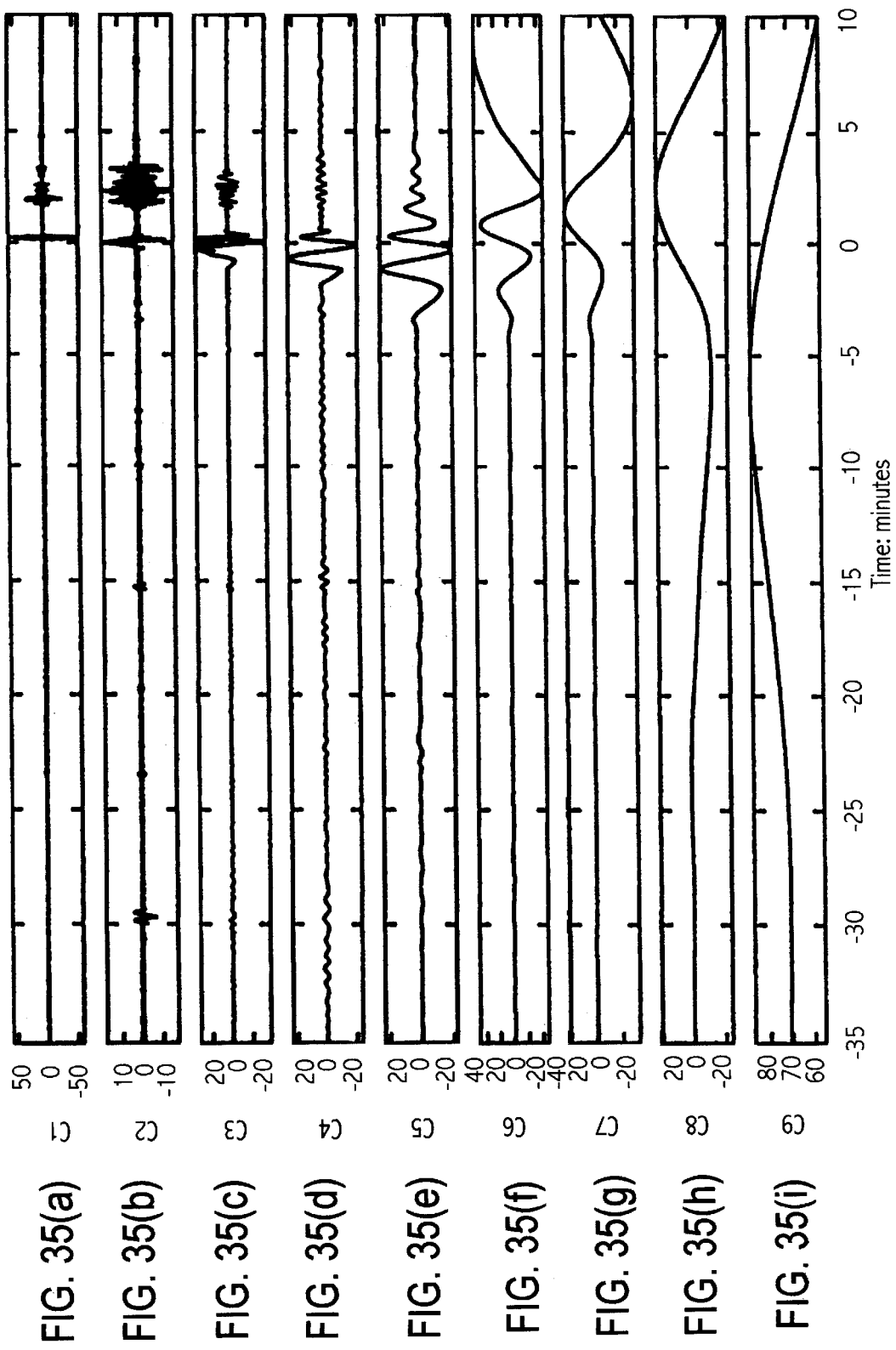

Intrinsic Mode Decomposition

EMPIRICAL MODE DECOMPOSITION APPARATUS, METHOD AND ARTICLE OF MANUFACTURE FOR ANALYZING BIOLOGICAL SIGNALS AND PERFORMING CURVE FITTING

CROSS REFERENCES TO RELATED APPLICATIONS

This application is a continuation-in-part of priority under 35 U.S.C. §120 to parent application Ser. No. 08/872,586 filed on Jun. 10, 1997 now U.S. Pat. No. 5,983,162, which itself claims priority under 35 U.S.C. §119(e) to U.S. Provisional application Serial No. 60/023,411 filed on Aug. 14, 1996 and Serial No. 60/023,822 filed on Aug. 12, 1996.

ORIGIN OF INVENTION

The inventor of the invention described herein is an employee of the United States Government. Therefore, the invention may be manufactured and used by or for the Government for governmental purposes without the payment of any royalties thereon or therefor.

COPYRIGHT NOTIFICATION

Portions of this patent application contain materials that are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Technical Field of the Invention

This invention generally relates to a signal analysis method, apparatus and article of manufacture. The results of processing several examples of biological signals are discussed herein to show the particular utility of the invention in that field and to further demonstrate the broad applicability of the invention.

Although the present invention finds utility in processing biological signals, it is to be understood that any signal representative of a real world phenomenon such as a signal representative of a physical process including electrical, mechanical, biological, chemical, optical, geophysical or other process(es) may be analyzed and thereby more fully understood by applying the invention thereto. The real world signals to which the invention finds utility include a wide variety of real world phenomena such as the behavior of a stock market, population growth, traffic flow, etc.. Furthermore, the term "real world signal" also includes "physical signals" representative of physical processes such as the electrical, mechanical, biological, chemical, optical, geophysical process(es) mentioned above.

Although the invention is not limited to a particular type of signal processing and includes the full range of real world data representative of processes or phenomena or combinations thereof, it is most useful when such real world signals are nonlinear and nonstationary.

2. Description of Related Art

In the parent application, several examples of geophysical data signals representative of earthquakes, ocean waves, tsunamis, ocean surface elevation and wind were processed to show the invention's wide utility to a broad variety of signal types. The techniques disclosed therein and elaborated upon herein represent major advances in physical signal processing.

Previously, analyzing signals, particularly those having nonlinear and/or nonstationary properties, was a difficult problem confronting many industries. These industries have harnessed various computer implemented methods to process data signals measured or otherwise taken from various processes such as electrical, mechanical, optical, biological, and chemical processes. Unfortunately, previous methods have not yielded results which are physically meaningful.

Among the difficulties found in conventional systems is that representing physical processes with physical signals may present one or more of the following problems:

(a) The total data span is too short;

(b) The data are nonstationary; and (c) The data represent nonlinear processes.

Although problems (a)–(c) are separate issues, the first two problems are related because a data section shorter than the longest time scale of a stationary process can appear to be nonstationary. Because many physical events are transient, the data representative of those events are nonstationary. For example, a transient event such as an earthquake will produce nonstationary data when measured. Nevertheless, the nonstationary character of such data is ignored or the effects assumed to be negligible. This assumption may lead to inaccurate results and incorrect interpretation of the underlying physics as explained below.

A variety of techniques have been applied to nonlinear, nonstationary physical signals. For example, many computer implemented methods apply Fourier spectral analysis to examine the energy-frequency distribution of such signals.

Although the Fourier transform that is applied by these computer implemented methods is valid under extremely general conditions, there are some crucial restrictions: the system must be linear, and the data must be strictly periodic or stationary. If these conditions are not met, then the resulting spectrum will not make sense physically.

A common technique for meeting the linearity condition is to approximate the physical phenomena with at least one linear system. Although linear approximation is an adequate solution for some applications, many physical phenomena are highly nonlinear and do not admit a reasonably accurate linear approximation.

Furthermore, imperfect probes/sensors and numerical schemes may contaminate data representative of the phenomenon. For example, the interactions of imperfect probes with a perfect linear system can make the final data nonlinear.

Many recorded physical signals are of finite duration, nonstationary, and nonlinear because they are derived from physical processes that are nonlinear either intrinsically or through interactions with imperfect probes or numerical schemes. Under these conditions, computer implemented methods which apply Fourier spectral analysis are of limited use. For lack of alternatives, however, such methods still apply Fourier spectral analysis to process such data.

In summary, the indiscriminate use of Fourier spectral analysis in these methods and the adoption of the stationarity and linearity assumptions may give inaccurate results some of which are described below.

First, the Fourier spectrum defines uniform harmonic components globally. Therefore, the Fourier spectrum needs many additional harmonic components to simulate nonstationary data that are nonuniform globally. As a result, energy is spread over a wide frequency range.

For example, using a delta function to represent the flash of light from a lightning bolt will give a phase-locked wide white Fourier spectrum. Here, many Fourier components are added to simulate the nonstationary nature of the data in the time domain, but their existence diverts energy to a much wider frequency domain. Constrained by the conservation of energy principle, these spurious harmonics and the wide frequency spectrum cannot faithfully represent the true energy density of the lighting in the frequency and time space.

More seriously, the Fourier representation also requires the existence of negative light intensity so that the components can cancel out one another to give the final delta function representing the lightning. Thus, the Fourier components might make mathematical sense, but they often do not make physical sense when applied.

Although no physical process can be represented exactly by a delta function, some physical data such as the near field strong earthquake energy signals are of extremely short duration. Such earthquake energy signals almost approach a delta function, and they always give artificially wide Fourier spectra.

Second, Fourier spectral analysis uses a linear superposition of trigonometric functions to represent the data. Therefore, additional harmonic components are required to simulate deformed wave profiles. Such deformations, as will be shown later, are the direct consequence of nonlinear effects. Whenever the form of the data deviates from a pure sine or cosine function, the Fourier spectrum will contain harmonics.

Furthermore, both nonstationarity and nonlinearity can induce spurious harmonic components that cause unwanted energy spreading and artificial frequency smearing in the Fourier spectrum. In other words, the nonstationary, stochastic nature of biological data suffers from conventional signal processing techniques and makes the interpretation of the processed data quite difficult.

According to the above background, there is a need for a more accurate signal processing technique that produces results that are more physically meaningful and readily understood. Biological signals provide another example of physical signals in which this invention is applicable. Parent application Ser. No. 08/872,586 filed Jun. 10, 1997 illustrates several other types of signals in which this invention is applicable. Namely, the parent application provides specific examples of nonlinear, nonstationary geophysical signals which are very difficult to analyze with traditional computer implemented techniques including earthquake signals, water wave signals, tsunami signals, ocean altitude and ocean circulation signals.

Many of the aforementioned signal processing problems exist when biological signals are processed. For example, most data in the field of biology are nonstationarily stochastic. When conventional tools such as Fourier Analysis are applied to such biological data, the result often-times obscures the underlying processes. In other words, conventional Fourier analysis of biological data throws away or otherwise obscures valuable information. Thus, the complex biological phenomena producing such data cannot be readily understood and is, in any event, represented imprecisely. The interpretation of the results of such conventionally processed data may, therefore, be quite difficult. The conventional techniques also make accurate modelling of the biological phenomena very difficult and, sometimes, impossible.

SUMMARY OF THE INVENTION

An object of the present invention is to solve the above-mentioned problems in conventional signal analysis techniques.

Another object of the present invention is to provide further examples of physical signal processing thereby further demonstrating the broad applicability of the invention to a wide array of physical signals which include biological signals.

Another object is to provide a technique of distilling a physical signal to the point at which the signal can be represented with an analytic function.

To achieve these objects, the invention employs a computer implemented Empirical Mode Decomposition method which decomposes physical signals representative of a physical phenomenon into components. These components are designated as Intrinsic Mode Functions (IMFs) and are indicative of intrinsic oscillatory modes in the physical phenomenon.

Contrary to almost all the previous methods, this new computer implemented method is intuitive, direct, a posteriori, and adaptive, with the basis of the decomposition based on and derived from the physical signal. The bases so derived have no close analytic expressions, and they can only be numerically approximated in a specially programmed computer by utilizing the inventive methods disclosed herein.

More specifically, the general method of the invention includes two main components or steps to analyze the physical signal without suffering the problems associated with computer implemented Fourier analysis, namely inaccurate interpretation of the underlying physics or biology caused in part by energy spreading and frequency smearing in the Fourier spectrum.

The first step is to process the data with the Empirical Mode Decomposition (EMD) method, with which the data are decomposed into a number of Intrinsic Mode Function (IMF) components. In this way, the signal will be expanded by using a basis that is adaptively derived from the signal itself.

The second step of the general method of the present invention is to apply the Hilbert Transform to the decomposed IMF's and construct an energy-frequency-time distribution, designated as the Hilbert Spectrum, from which occurrence of physical events at corresponding times (time localities) will be preserved. There is also no close analytic form for the Hilbert Spectrum. As explained below, the invention avoids this problem by storing numerical approximations in the specially programmed computer by utilizing the inventive method.

The invention also utilizes instantaneous frequency and energy to analyze the physical phenomenon rather than the global frequency and energy utilized by computer implemented Fourier spectral analysis.

Furthermore, a computer implementing the invention, e.g., via executing a program in software, to decompose physical signals into intrinsic mode functions with EMD and generate a Hilbert spectrum is also disclosed. Because of the lack of close form analytic expression of either the basis functions and the final Hilbert spectrum; computer implementation of the inventive methods is an important part of the overall method.

Still further, the invention may take the form of an article of manufacture. More specifically, the article of manufacture is a computer-usable medium, including a computer-readable program code embodied therein wherein the computer-readable code causes a computer to execute the inventive method.

Once the IMF's are generated, the invention can then produce a distilled or otherwise filtered version of the original physical signal. This distillation process eliminates undesired IMF's and thereby generates a filtered signal from which it is possible to perform a curve fitting process. In this way, it is possible to arrive at an analytic function which accurately represents the physically important components of the original signal.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description. Furthermore, all the mathematic expressions are used as a short hand to express the inventive ideas clearly and are not limitative of the claimed invention.

BRIEF DESCRIPTION OF DRAWINGS

Color Drawing Notification

The file of this patent contains at least one drawing executed in color. Copies of this patent with color drawing(s) will be provided by the Patent and Trademark Office upon request and payment of the necessary fee.

Figure 1A:
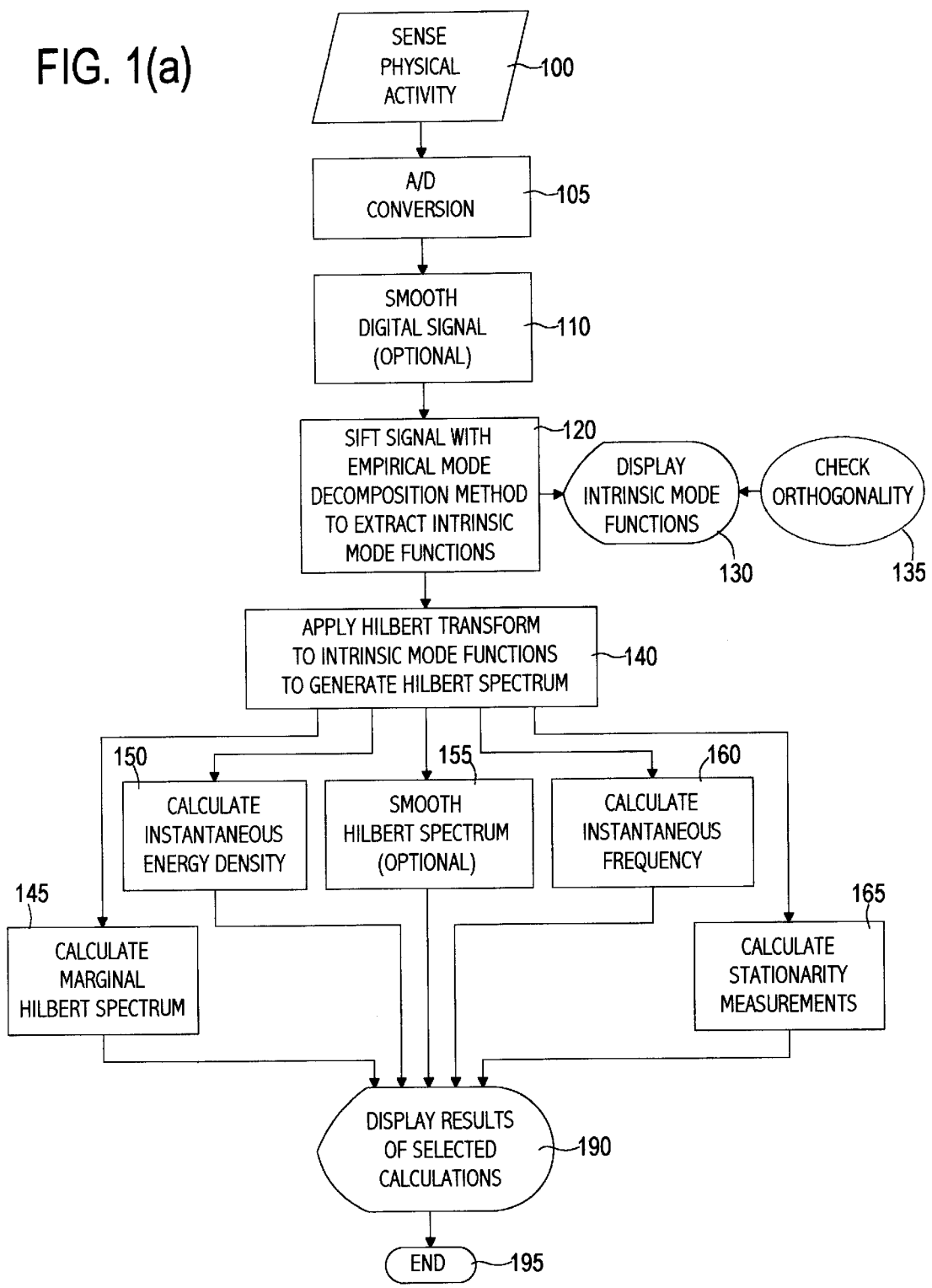
Figure 1B:
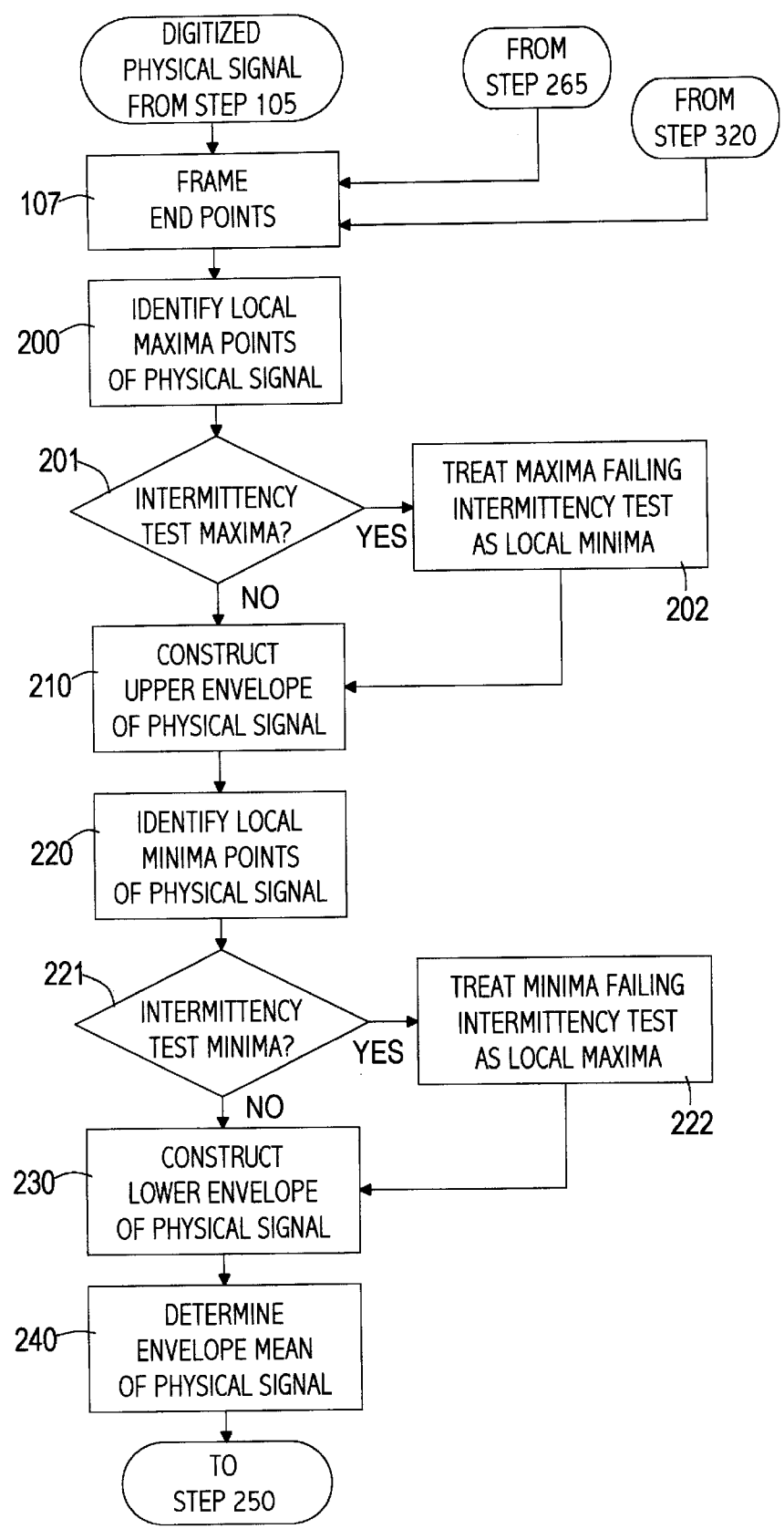
Figure 1D:
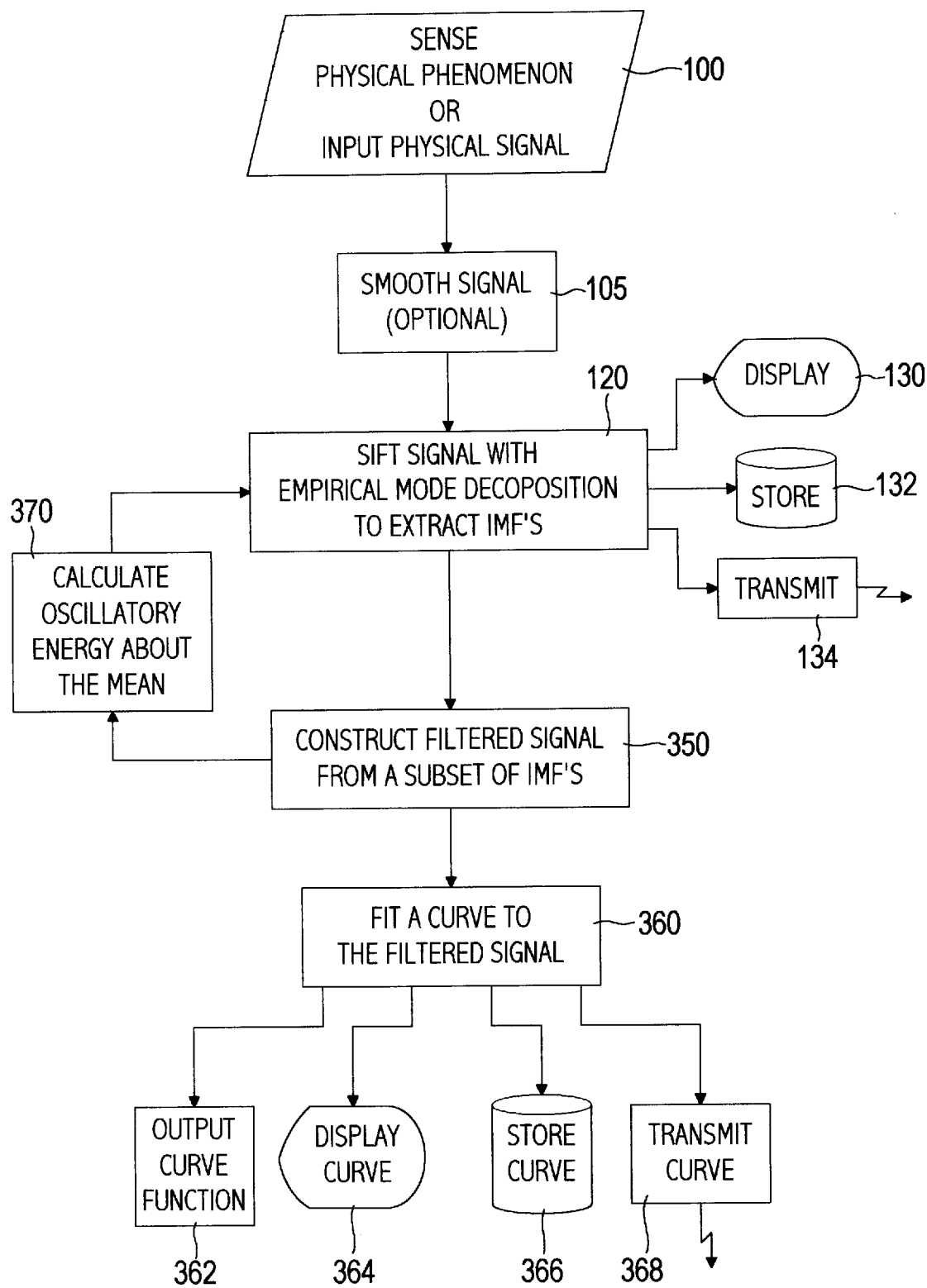
Figure 2:
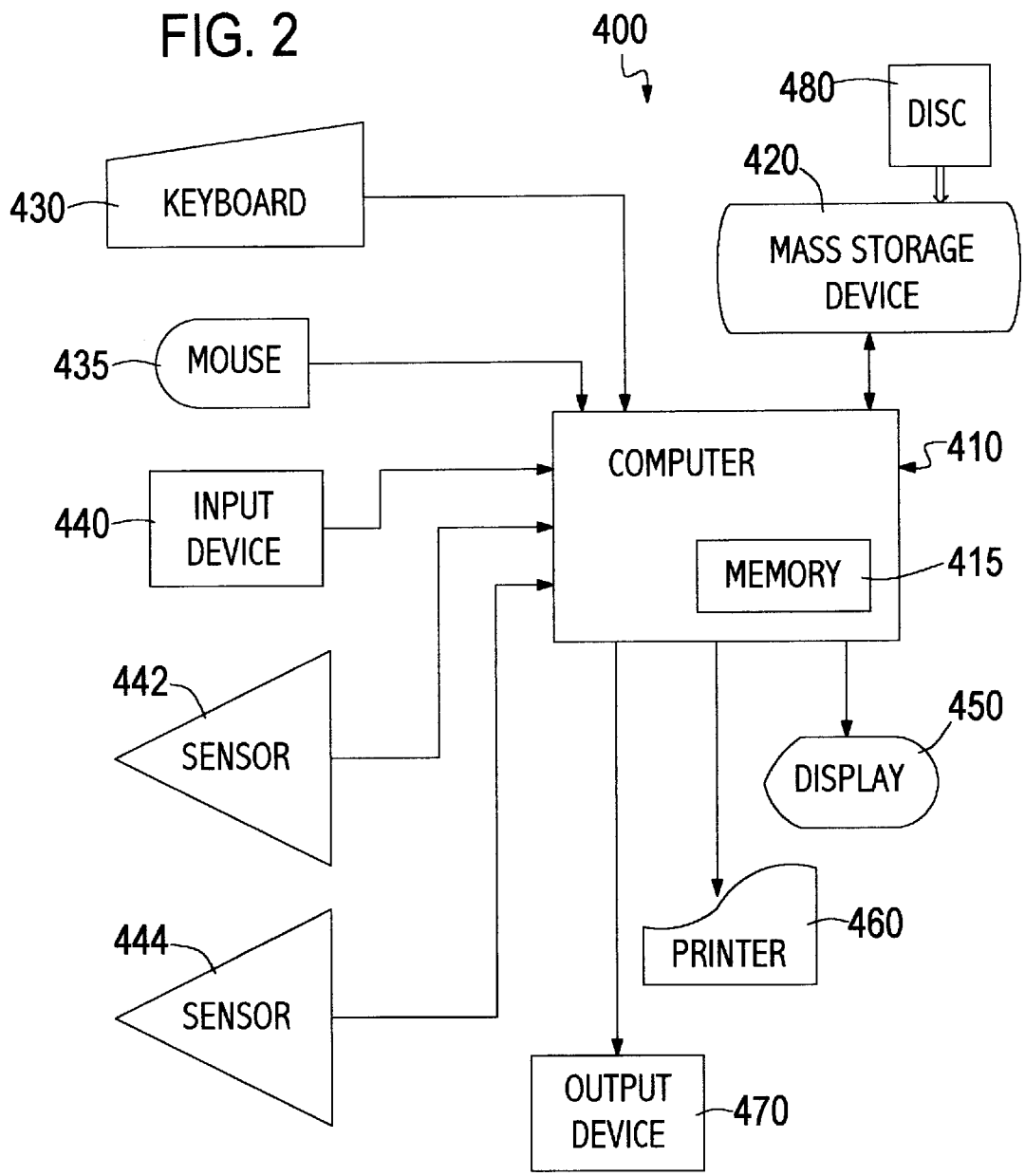

The present invention will become more fully understood from the detailed description given hereinbelow and the accompanying drawings which are given by way of illustration only, and thus are not limitative of the present invention, and wherein:

FIG. 1($a$) is a high-level flowchart describing the overall inventive method which may be implemented on the computer system shown in FIG. 2;

FIG. 1($b$) is a high-level flowchart describing the Sifting Process which may be implemented on the computer system shown in FIG. 2;

FIG. 1($c$) is a continuation of the high-level flowchart in FIG. 1($b$) describing the Sifting Process which may be implemented on the computer system shown in FIG. 2;

FIG. 1($d$) is a high-level flowchart describing EMD signal filtering and curve fitting which may be implemented on the computer system shown in FIG. 2;

FIG. 2 is a high-level block diagram of a computer system which may be programmed with the inventive with the result being a special purpose computer;

FIG. 3($a$) shows wind speed data in the form of a graph plotting wind speed as a function of time for explaining the computer implemented Empirical Mode Decomposition method of the invention;

FIG. 3($b$) is a graph illustrating the upper envelope, lower envelope, envelope mean and original wind speed data which are utilized to explain the computer implemented Empirical Mode Decomposition method of the invention;

FIGS. 3($c$)–($e$) are graphs of the first, second and third component signals h1, h11, h12, respectively which are generated by the Sifting Process of the invention;

FIG. 3($f$) is a graph of the first intrinsic mode function component which is generated by the Sifting Process of the invention;

FIG. 3($g$) is a graph of data with intermittency for illustrating an optional intermittency test of the invention;

FIGS. 3($h$)–($j$) are graphs of the first, second, and third intrinsic mode functions when the Sifting Process is applied to the data of FIG. 3($g$) without applying the intermittency test option;

FIGS. 3($k$)–($m$) are graphs of the first, second, and third intrinsic mode functions when the Sifting Process is applied to the data of FIG. 3($g$) which applies the intermittency test option.

Figure 7:
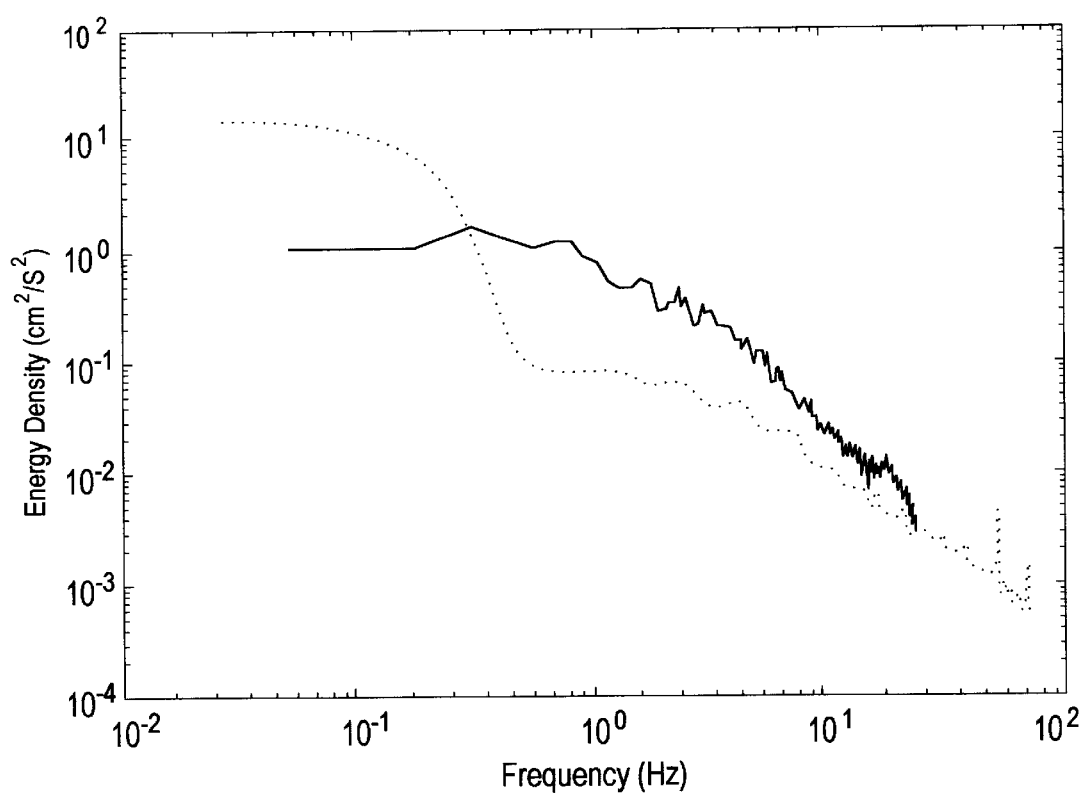
Figure 9A:
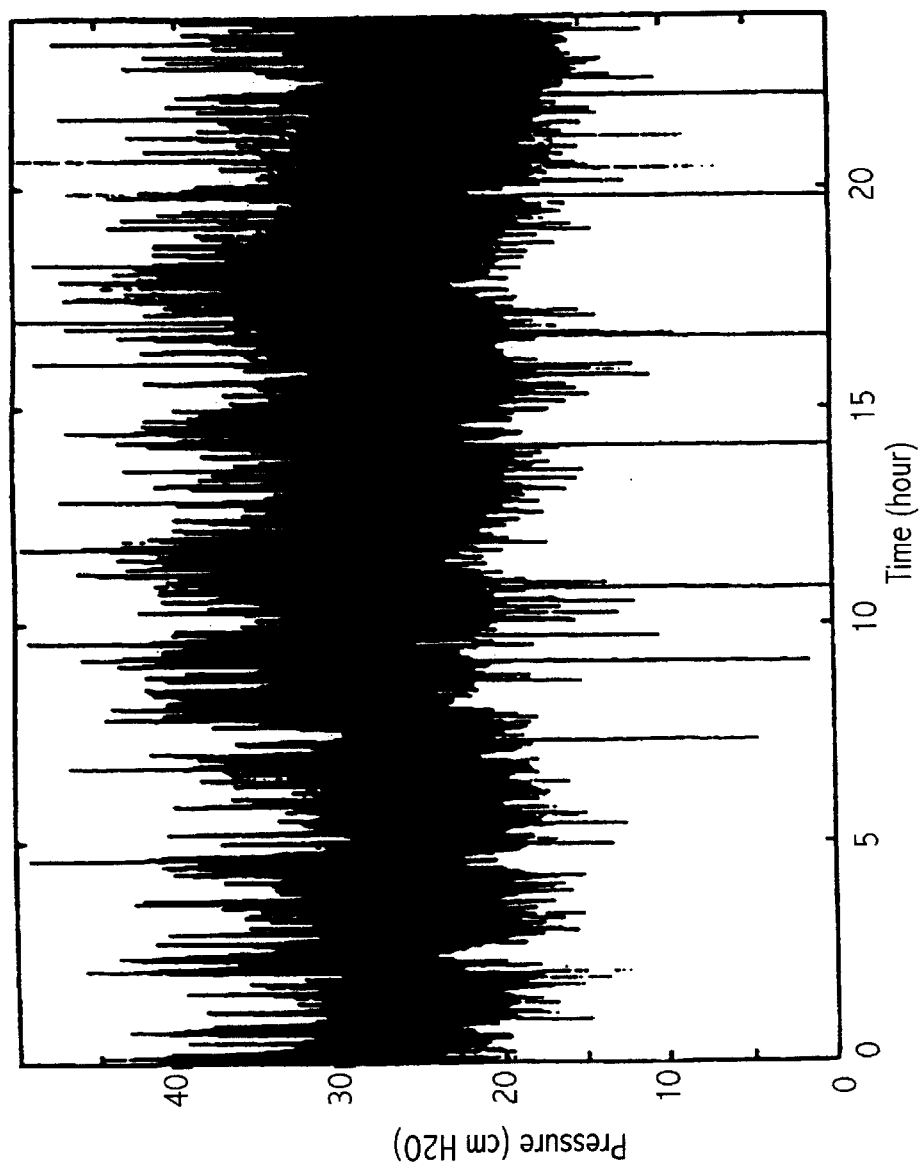
Figure 9B:
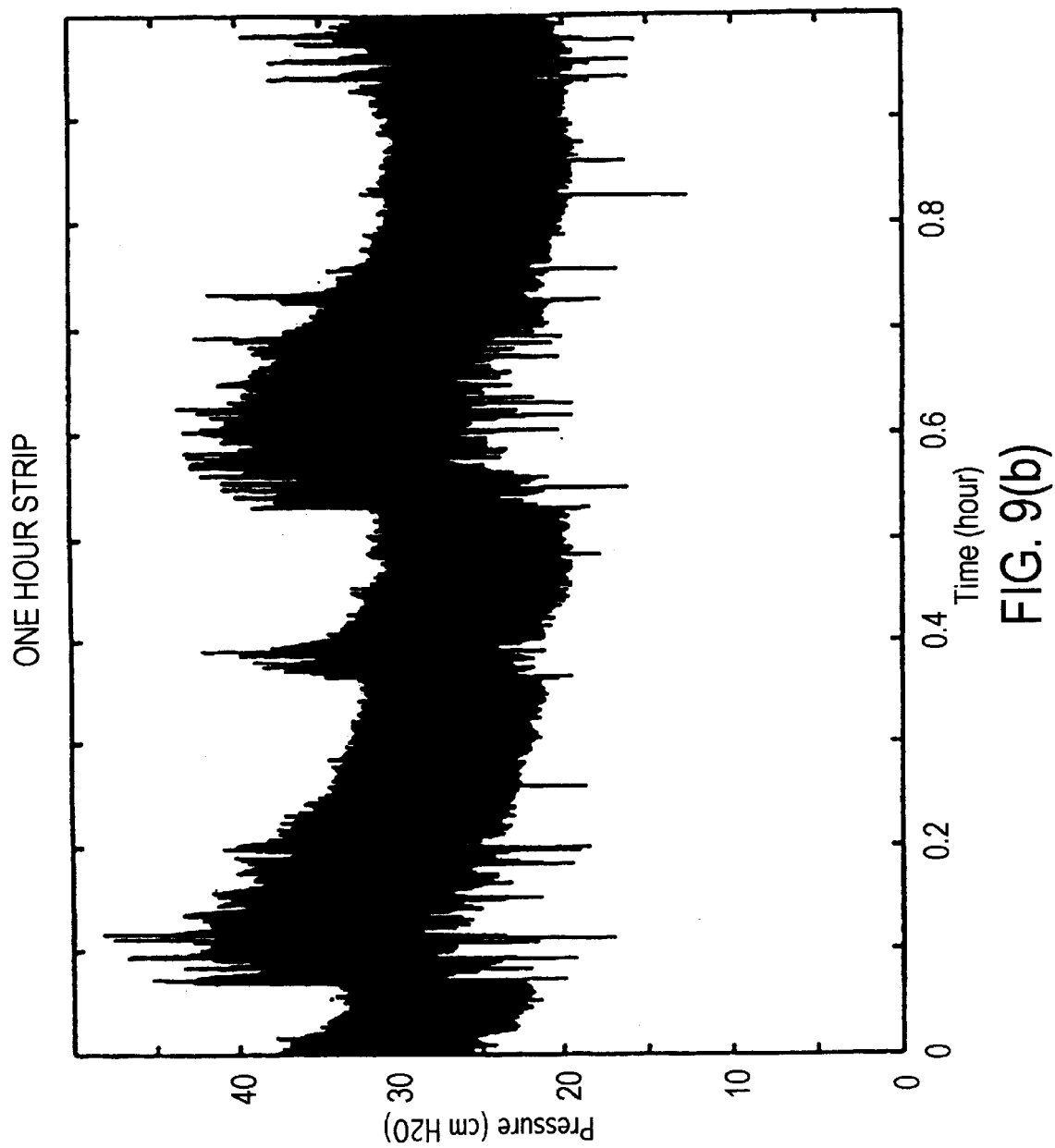
Figure 9C:
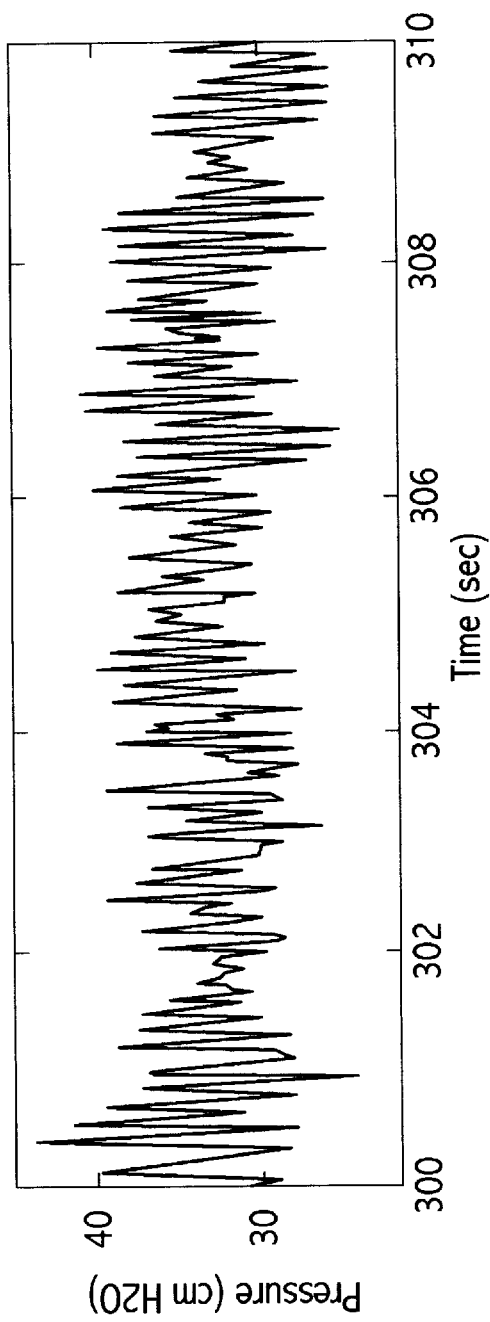
Figure 9D:
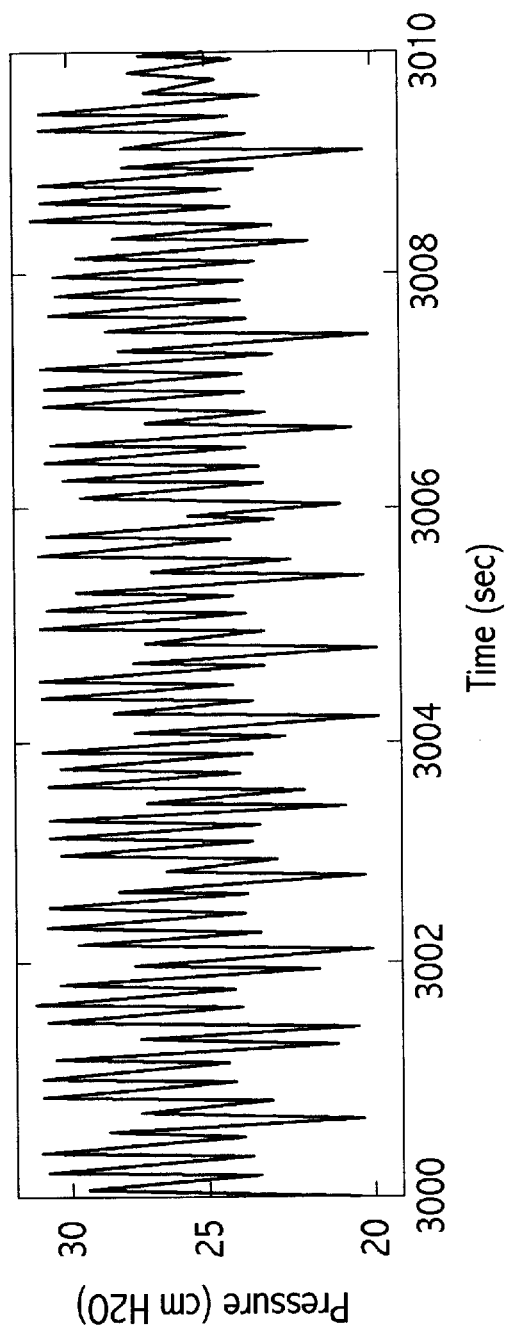
Figure 13A:
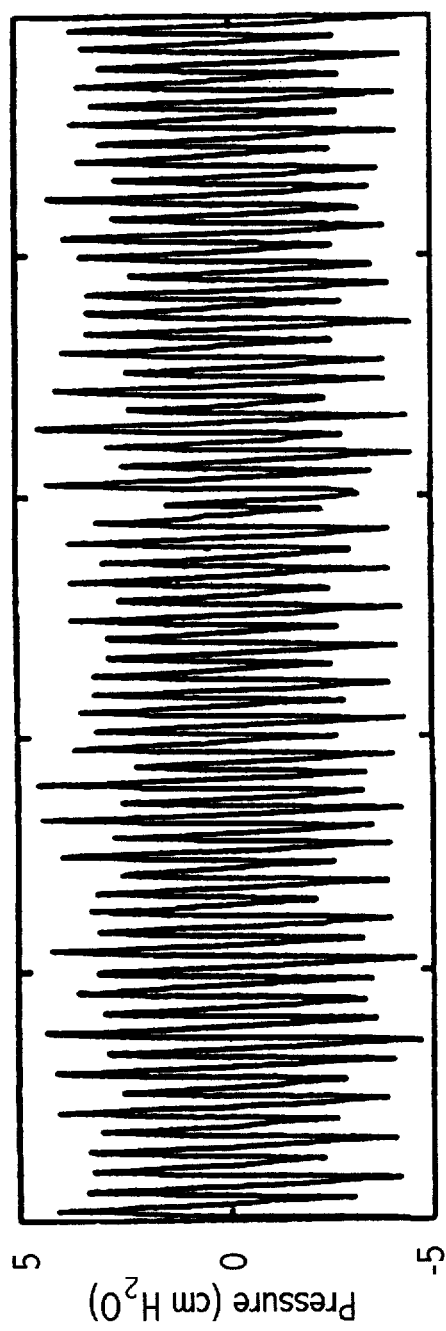
Figure 13B:
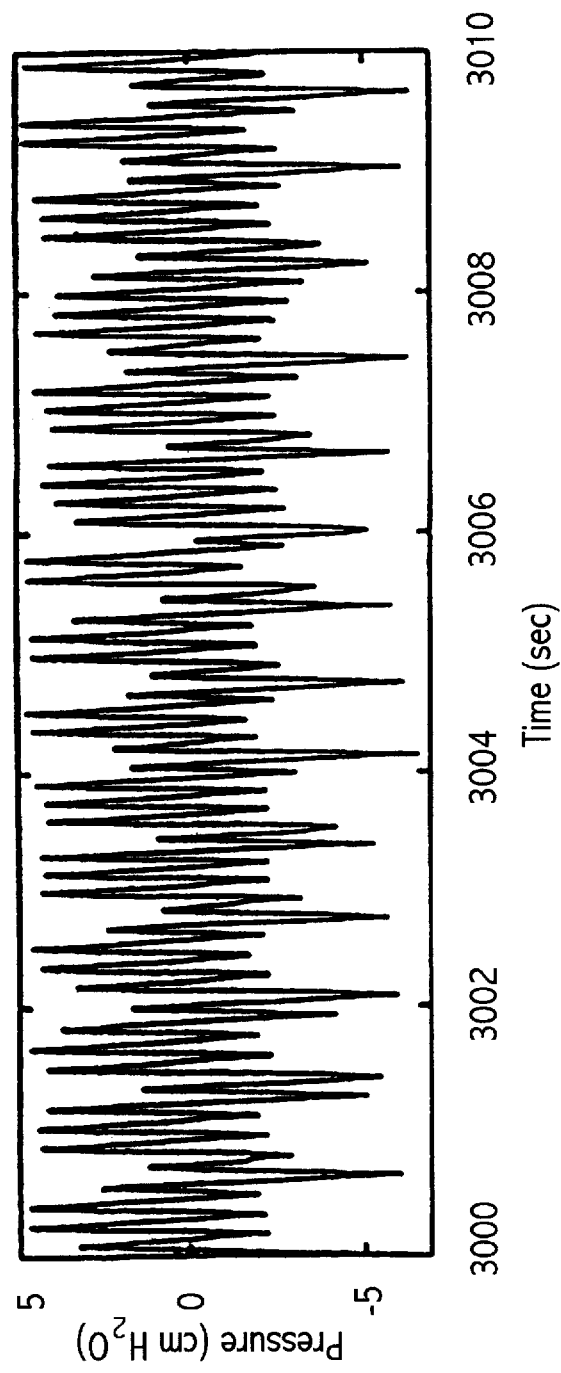
Figure 13C:
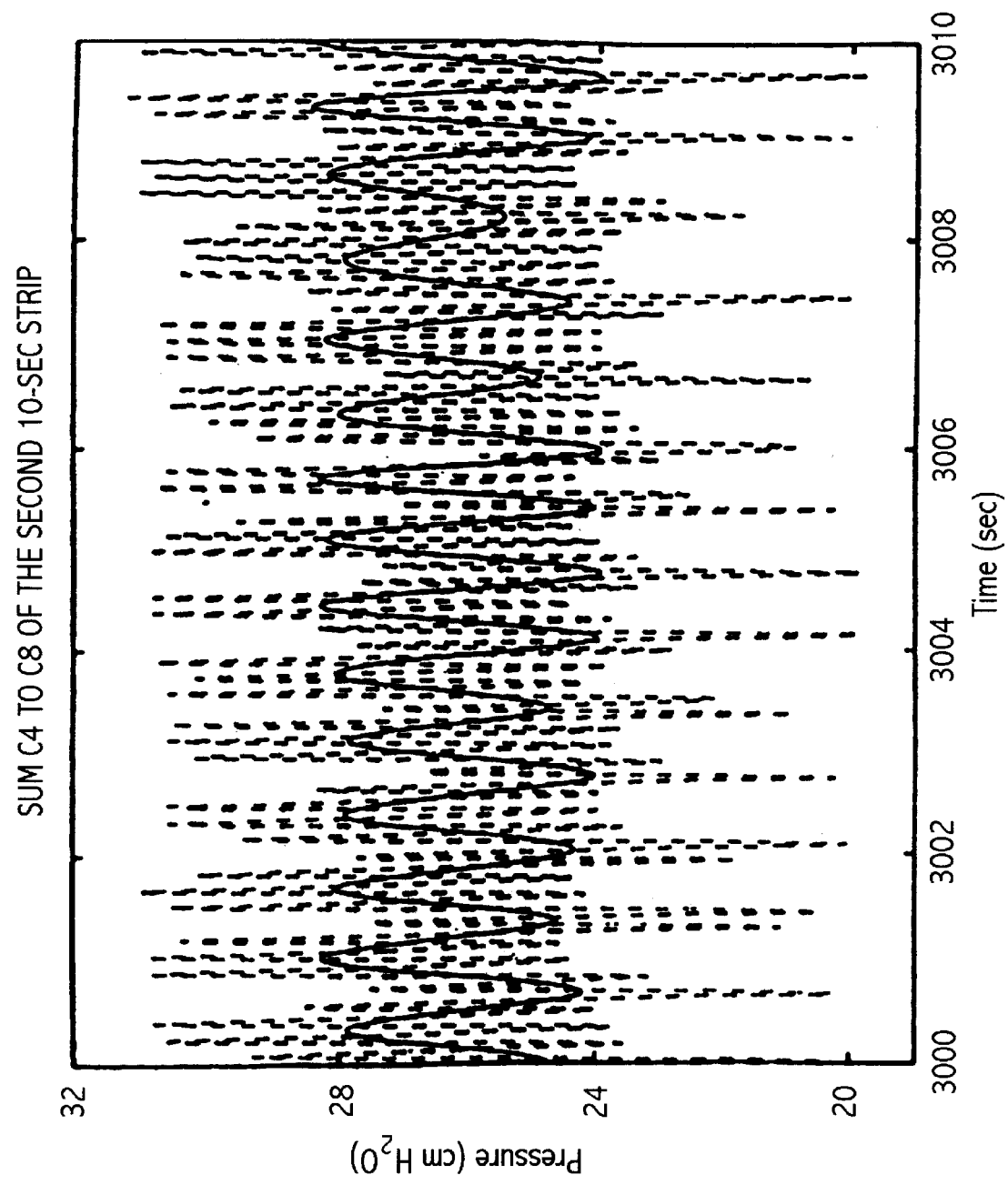
Figure 14A:
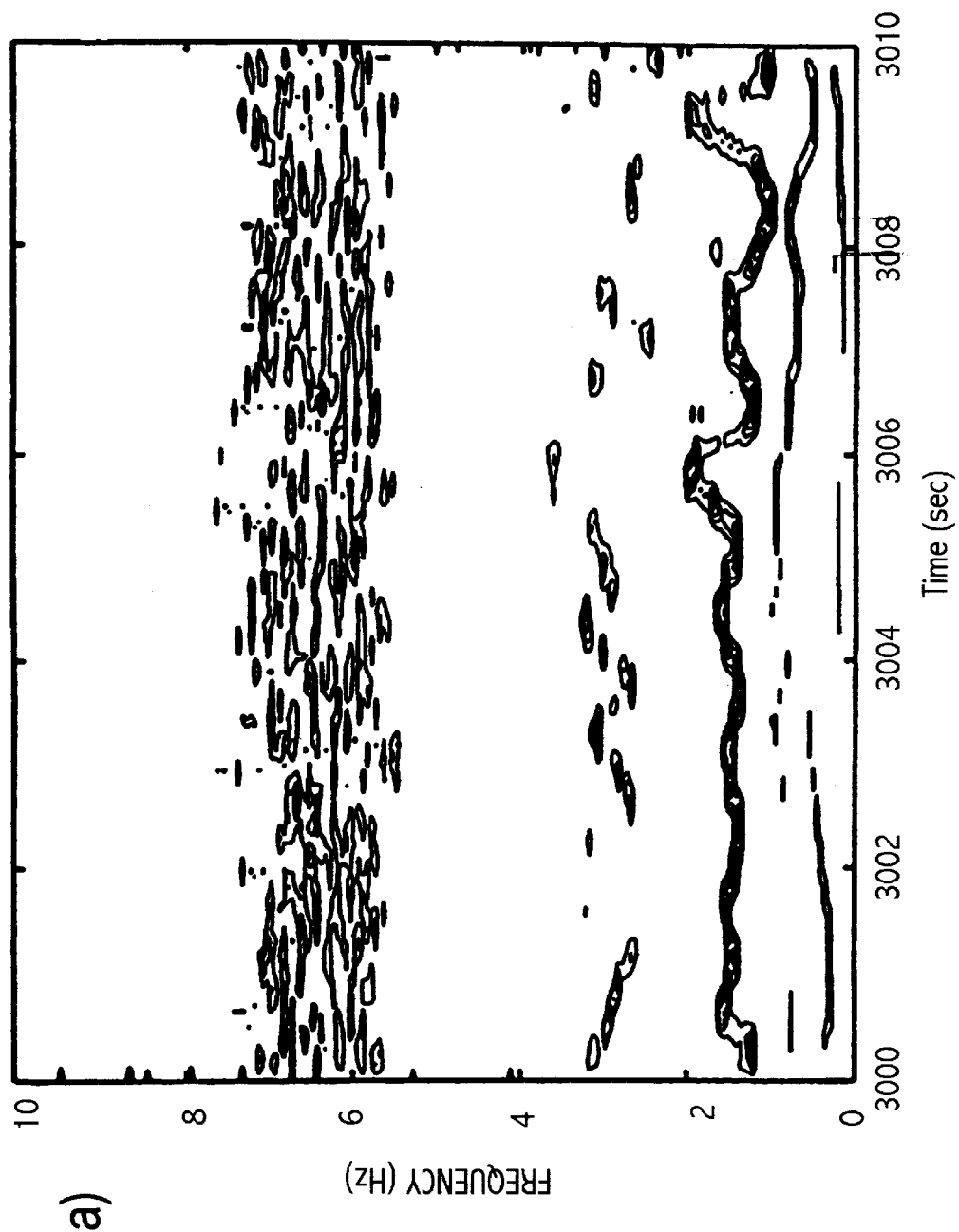
Figure 14B:
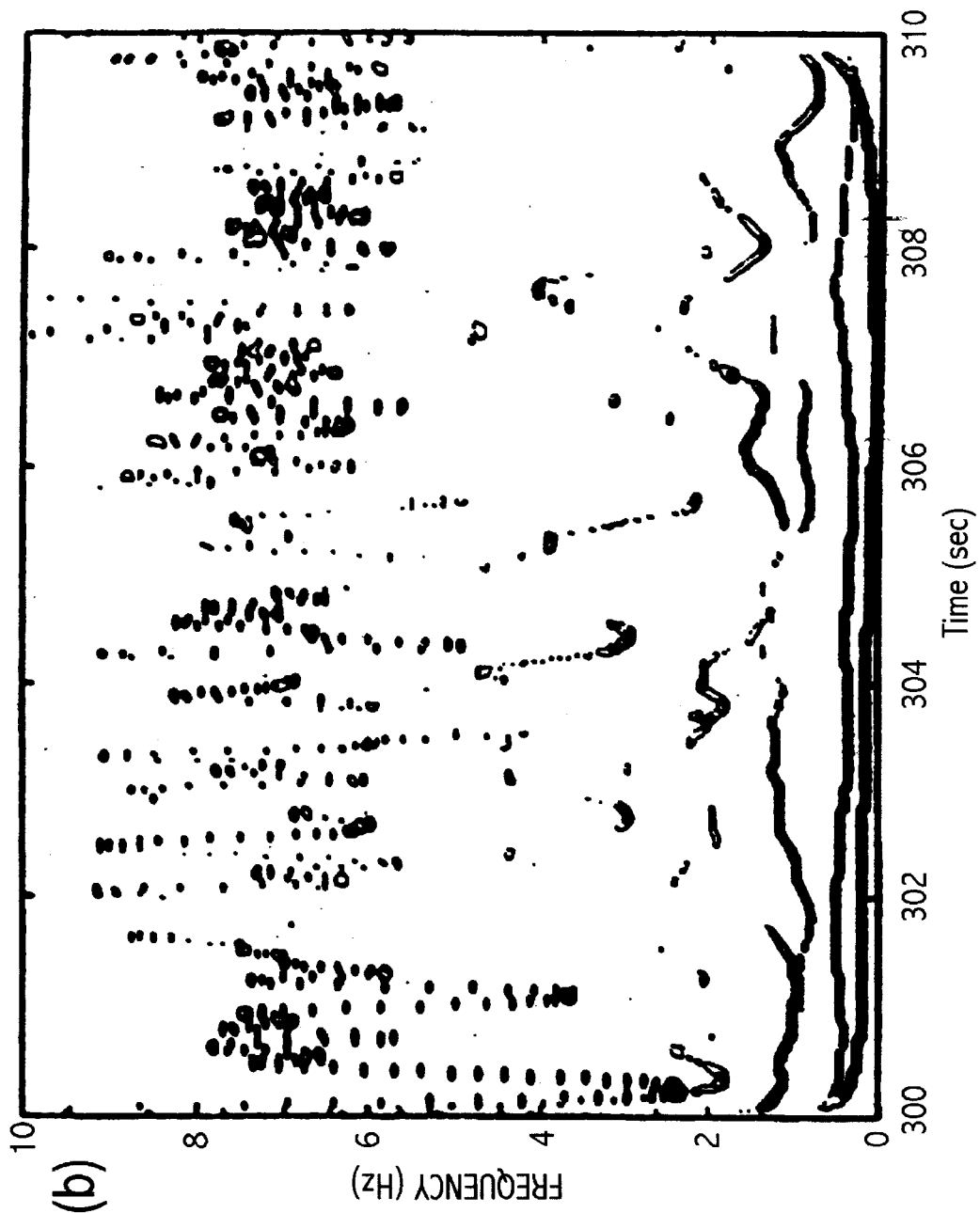
Figure 15A:
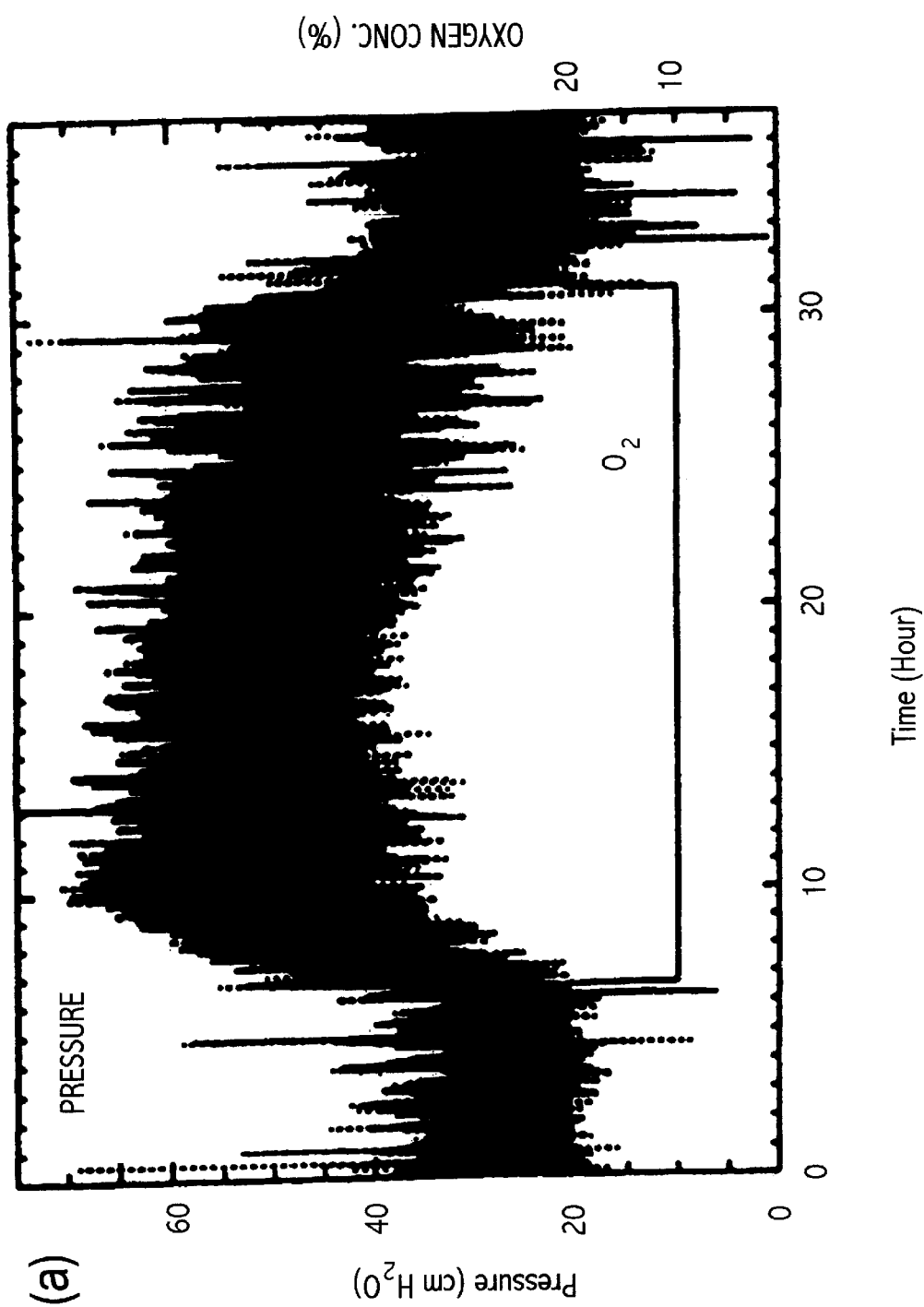
Figure 15B:
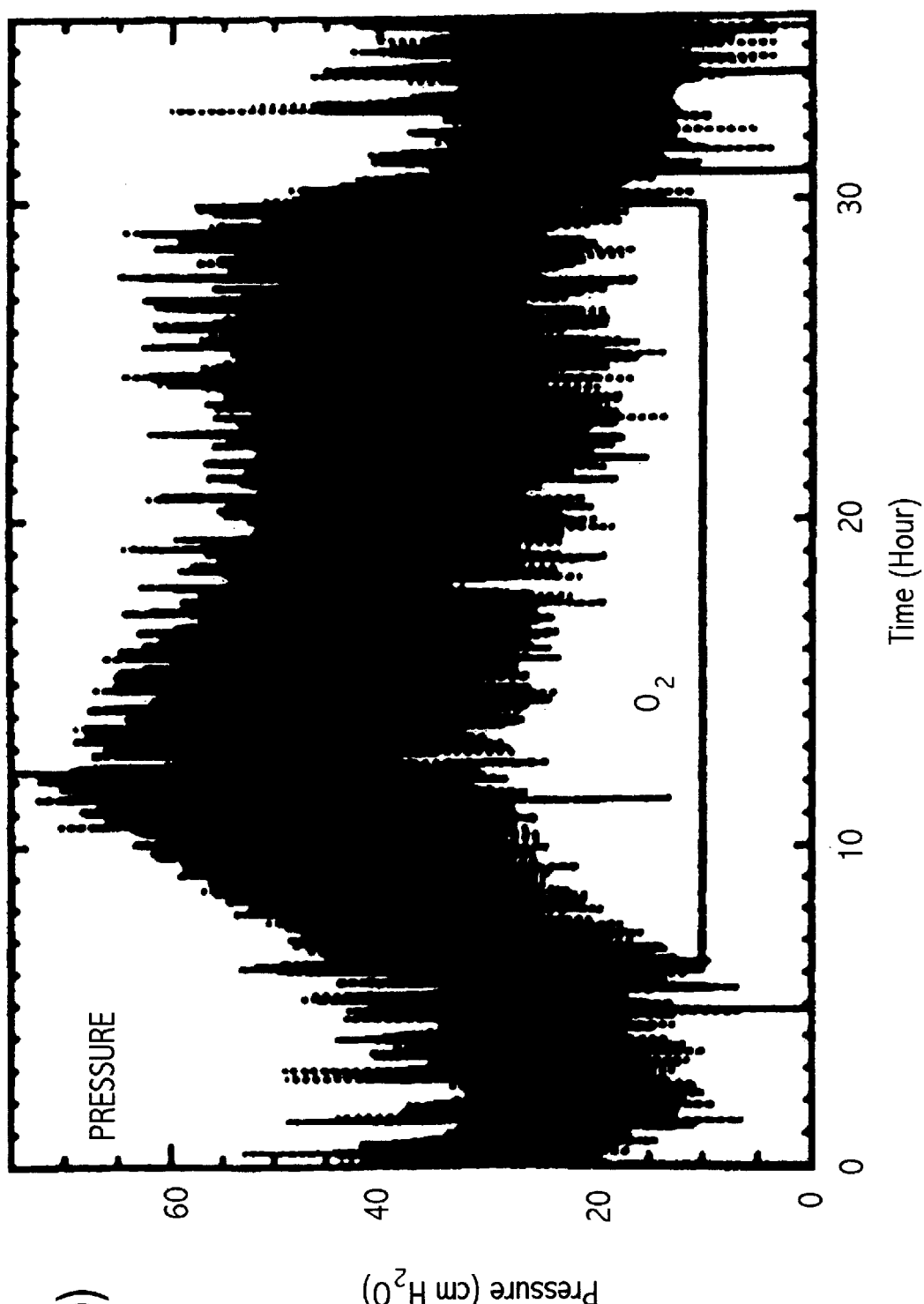
Figure 16A:
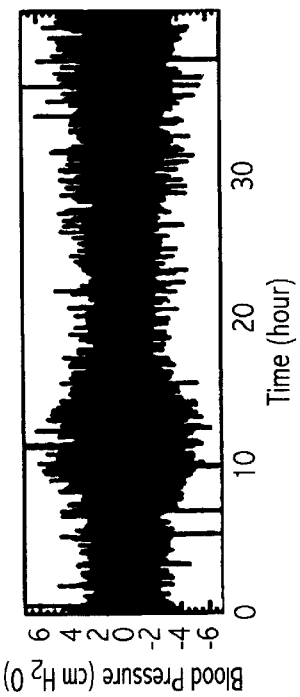
Figure 16B:
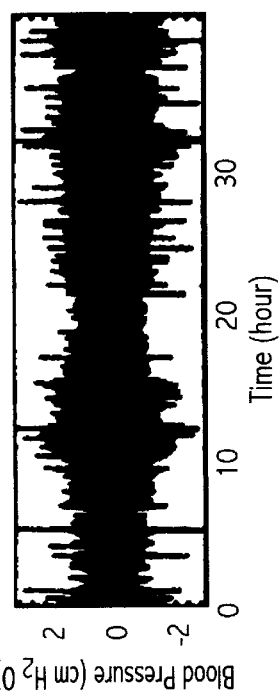
Figure 16C:
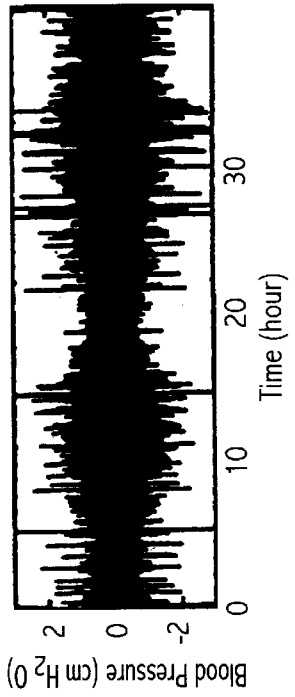
Figure 16D:
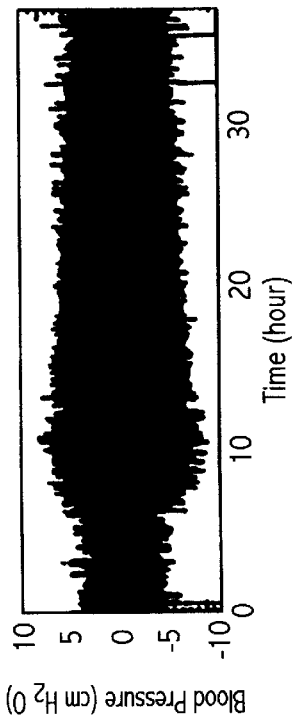
Figure 16E:
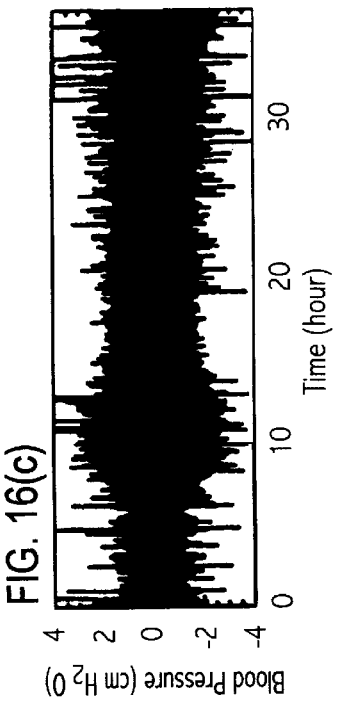
Figure 16F:
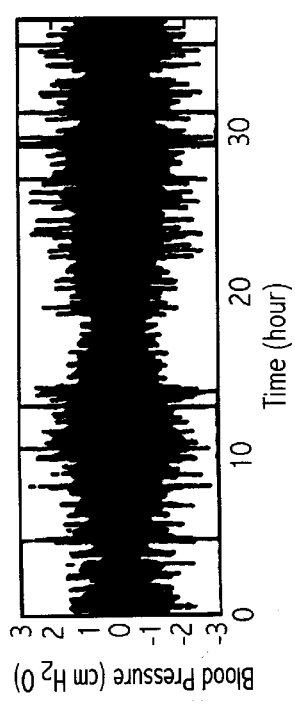
Figure 16H:
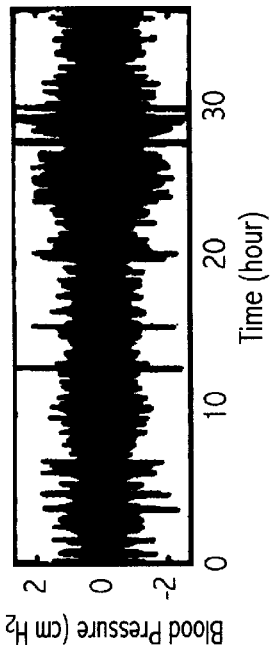
Figure 16J:
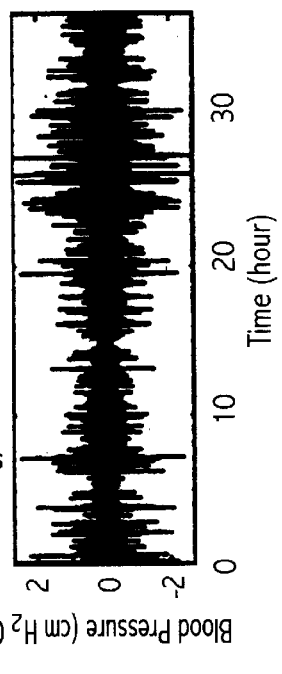
Figure 16L:
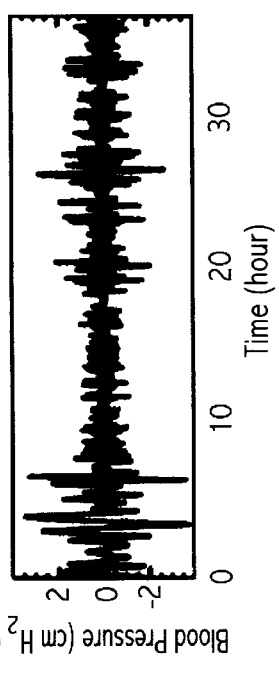
Figure 16G:
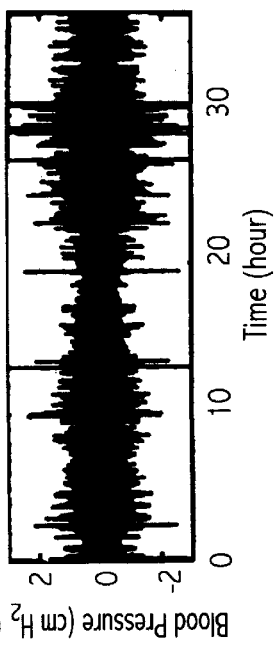
Figure 16I:
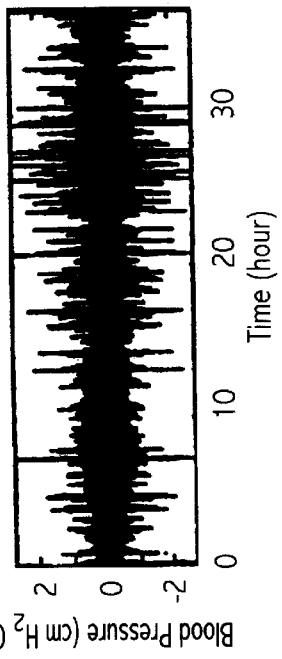
Figure 16K:
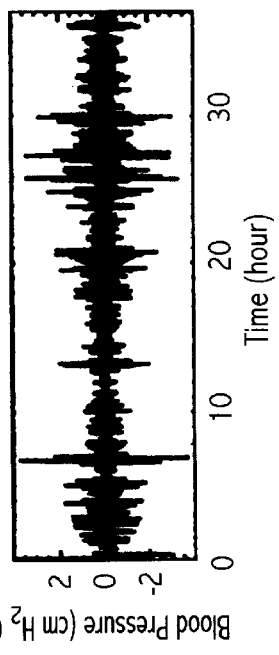
Figure 16M:
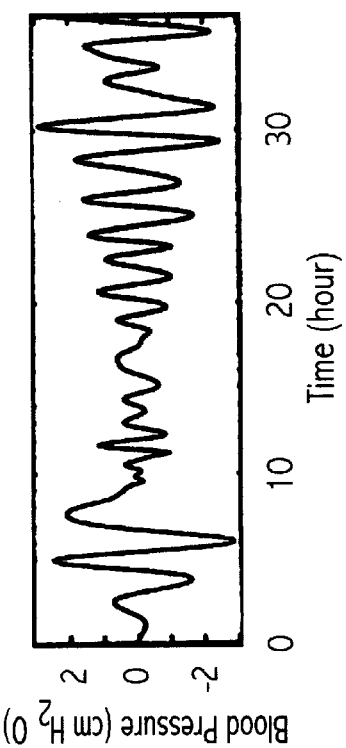
Figure 16N:
Figure 16O:
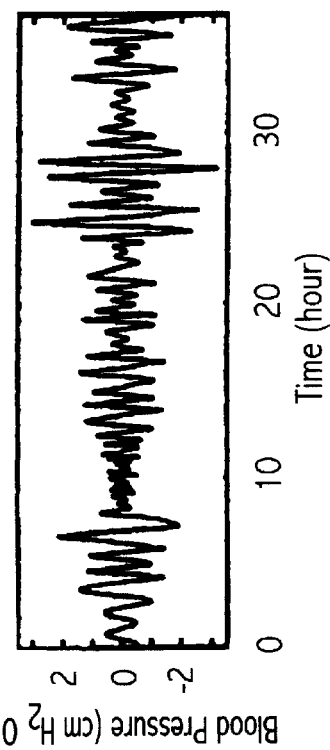
Figure 16P:
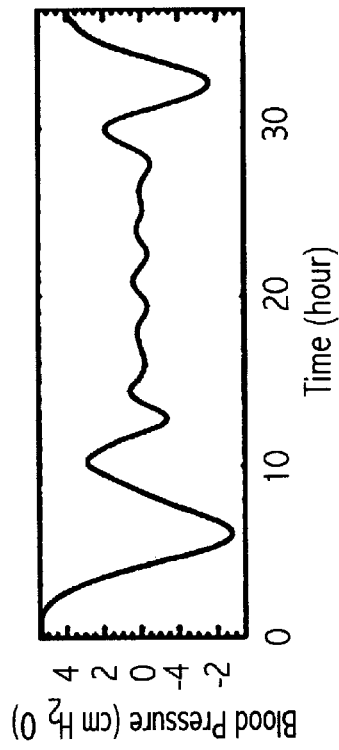
Figure 17A:
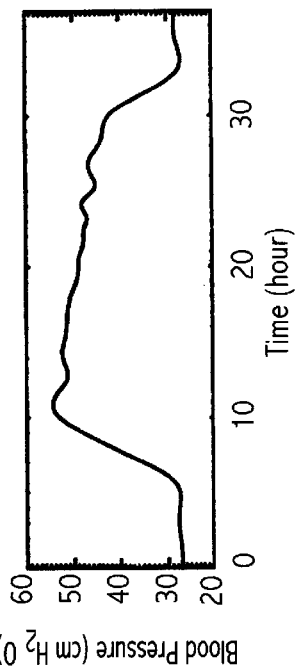
Figure 17C:
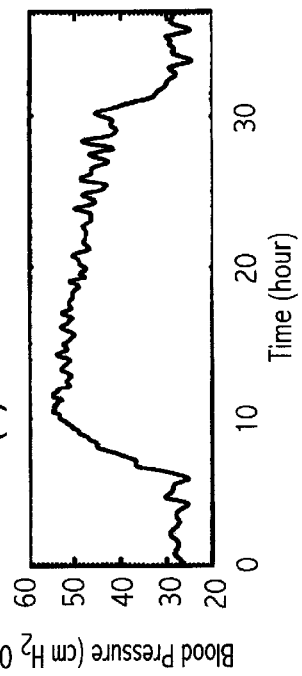
Figure 17E:
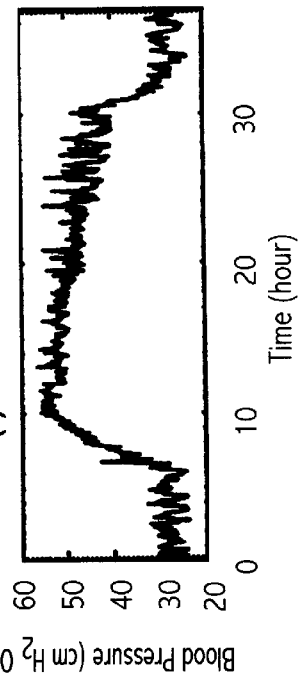
Figure 17B:
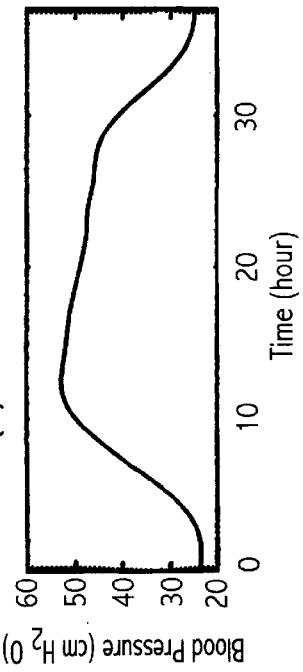
Figure 17D:
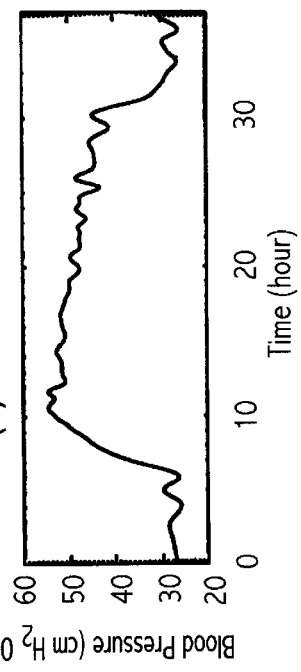
Figure 17F:
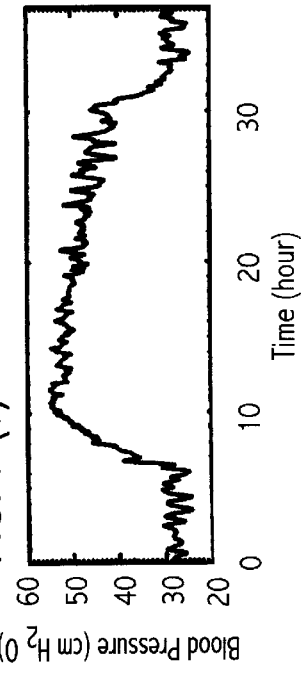
Figure 18A:
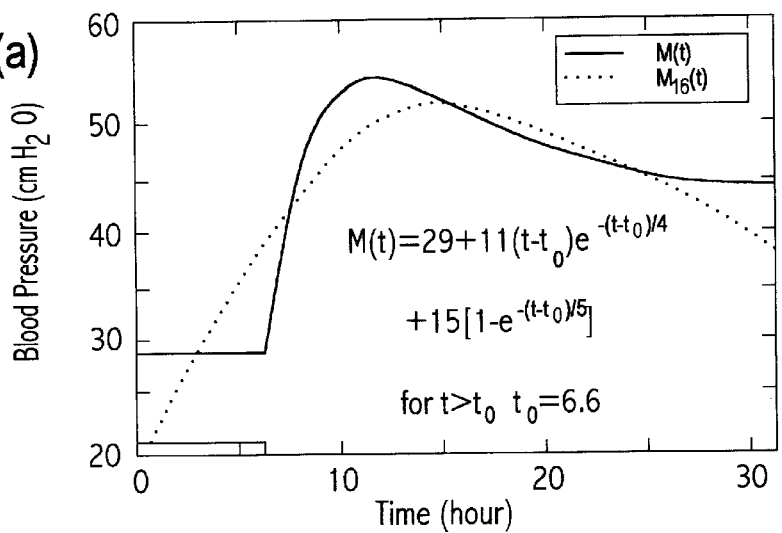
Figure 18B:
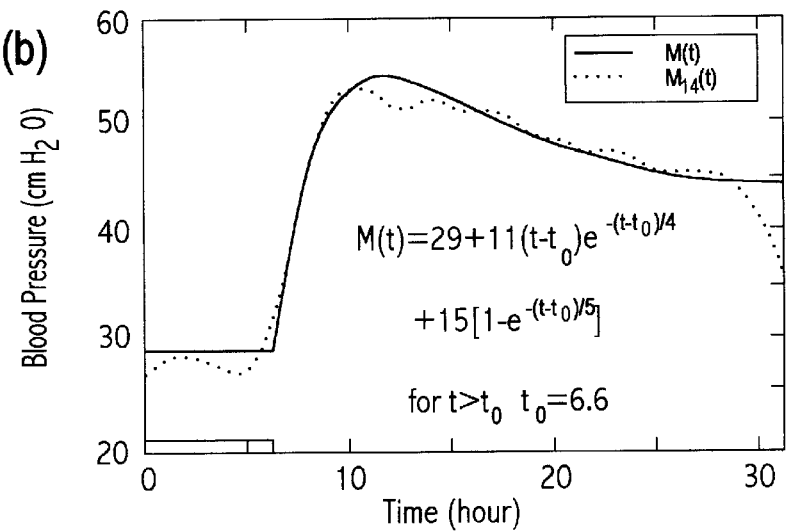
Figure 18C:
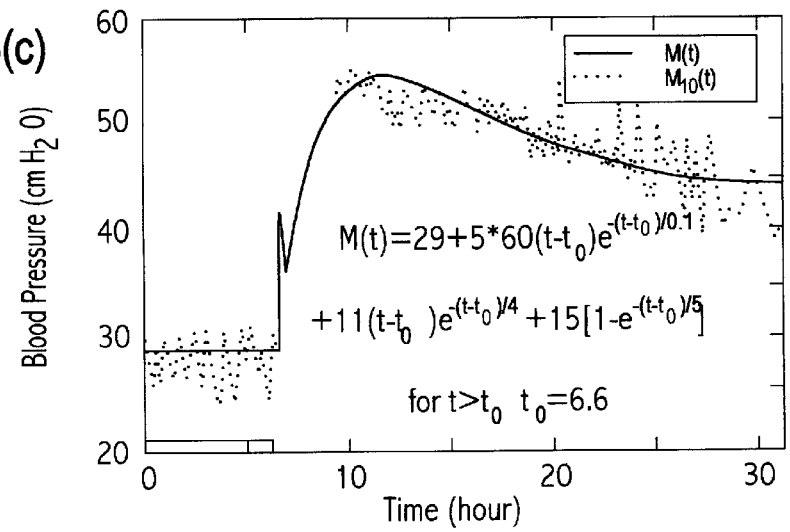
Figure 19A:
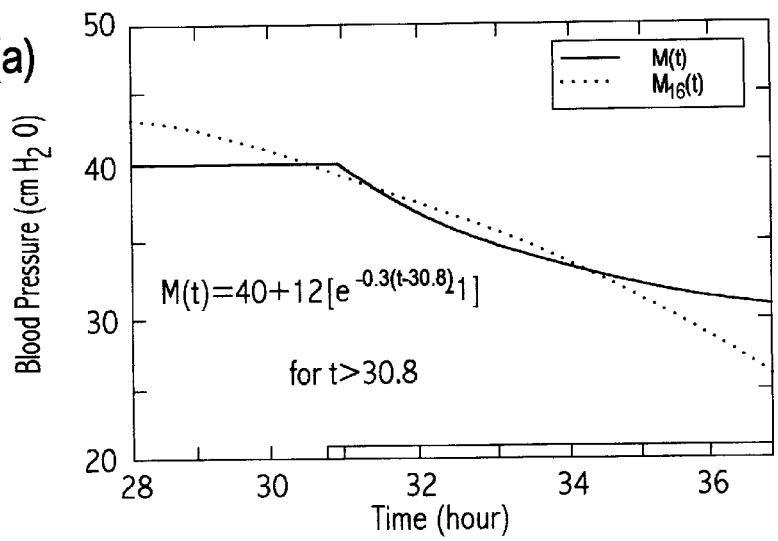
Figure 19B:
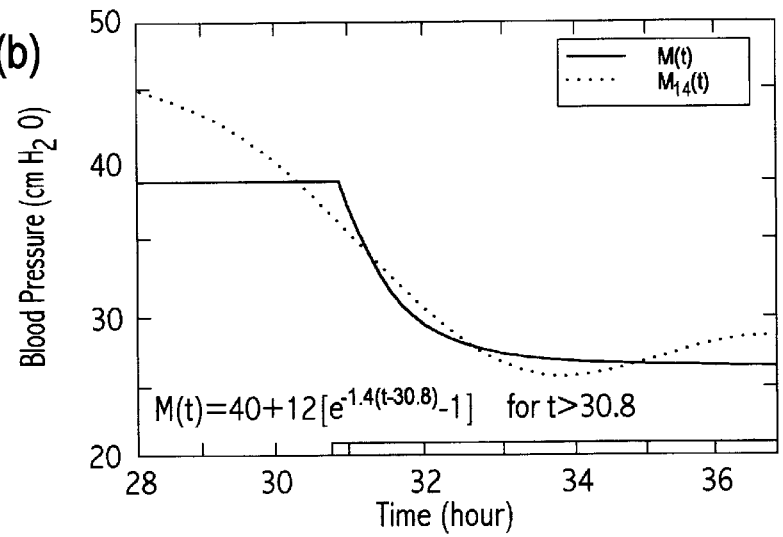
Figure 19C:
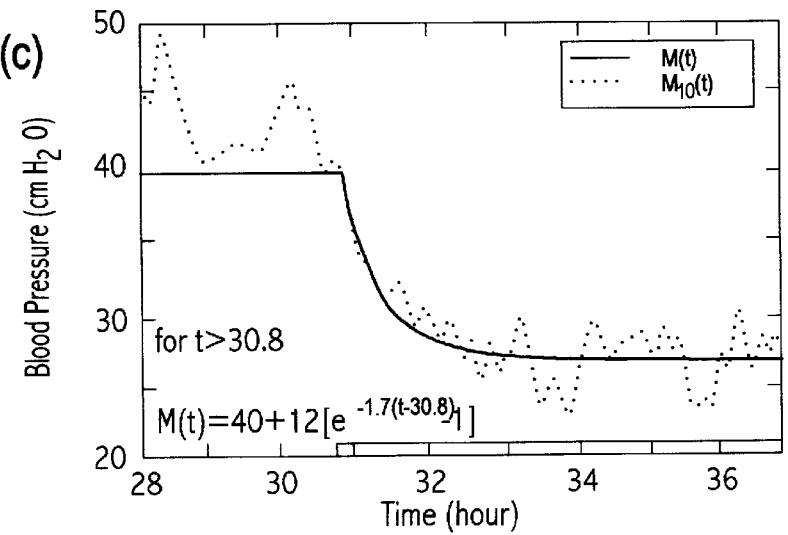
Figure 21:
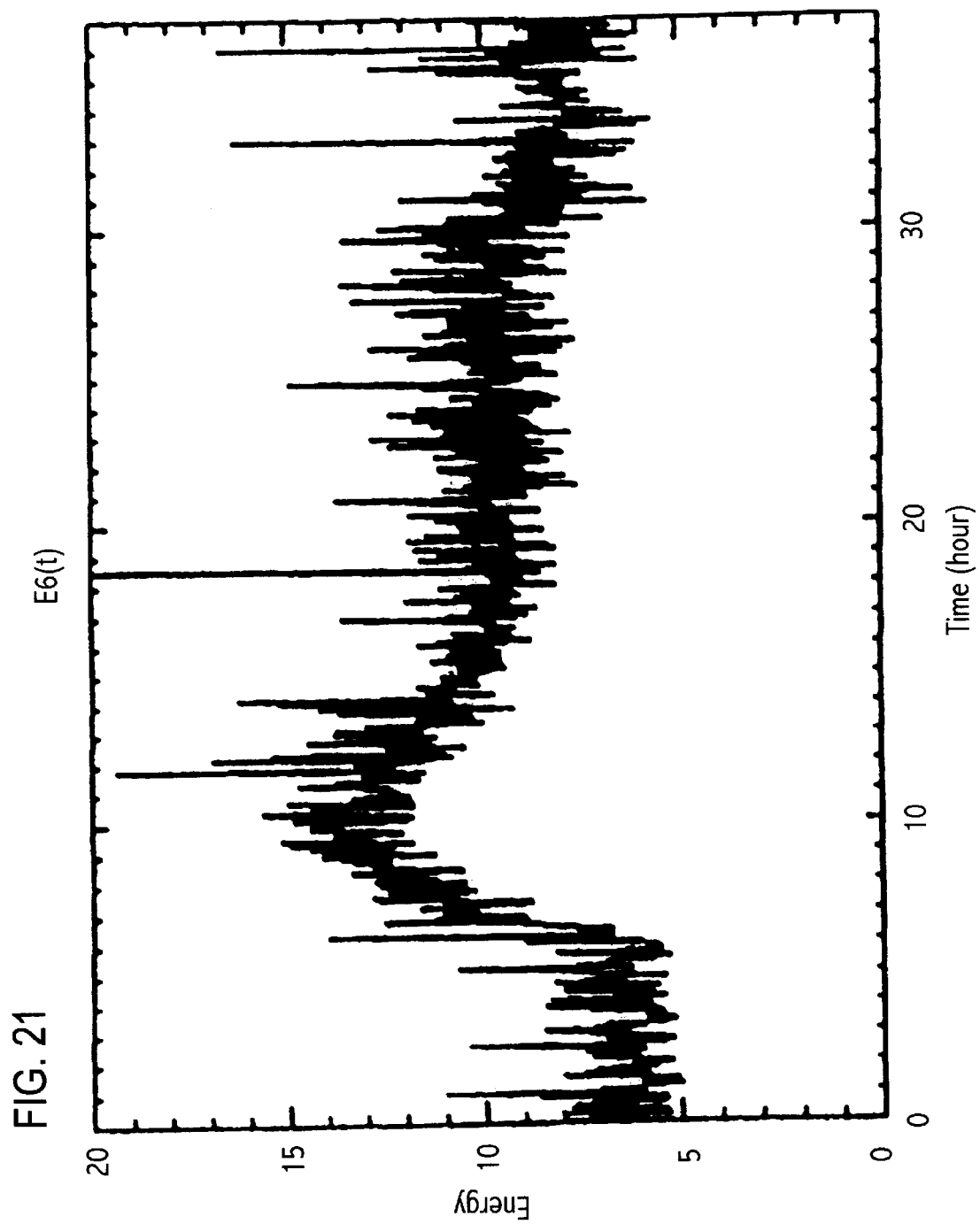
Figure 23A:
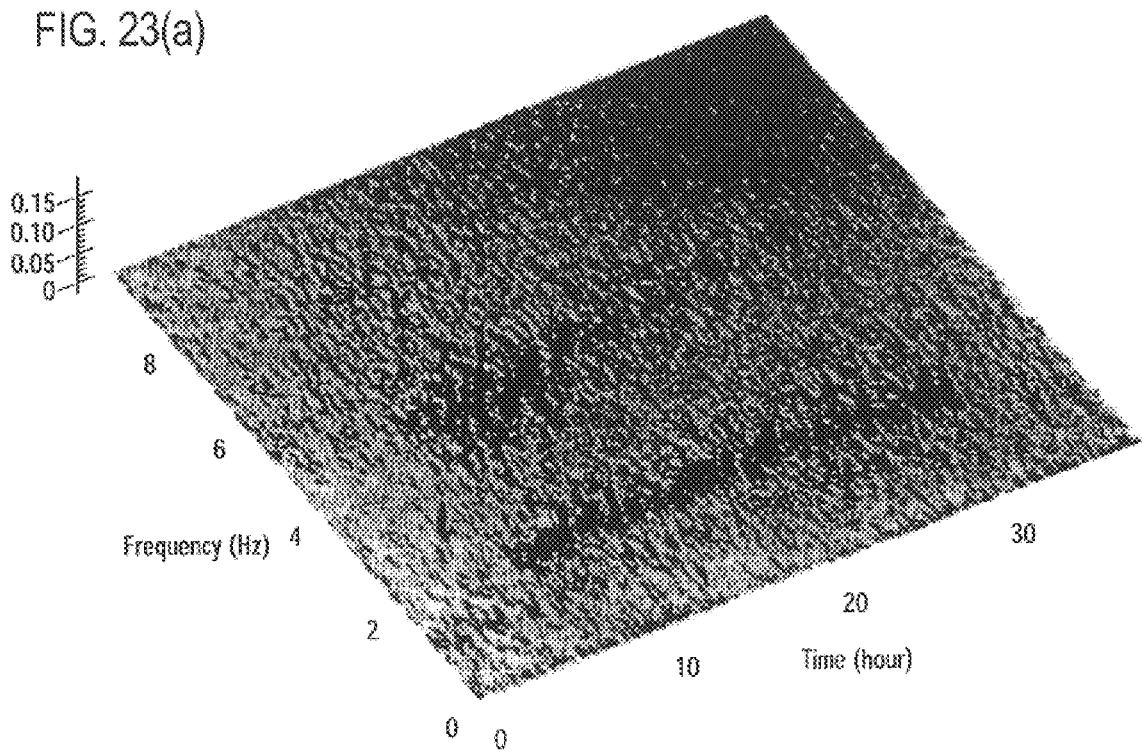
Figure 23B:
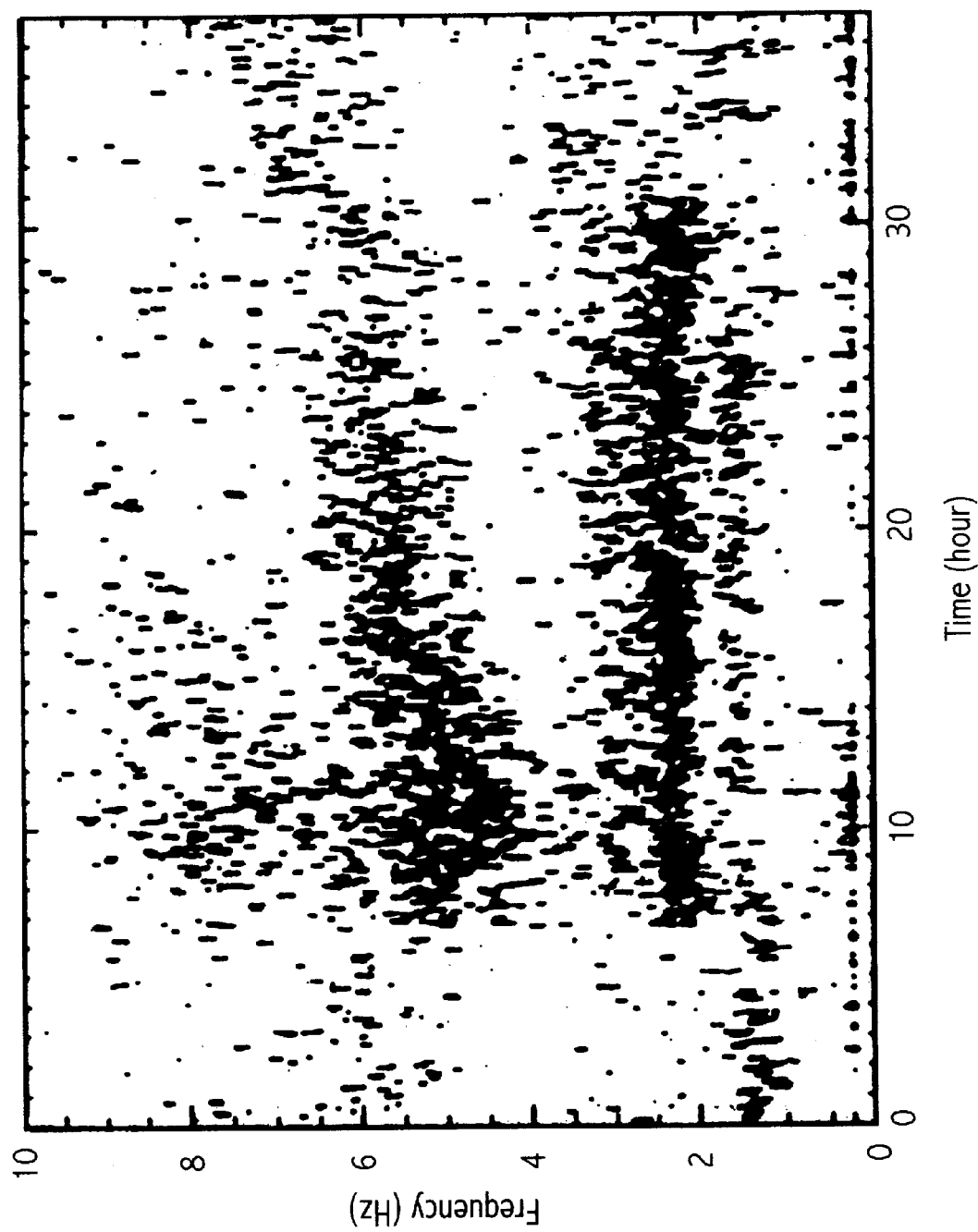
Figure 24:
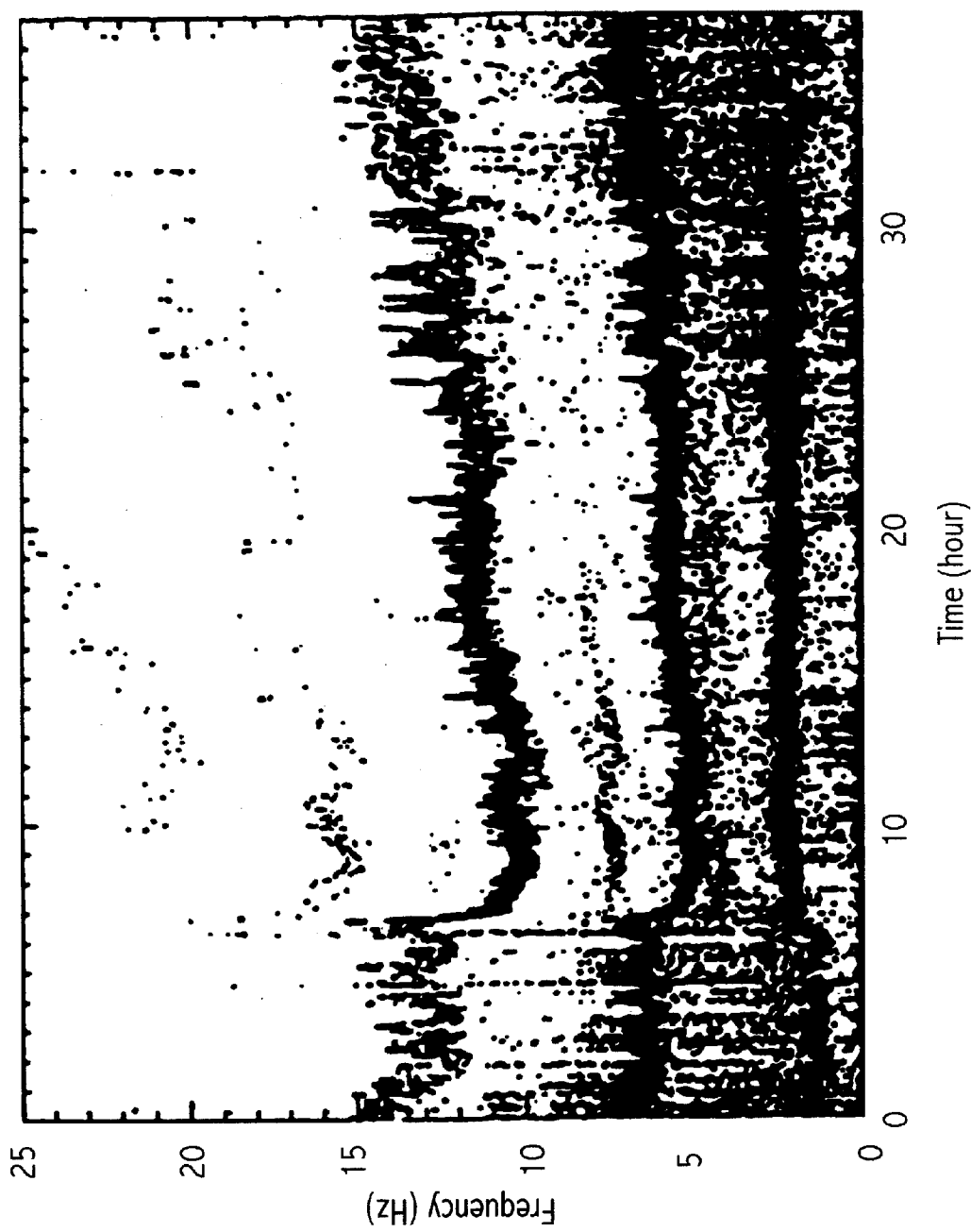
Figure 25:
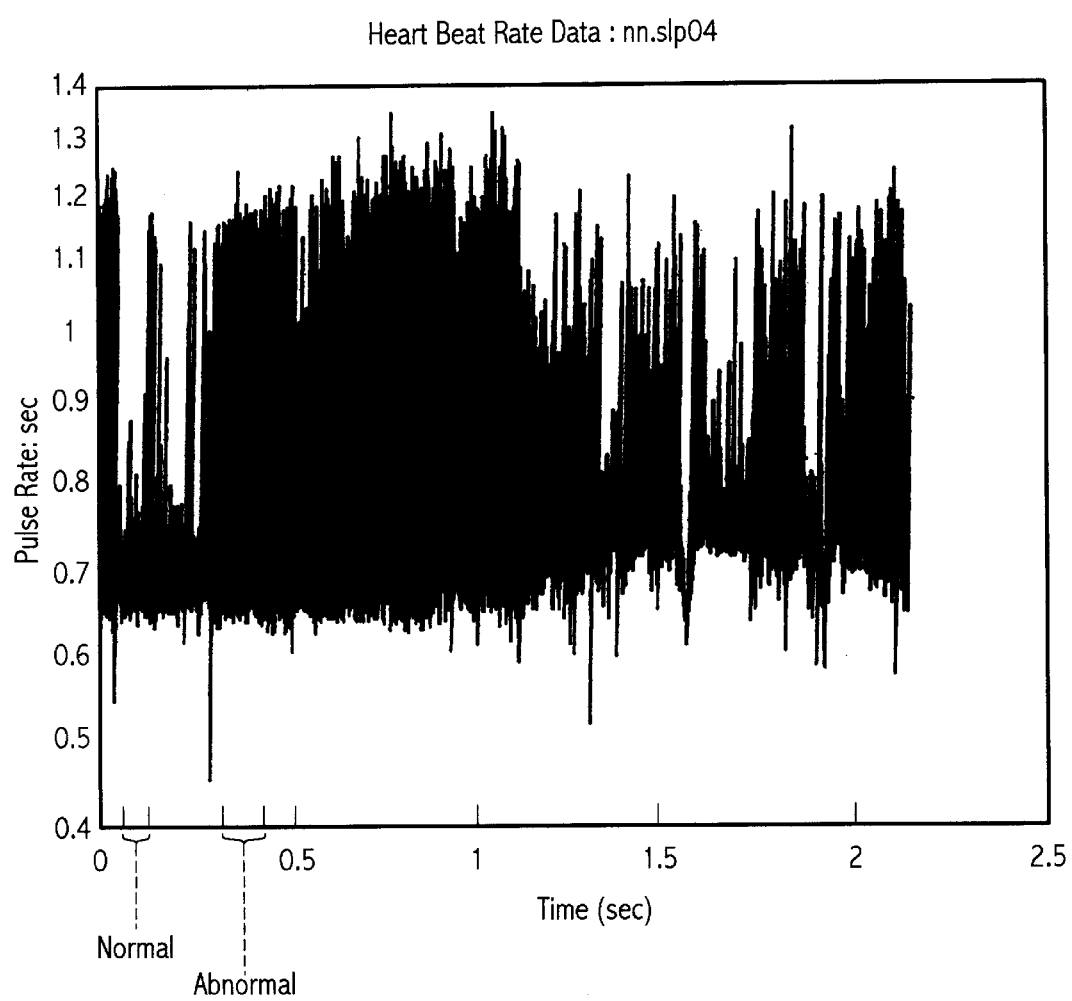
Figure 26:
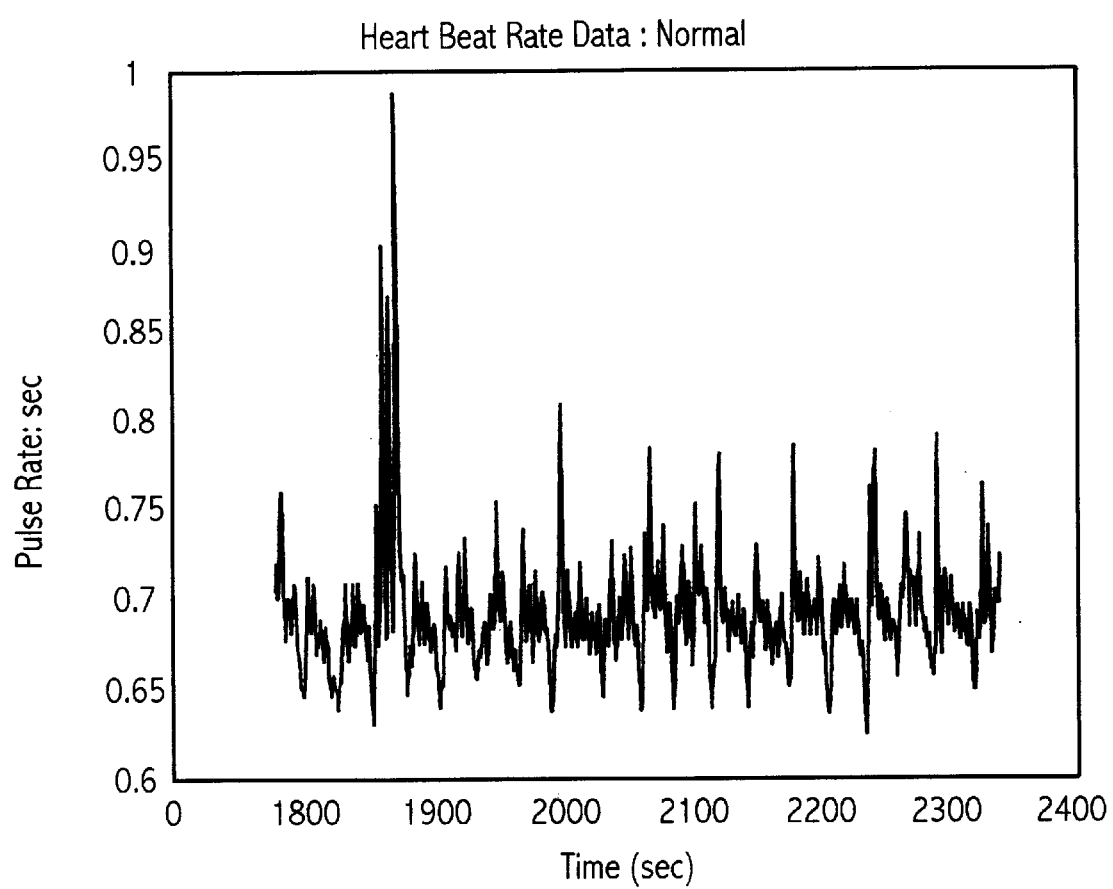
Figure 27:
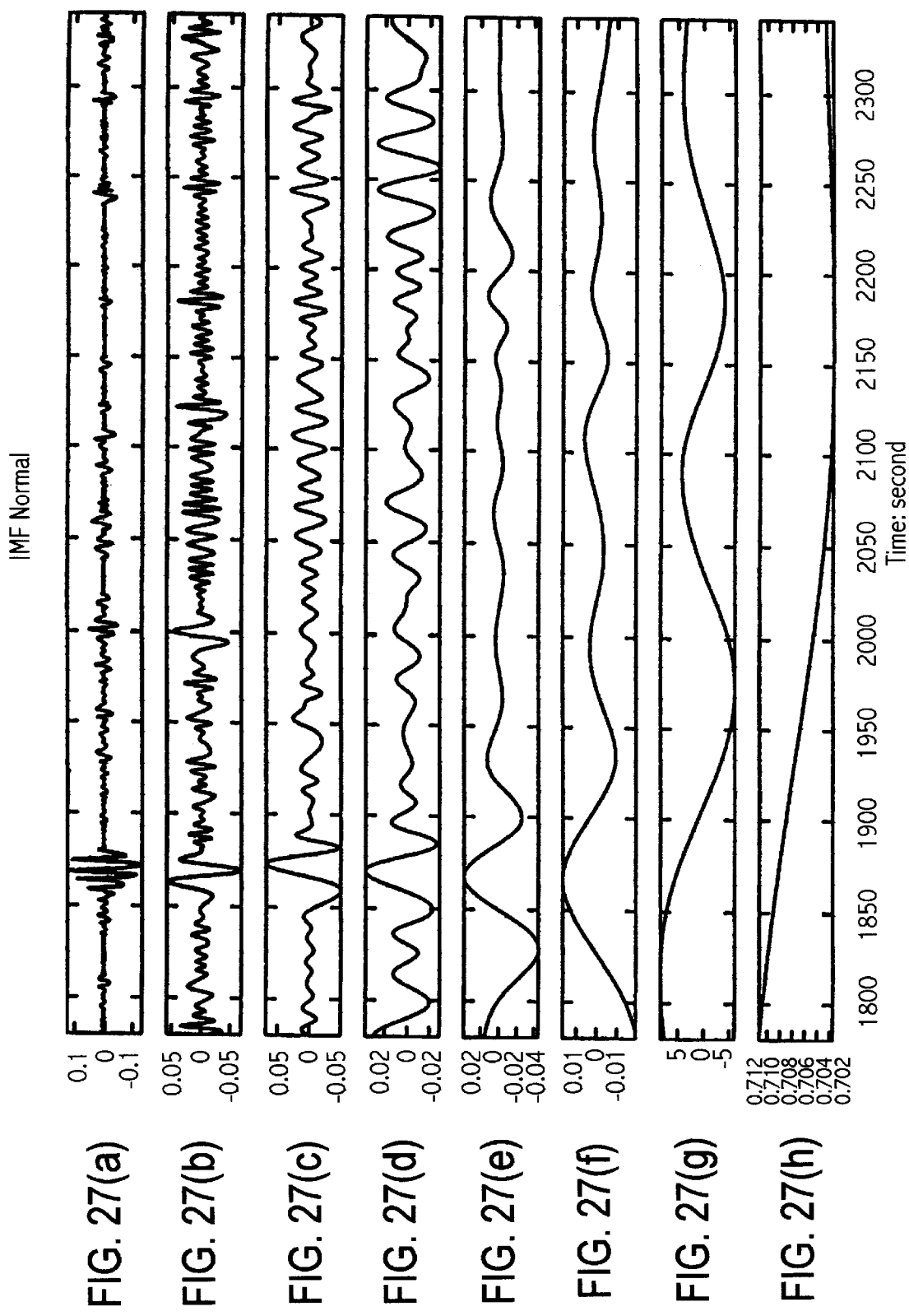
Figure 28:
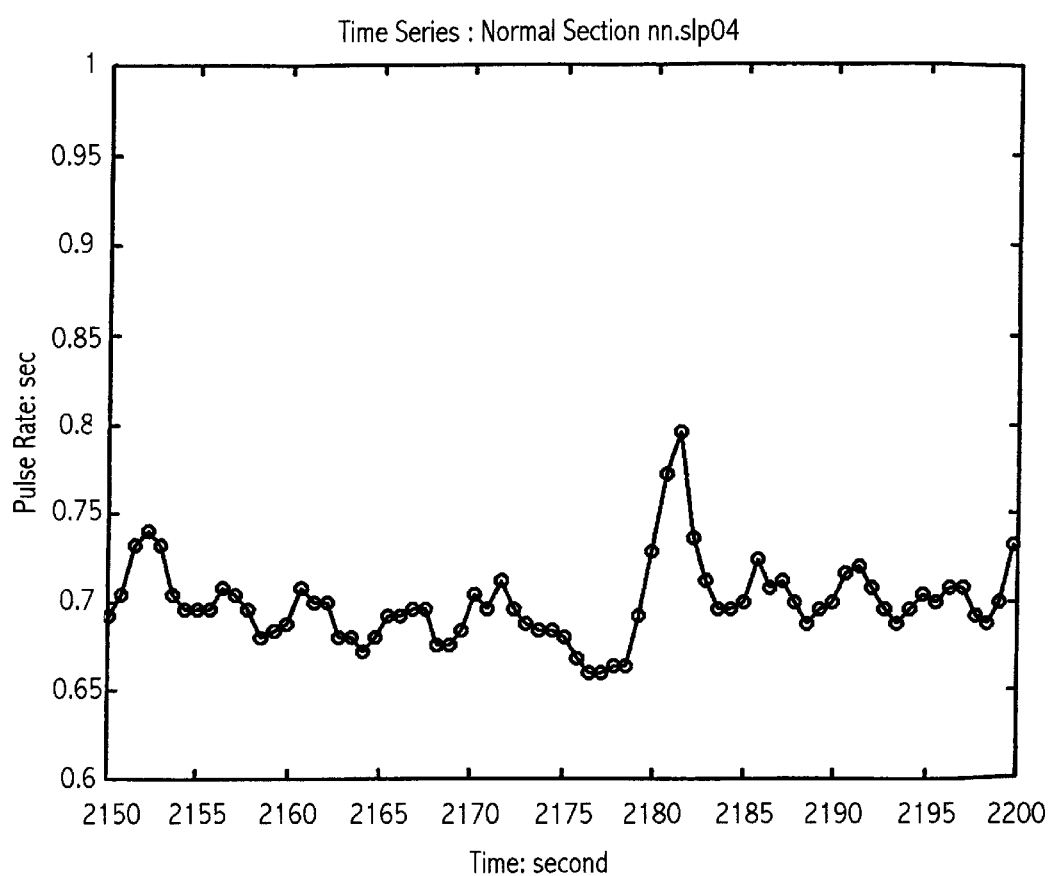
Figure 29:
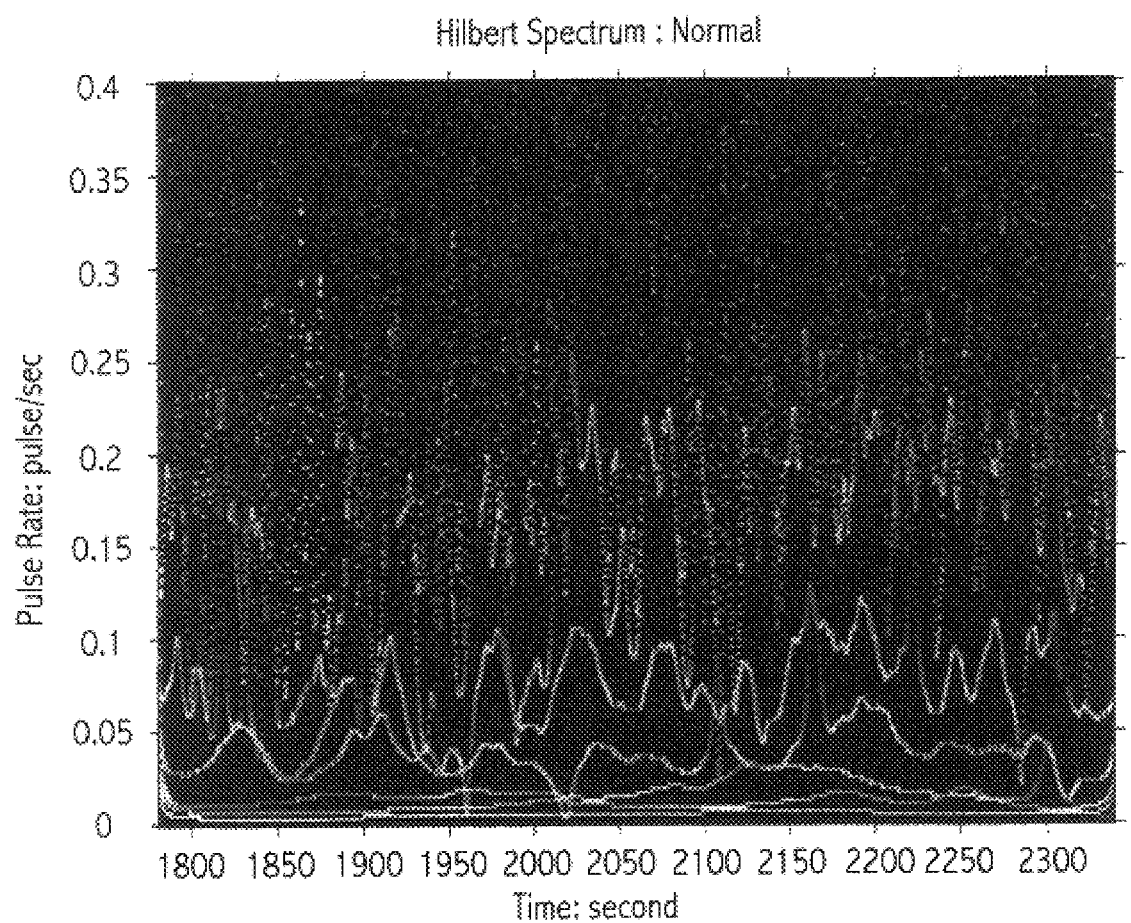
Figure 30:
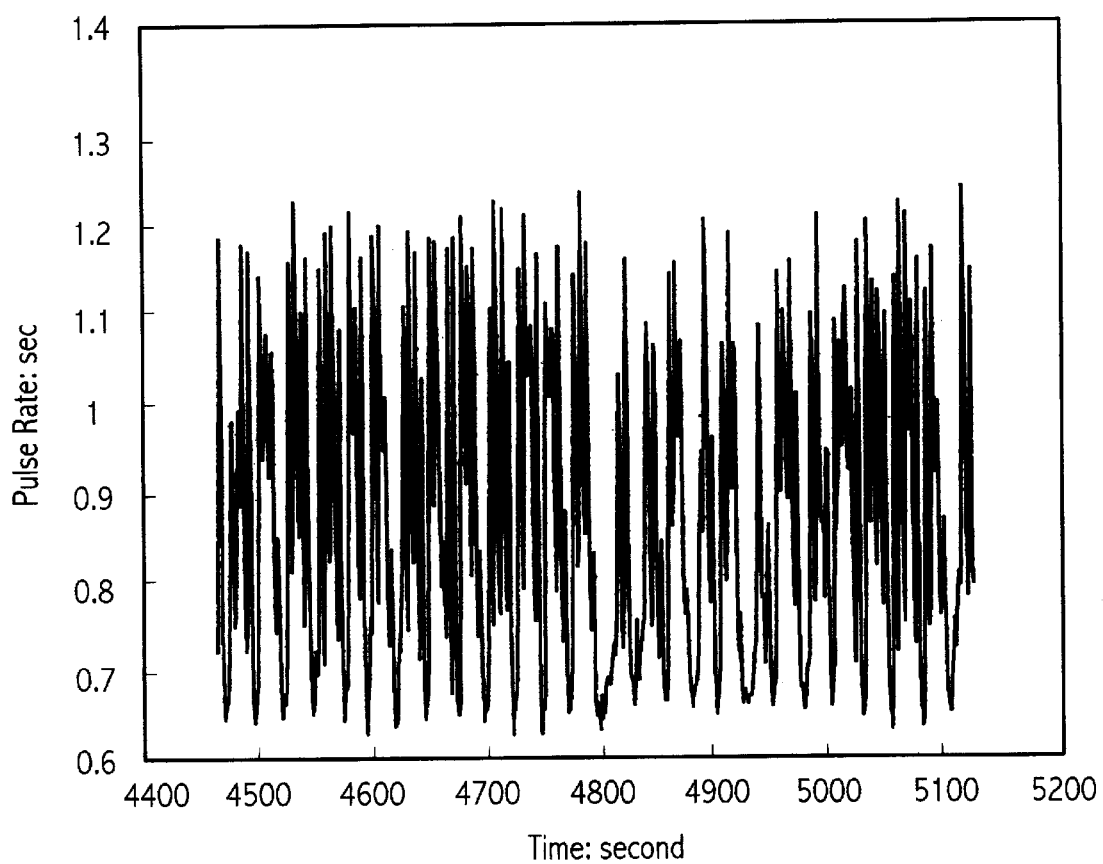
Figure 31:
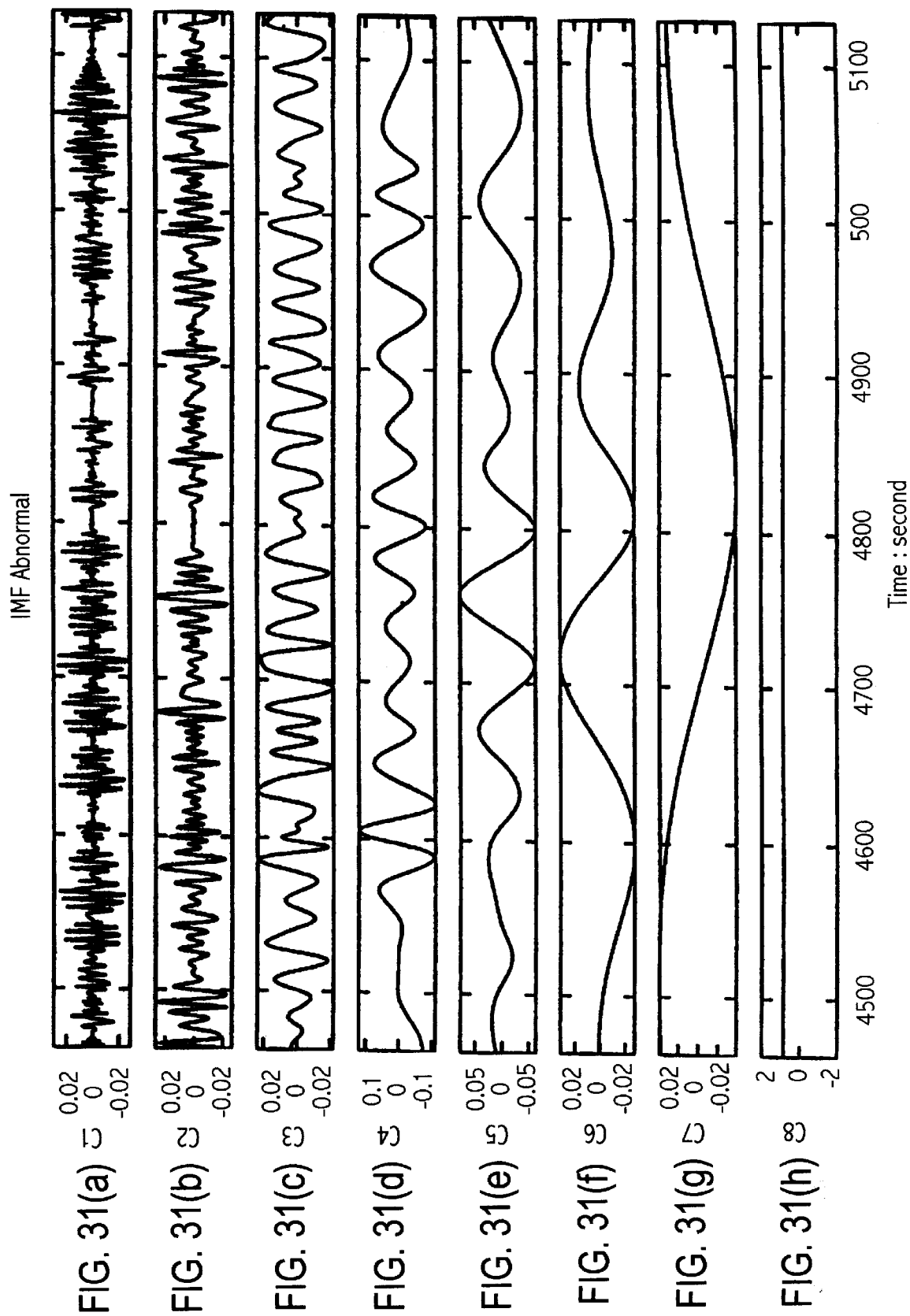
Figure 32:
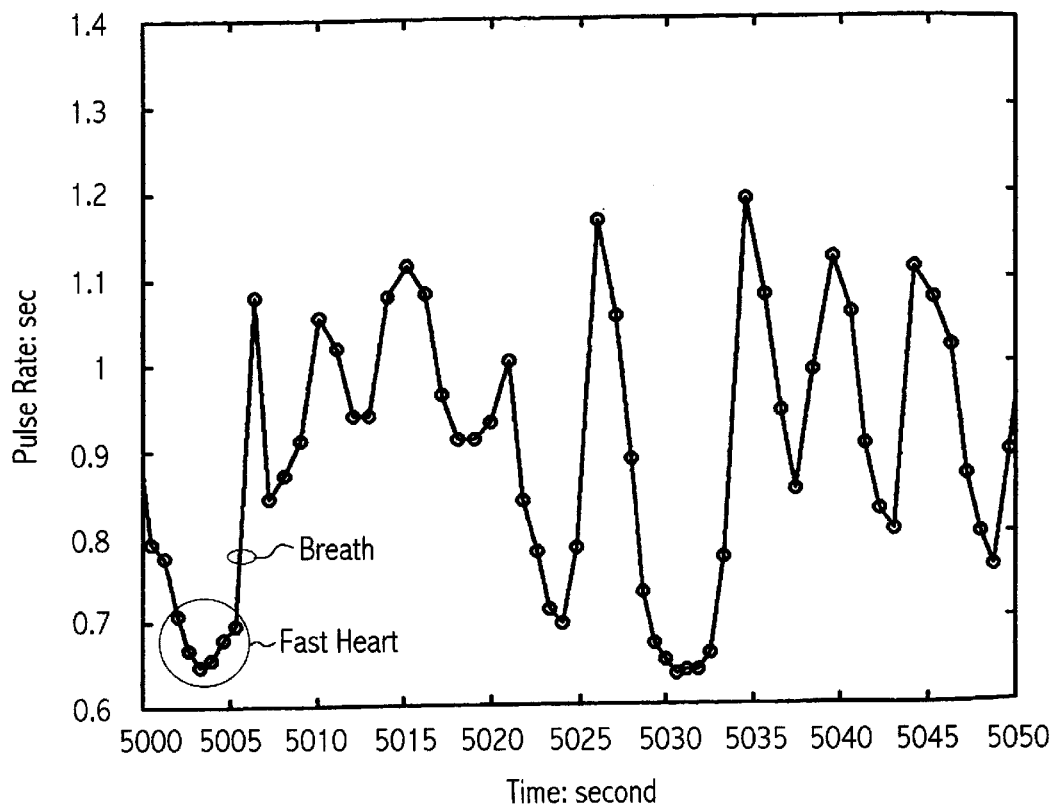
Figure 33:
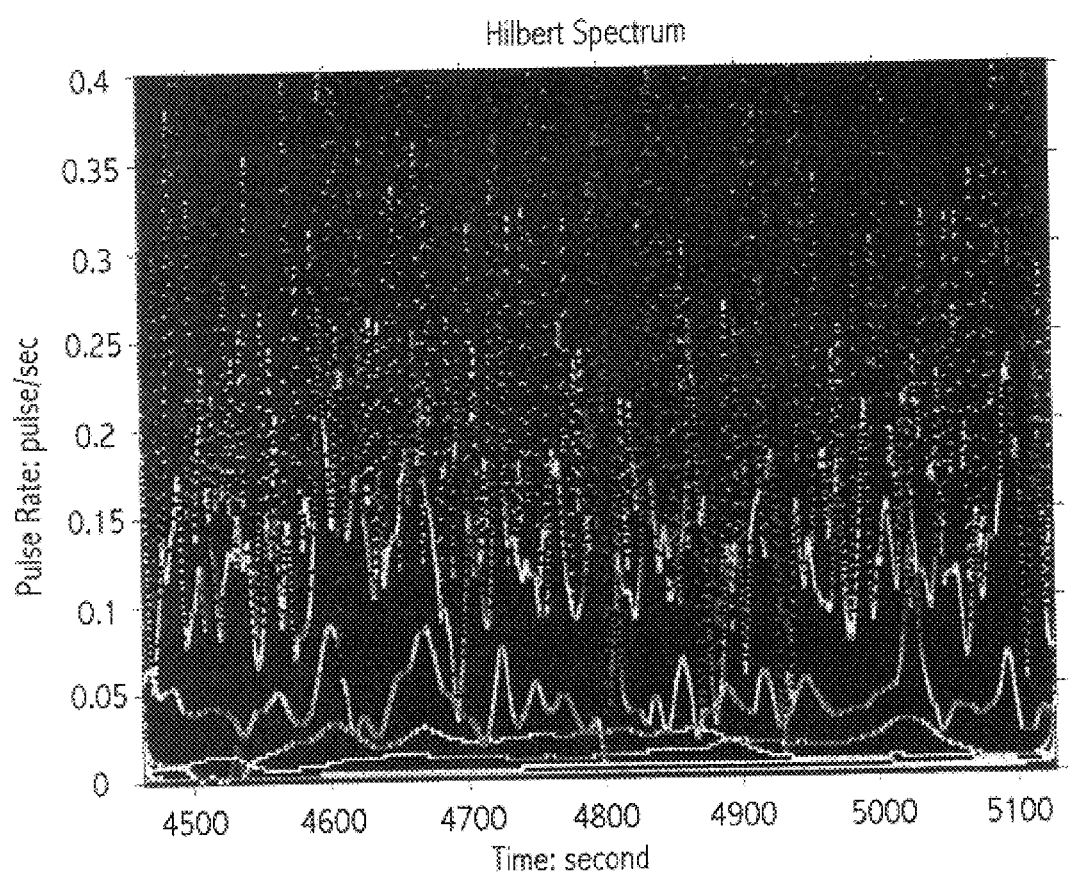
Figure 34:
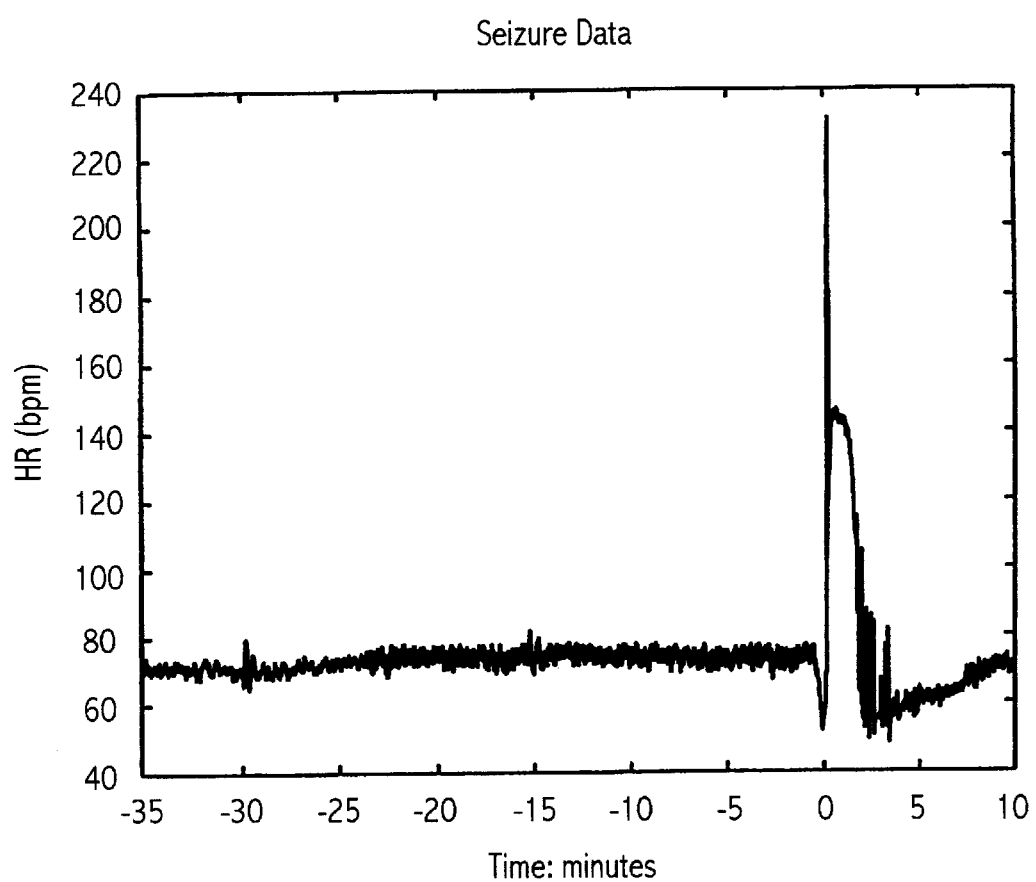
Figure 36A:
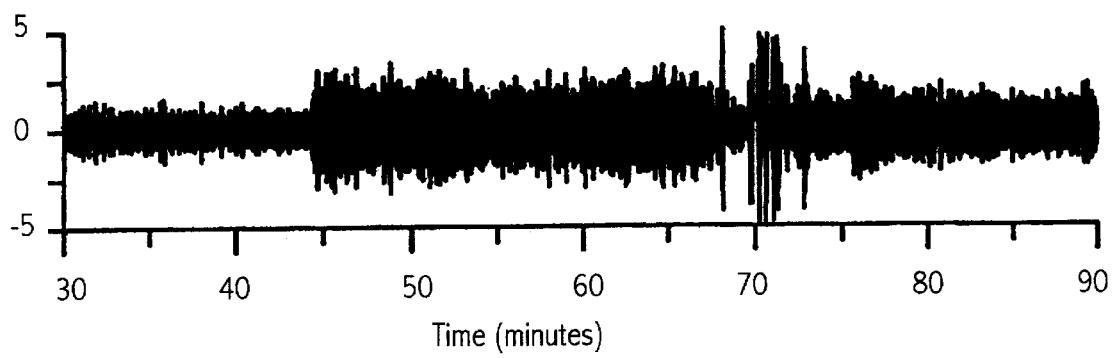
Figure 36B:
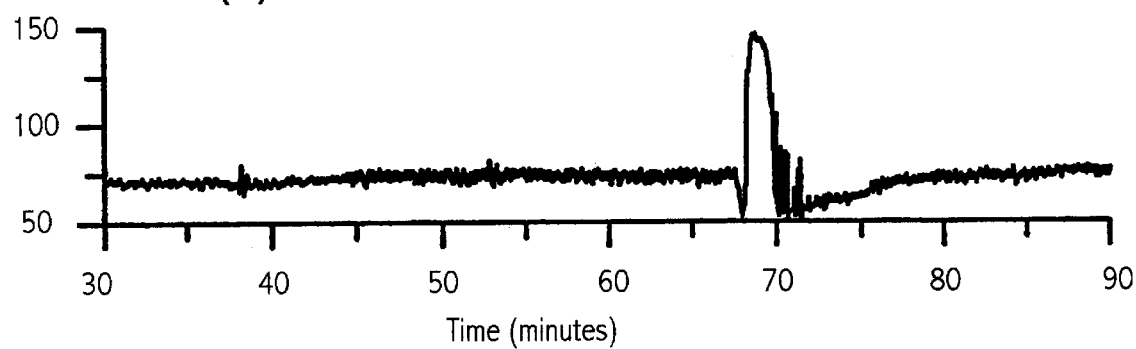
Figure 36C:
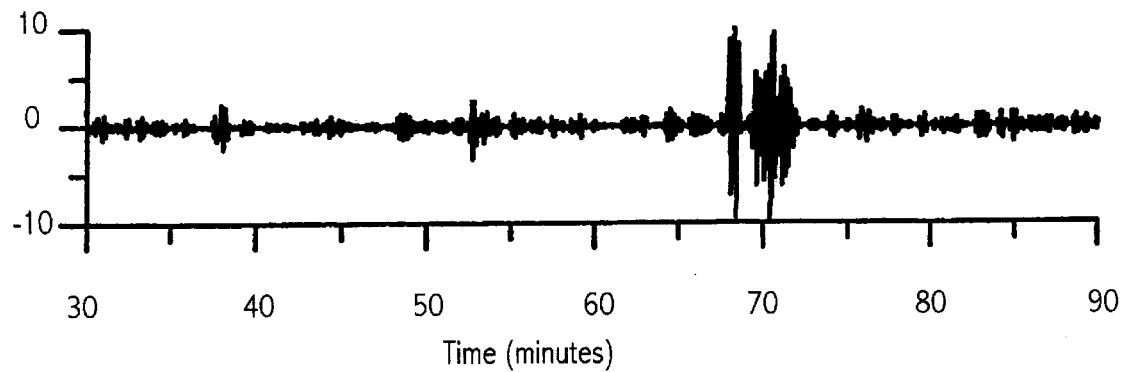
Figure 37:
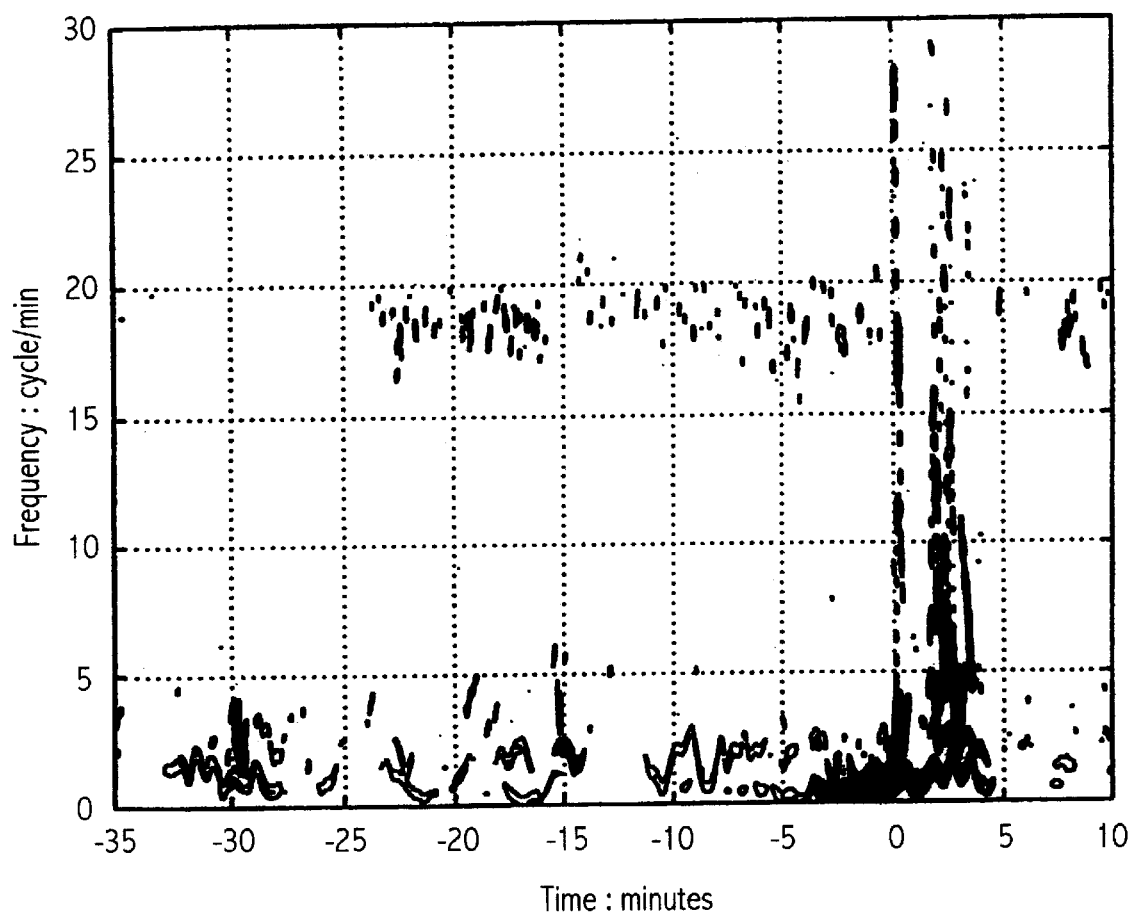
Figure 38:
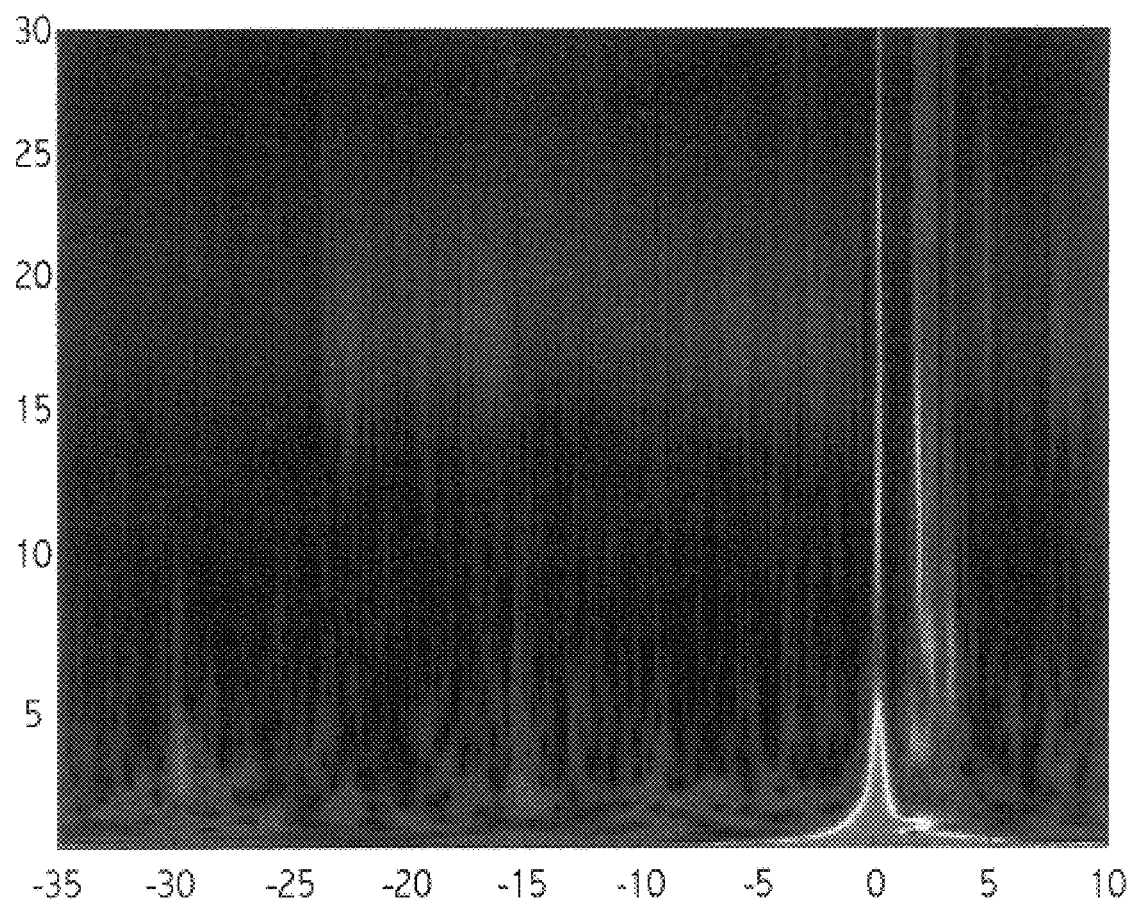

FIG. 4($a$) is a graph of a wind speed signal which is for explaining the computer implemented Empirical Mode Decomposition method of the invention;

FIGS. 4($b$)–($k$) show the wind speed signal and the nine intrinsic mode functions which are extracted from the wind speed signal by the EMD method of the invention;

FIGS. 5($a$)–($j$) are a series of graphs illustrating the successive reconstruction of the original wind speed data from the intrinsic mode functions;

FIG. 6($a$) is the Hilbert Spectrum generated by the invention from the wind speed data of FIG. 4($a$);

FIG. 6($b$) is the conventional Morlet Wavelet spectrum generated from the wind speed data of FIG. 4($a$);

FIG. 6($c$) shows the Hilbert Spectrum of FIG. 6($a$) after smoothing by a 15×15 weighted Gaussian smoothing filter;

FIG. 7 is a comparison of the marginal Hilbert spectrum (solid line) and the Fourier spectrum (dotted line) which were generated from the wind speed signal of FIG. 4($a$);

FIG. 8($a$) is a graph illustrating the Degree of Stationarity and Degree of Statistical Stationarity which were generated from the wind speed signal of FIG. 4($a$) with time averages of 10, 50, 100 and 300;

FIGS. 8($b$) and ($c$) are sections of the wind speed data that was used by the invention to produce the Degree of Stationarity shown in FIG. 8($a$);

FIGS. 9($a$)–($d$), ($f$) and ($g$) are graphs of blood pressure data taken from the pulmonary artery of an normal, active rat which provide examples of biological data that may be processed by the invention;

FIG. 9($e$) shows an envelope linking the systolic pressure extrema values for explaining the concepts of the invention;

FIG. 10($a$) shows a conventional Fourier Spectrum (energy versus frequency) of the blood pressure data from FIG. 9($b$) for illustrating advantages of the invention;

FIGS. 10($b$)–($c$) show conventional Fourier Spectrums (energy versus frequency) of the blood pressure data from FIGS. 9($c$)–($d$) for further illustrating advantages of the invention;

FIG. 10($d$) shows a conventional Fourier Spectrum (time versus frequency) of the blood pressure data from FIG. 9($b$) for illustrating advantages of the invention;

FIGS. 10($e$)–($f$) show conventional three-dimensional dimensional Fourier Spectrum (amplitude of spectrum as a function of frequency in every 1-minute window on the time-frequency plane in linear scales) of the blood pressure data from FIG. 9($b$) for illustrating advantages of the invention;

FIG. 10($g$) is a combined graph directly comparing a conventional Fourier Spectrum and a marginal Hilbert Spectrum according to the invention calculated from the data of FIG. 9($c$);

FIGS. 11($a$)–($h$) are graphs of the first through eighth intrinsic mode functions which are extracted from the blood pressure signal of FIG. 9($c$) by the EMD method of the invention;

FIGS. 12($a$)–($h$) are graphs of the first through eighth intrinsic mode functions which are extracted from the blood pressure signal of FIG. 9($d$) by the EMD method of the invention;

FIGS. 13($a$) and ($b$) are reconstructions of the blood pressure signal of FIG. 9($d$) based on subsets of the intrinsic mode functions;

FIG. 13(c) is another reconstructions of the blood pressure signal of FIG. 9(d) based on a different subset of the intrinsic mode functions plotted together with the original signal (dotted line) of FIGS. 9(d);

FIG. 14(a) is a Hilbert Spectrum of the FIG. 9(d) blood pressure signal calculated according to the invention;

FIG. 14(b) is a Hilbert Spectrum of the FIG. 9(c) blood pressure signal calculated according to the invention;

FIGS. 15(a)–(d) are graphs of pulmonary blood pressure signals in response to step changes in oxygen concentration in the breathing gas;

FIGS. 15(e)–(h) illustrate the inventive sifting process as it is applied to the data of FIGS. 15(b) ;

FIGS. 16(a)–(p) are graphs of the first through sixteenth intrinsic mode functions which are extracted from the blood pressure signal of FIG. 15(a) by the EMD method of the invention;

FIGS. 17(a)–(f) are mean trends of pulmonary arterial blood pressure which are computed according to the invention;

FIGS. 18(a)–(c) are analytic functions derived by the invention and representing the indicial response of pulmonary arterial blood pressure to a step decrease in oxygen concentration from 20.9 to 10.0%;

FIGS. 19(a)–(c) are analytic functions derived by the invention and representing the indicial response of pulmonary arterial blood pressure to a step increase in oxygen concentration from 10.0 to 20.9%;

FIGS. 20(a)–(d) are oscillations about the mean trend as defined by the invention for k=1,2, 4 and 6, respectively;

FIG. 21 shows the Hilbert energy spectrum $E_k(t)$ according to the invention which is calculated from the instantaneous amplitude spectrum of the oscillations about the mean $X_k(t)$ with k=6 (the data from FIG. 20(d));

FIGS. 22(a)–(h) are graphs of the first through sixteenth intrinsic mode functions which are extracted from the Hilbert energy spectrum $E_k(t)$ of FIG. 21 by the EMD method of the invention;

FIGS. 23(a)–(b) show the three dimensional (amplitude-frequency-time) and two-dimensional (contour of amplitude on the frequency-time plane) plot of the Hilbert Spectrum (HHT) taken from the data of FIG. 20(d);

FIG. 24 shows a conventional two dimensional Fourier Spectrum (FFT) of the pressure signal in 1-minute segments under the assumption that the process is stationary in each segment;

FIG. 25 is a graph of heart pulse interval versus time taken from a human with sleep apnea and including both a normal and abnormal (apnea) data section;

FIG. 26 is a graph of a normal heart pulse interval versus time;

FIGS. 27(a)–(h) are graphs of the first through seventh intrinsic mode functions and the residue which are extracted from the normal heart pulse interval data of FIG. 26 by the EMD method of the invention;

FIG. 28 is a blow up of FIG. 26;

FIG. 29 is a Hilbert Spectrum of the FIG. 26 normal heart pulse interval data calculated according to the invention;

FIG. 30 is a graph of an abnormal heart pulse interval versus time;

FIGS. 31(a)–(h) are graphs of the first through seventh intrinsic mode functions and the residue which are extracted from the abnormal heart pulse interval data of FIG. 29 by the EMD method of the invention;

FIG. 32 is a blow up of FIG. 30;

FIG. 33 is a Hilbert Spectrum of the FIG. 30 abnormal heart pulse interval data calculated according to the invention;

FIG. 34 is heart pulse rate data for 45 minute interval during which the patient suffered an epileptic seizure (at time index 0);

FIGS. 35(a)–(i) are graphs of the first through ninth intrinsic mode functions which are extracted from the heart pulse interval data of FIG. 34 by the EMD method of the invention;

FIGS. 36(a)–(c) are the first intrinsic mode function , the original heart pulse interval data, and the third intrinsic mode function of the FIG. 34 epileptic seizure data plotted on an expanded scale, respectively;

FIG. 37 is a Hilbert Spectrum of the FIG. 34 epileptic seizure, heart pulse interval data calculated according to the invention; and FIG. 38 is a conventional Wavelet Spectrum of the FIG. 34 epileptic seizure, heart pulse interval data for comparison with the inventive result of FIG. 37.

DETAILED DESCRIPTION OF PREFERRED EMBODIMENTS

Before describing the computer implemented Empirical Mode Decomposition method in detail and its application to biological data, the definition and physical meaning of intrinsic mode functions in general will be discussed.

Intrinsic Mode Function

An Intrinsic Mode Function (IMF) is a function that satisfies the following two conditions:
(a) in the whole data set, the number of extrema and the number of zero-crossings must either be equal or differ at most by one, and
(b) at any point, the mean value of upper envelope defined by the maxima and the lower envelope defined by the minima is zero.

The first condition shares some similarity to the traditional narrow band requirements for a stationary Gaussian process. The second condition is a totally new idea. Conceptually, the second condition modifies the classical global requirement to a local one. Furthermore, the second condition has the desirable result that the instantaneous frequency will not have unwanted fluctuations induced by asymmetric wave forms. Mathematically, the second condition should ideally be 'the local mean of the data being zero.' For nonstationary data, the 'local mean' requires a 'local time scale' to compute the mean, which is impossible to define. Fortunately, the local time scale need not be defined to fulfil the second condition, as will be discussed below.

To apply these concepts to physical data, the invention utilizes the local mean of the signal envelopes to force the local symmetry.

The signal envelopes are defined by the local maxima and the local minima. This is an approximation which avoids the definition of a local averaging time scale.

With the physical approach and the approximation adopted here, the inventive method does not always guarantee a perfect instantaneous frequency under all conditions. Nevertheless, it can be shown that, even under the worst conditions, the instantaneous frequency so defined is still consistent with the physics of the system being studied and represents the system being studied much more accurately than previous techniques based on Fourier analysis.

The term "Intrinsic Mode Function" is adopted because it represents the oscillation mode embedded in the data. With this definition, the IMF in each cycle, defined by the zero-crossings, involves only one mode of oscillation. In other words, each IMF represents only one group of oscillation modes or time scales and no riding waves are allowed.

Before presenting the inventive EMD method for decomposing the data into IMFs, a qualitative assessment of the intrinsic oscillatory modes may be roughly determined by simply examining the data by eye. From this examination, one can immediately identify the different scales directly in two ways: the time lapse between the successive alternations of local maxima and minima and the time lapse between the successive zero-crossings reveals the different scales. The interlaced local extrema and zero-crossings give us complicated data: one undulation is riding on top of another, and they, in turn, are riding on still other undulations, and so on. Each of these undulations defines a characteristic scale or oscillation mode that is intrinsic to the data: hence, the term "Intrinsic Mode Function" is adopted.

To reduce the data into the needed IMFs, the invention utilizes a computer implemented Empirical Mode Decomposition Method which is described below.

Empirical Mode Decomposition (EMD)

The Sifting Process

First, the Empirical Mode Decomposition method which deals with both nonstationary and nonlinear data will be discussed. Then, the physical meaning of this decomposition will be presented.

The essence of the EMD method is to identify empirically the intrinsic oscillatory modes by their characteristic time scales in the data, and then decompose the data accordingly. The decomposition is based on the following assumptions:

a. the signal has at least two extrema: one maximum and one minimum, and b. the characteristic time scale is defined by the time lapse between the extrema.

In other words, the invention adopts the time lapse between successive extrema as the definition of the time scale for the intrinsic oscillatory mode because it gives a much finer resolution of the oscillatory modes and because it can be applied to data with non-zero mean (either all positive or all negative values, without zero-crossings). A systematic way to extract the intrinsic mode functions is the computer implemented Empirical Mode Decomposition method or Sifting Process which is described as follows.

FIG. 1(a) illustrates the overall inventive method including the Sifting Process in step 120. First, the physical activity, process or phenomenon is sensed by an appropriate sensor in step 100. Appropriate sensors for detecting the physical activity and generating a physical signal representative thereof are discussed in the practical examples below. As an equivalent alternative, the physical signal can be inputted in step 100.

After sensing in step 100, the analog signal is converted to the digital domain suitable for computer processing in the A/D conversion step 105. Depending upon whether the input signal is analog or digital step 105 may be bypassed.

Next, an optional smoothing step 110 may be applied to the physical signal. The optional smoothing step 110 may be applied to smooth the signal with, for example, a weighted running average to remove excessive noise.

Thereafter, the Sifting Process is applied in step 120 to Sift the signal with the Empirical Mode Decomposition method and thereby extract the intrinsic mode function(s). The intrinsic mode functions can then be displayed as shown in step 130 and checked for orthogonality in step 135.

Before continuing with the main flow in FIG. 1(a), the details of the Sifting Process will be explained with reference to the high level flowchart in FIGS. 2(a), 2(b) and the series of graphs showing illustrative results of the Sifting Process in FIGS. 3(a)–(f).

Figure 3A:
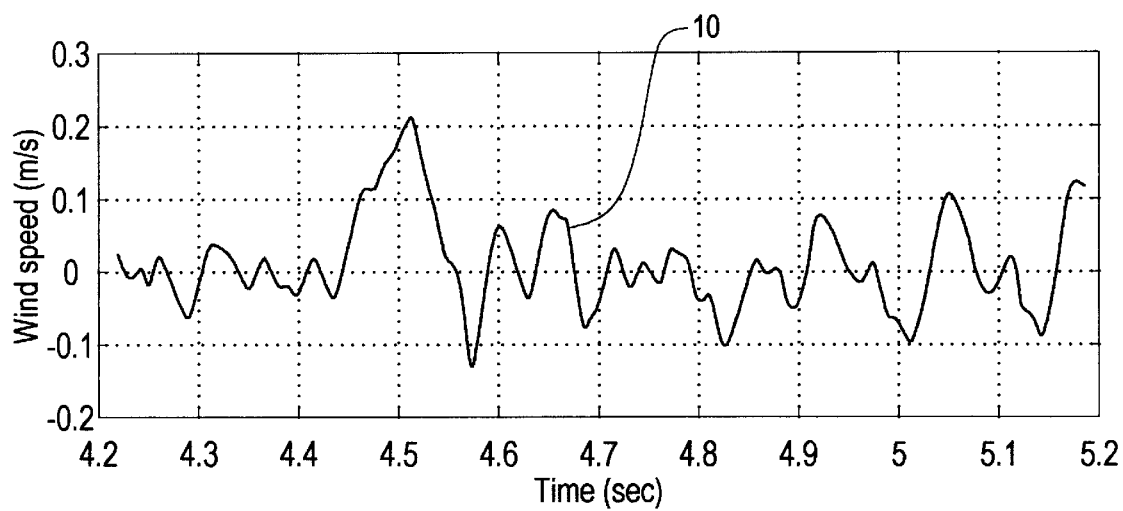

As shown in FIG. 1(b), the digitized physical signal from step 105 is first windowed by framing the end points in step 107. Then, the Sifting Process begins at step 200 by identifying local maximum values of the digitized, framed physical signal from step 107. FIG. 3(a) shows a typical physical signal 10 which, in this example, represents wind speed spanning a time interval of one second.

Before construction of the envelope in steps 210 and 230, optional intermittency tests (201,221) may be introduced to alleviate the alias associated with intermittence in the data that can cause mode mixing.

Optional intermittency test 201 checks the distance between successive maxima to see if this distance between is within a pre-assigned value n times the shortest distance between waves. If no, then an intermittency exists and the method proceeds to step 202. If yes, then there is no intermittency and the upper envelope is constructed in step 210 as further described below.

Similarly optional intermittency test 221 checks the distance between successive minima to see if this distance is within a pre-assigned value n times the shortest distance between waves. If no, then an intermittency exists and the method proceeds to step 222. If yes, then there is no intermittency and the upper envelope is constructed in step 230 as further described below.

Figure 3B:
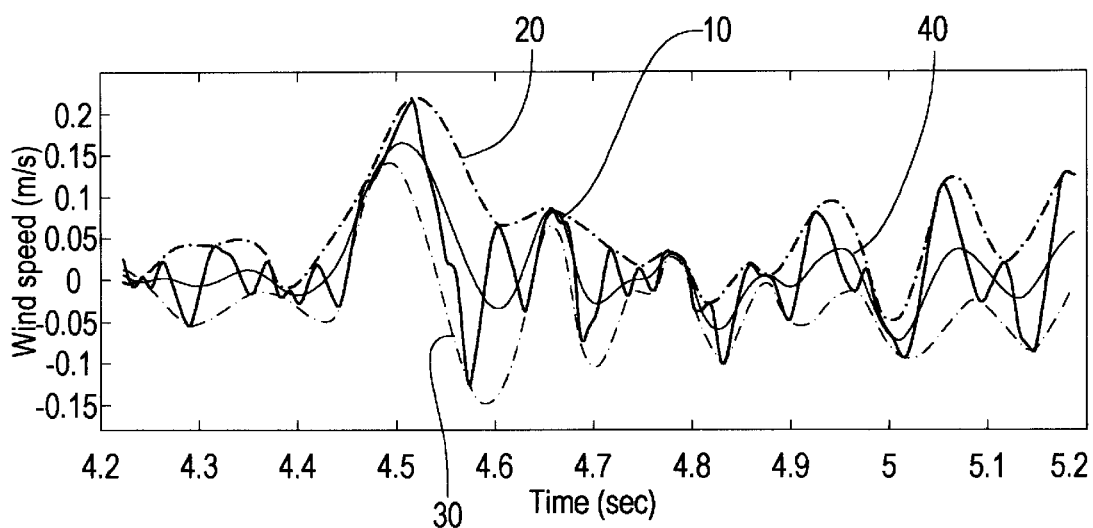
Figure 3C:
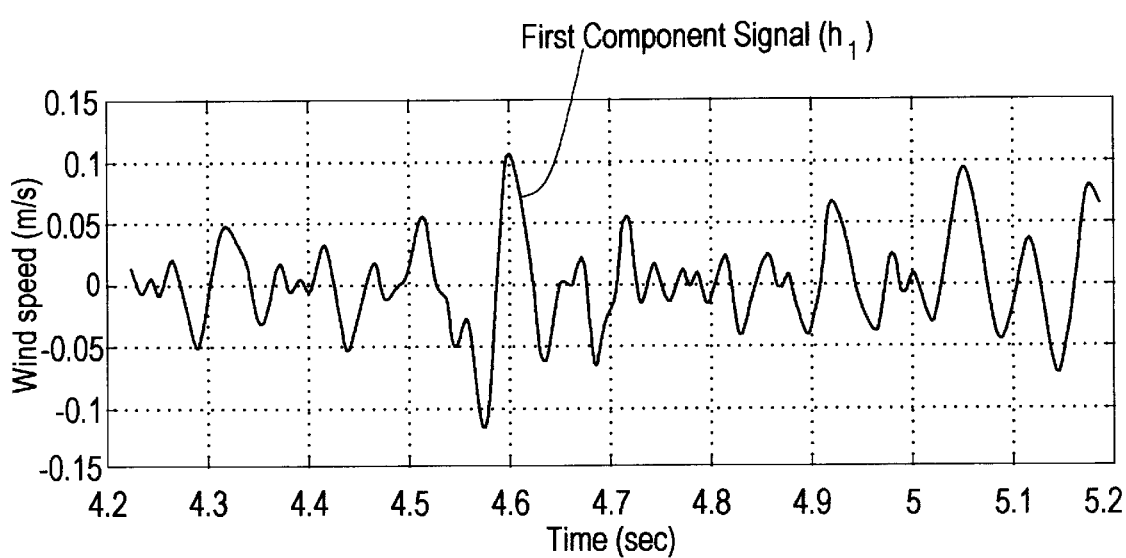
Figure 3D:
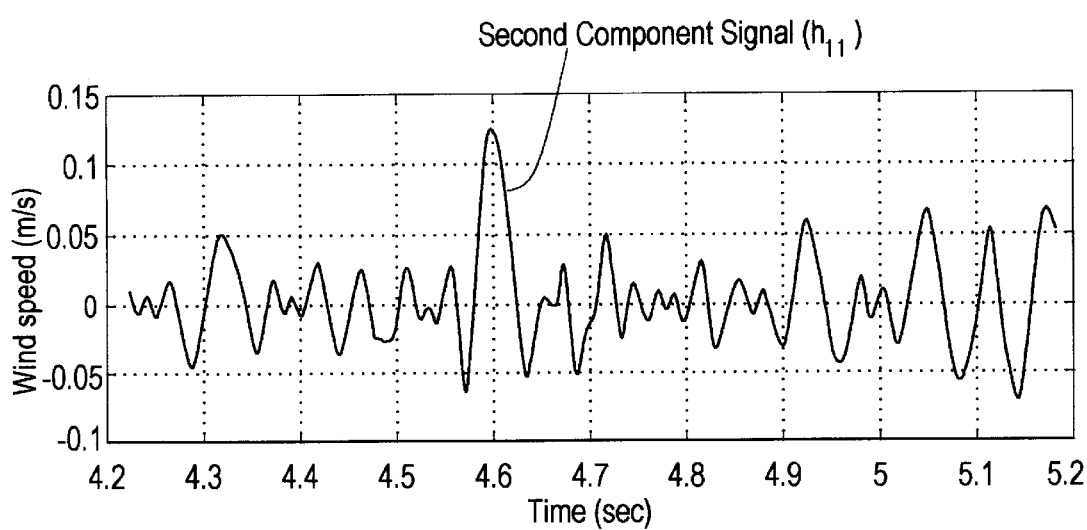
Figure 3E:
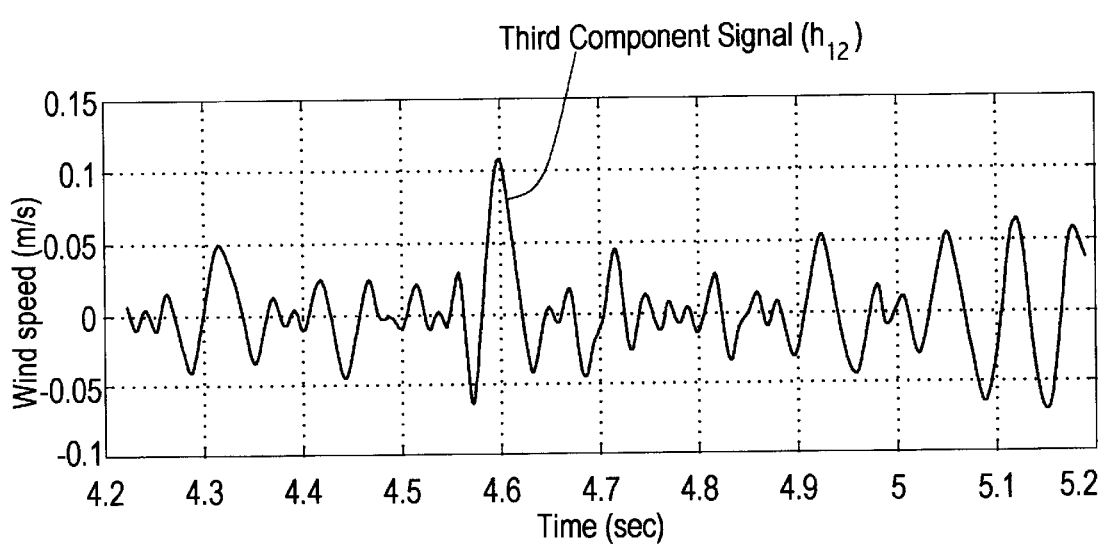
Figure 3F:
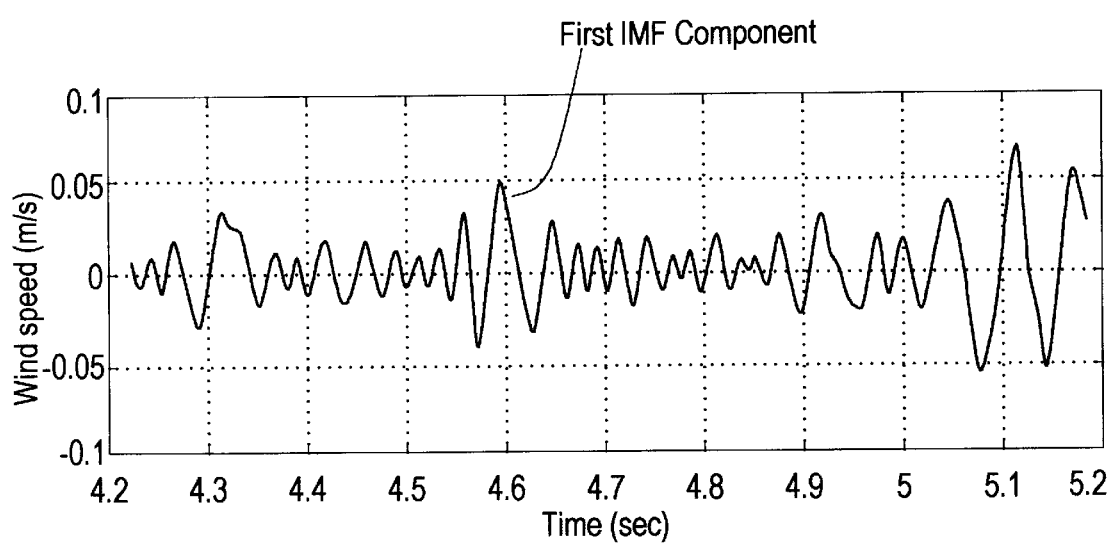
Figure 3G:
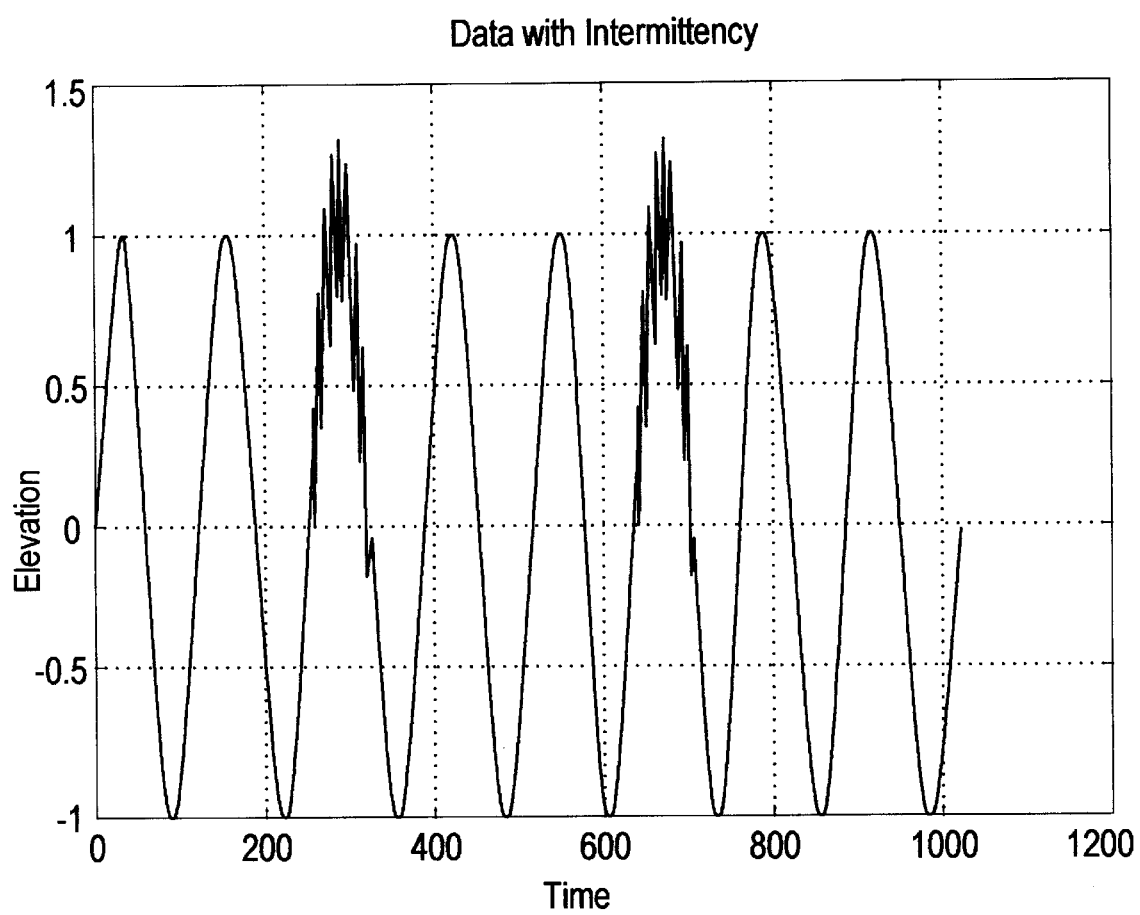
Figure 3H:
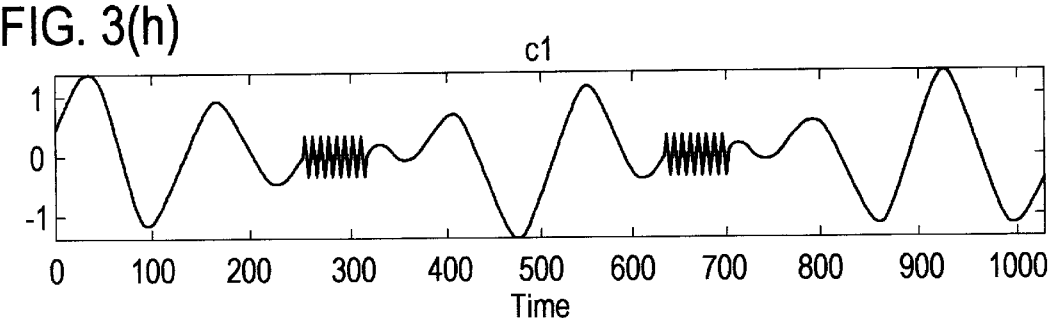
Figure 3I:
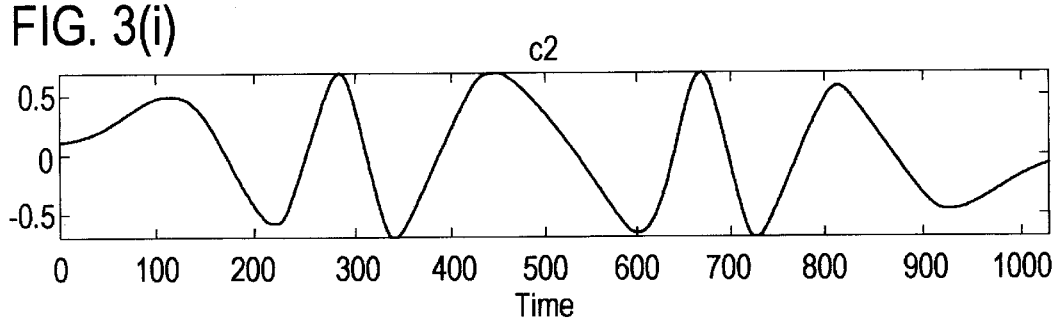
Figure 3J:
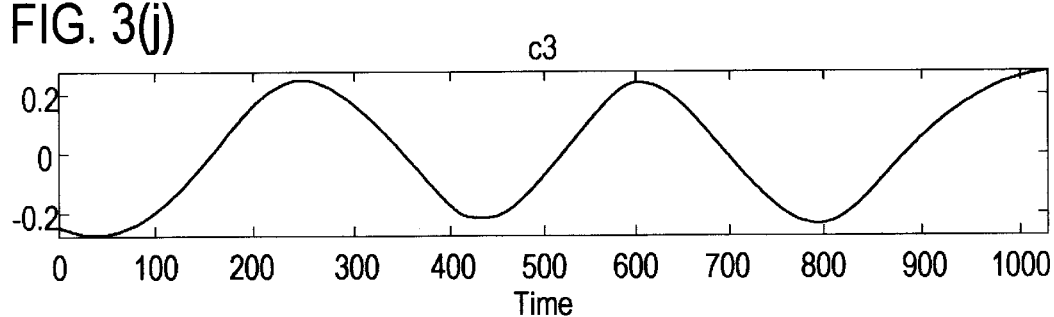

An example of such intermittency is given in FIG. 3(g), in which small scale waves appear only intermittently. By strict application of the Sifting Process, the resulting IMFs are given in FIGS. 3(b)–(j), in which two drastically different time scales are present in the first IMF component as shown in FIG. 3(h). This mixing of modes breaks up the main wave train by the small intermittent oscillations.

Figure 3K:
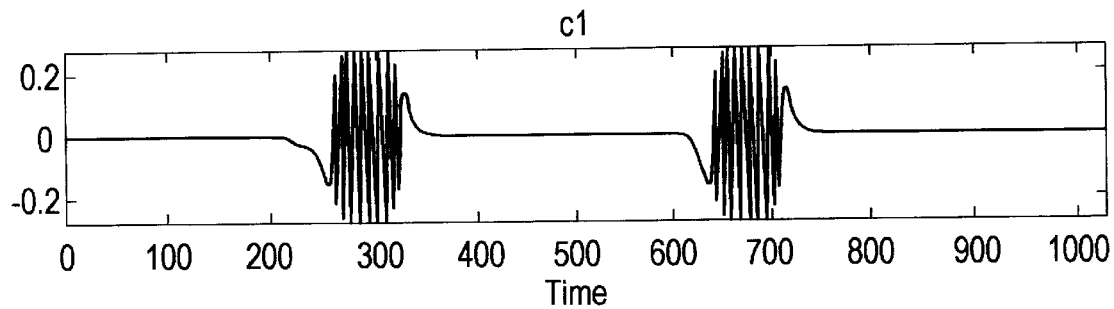
Figure 3L:
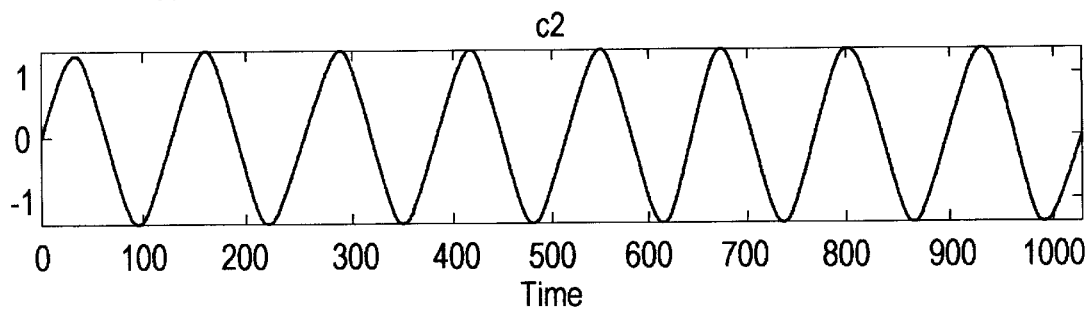
Figure 3M:
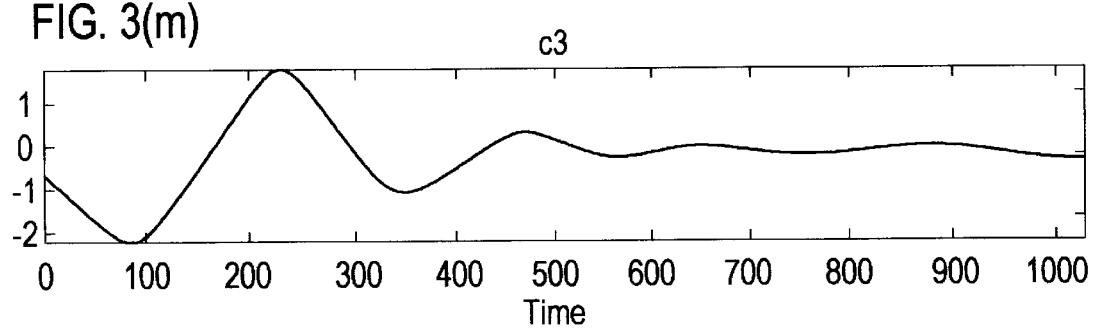

If intermittency tests (201,222) are employed which utilize a preassigned value of n-times the shortest distance between waves, the resulting IMFs are shown in FIGS. 3(k)–(m), in which the modes are clearly and physically separated. The effective step to eliminate the mode mixing is achieved by treating the local extrema which failed the intermittency test as local maxima and minima (steps 202 and 212), respectively. Therefore, the upper and lower envelope will be identical as the original data reference line.

These intermittency tests (201,221) and the further steps (202,222) are optional. By selecting an artificially large n value utilized in steps 201 and 221 to test for intermittency, the test will be effectively bypassed. Otherwise, the test can be bypassed at the initial selection of the program.

Then, the method constructs an upper envelope 20 of the physical signal 10 in step 210. The upper envelope 20 is shown in FIG. 3(b) using a dot-dashed line. This upper envelope 20 is preferably constructed with a cubic spline that is fitted to the local maxima.

Next, the local minimum values of the physical signal 10 are identified in step 220. To complete the envelope, a lower envelope 30 is constructed from the local minimum values in step 230. The lower envelope 30 is also shown in FIG. 3(b) using a dot-dash line. Like the upper envelope 20, the lower envelope 30 is preferably constructed with a cubic spline that is fitted to the local minima.

The upper and lower envelopes 20, 30 should encompass all the data within the physical signal 10. From the upper and lower envelopes 20, 30, an envelope mean 40 is the determined in step 240. The envelope mean 40 is the mean value of the upper and lower envelopes 20, 30. As can be seen in FIG. 3(b), the envelope mean 40 bisects the physical signal 10 quite well.

Then, the method generates the first component signal $h_1$, in step 250 by subtracting the envelope mean 40 from the physical signal 10. This computer implemented step may also be expressed as:

$$X(t)-m_1=h_1. \quad (1)$$

Where the envelope mean 40 is $m_1$ and the physical signal is $X(t)$.

FIG. 3(c) shows the first component signal $h_1$. Ideally, the first component signal $h_1$ should be an IMF, for the construction of $h_1$ described above seems to have made $h_1$ satisfy all the requirements of an IMF. In reality, however, a gentle hump that resides on a slope region of the data can become an extremum when the reference coordinate is changed from the original rectangular coordinate to a curvilinear coordinate. For example, the imperfection of the envelopes 20, 30 can be seen by observing the overshoots and undershoots at the 4.6 and 4.7 second points in FIG. 3(b).

An example of this amplification can be found in the gentle hump between the 4.5 and 4.6 second range in the data in FIG. 3(a). After the first round of sifting, the gentle hump becomes a local maximum at the same time location in the first component signal $h_1$ shown in FIG. 3(c). New extrema generated in this way actually recover the proper modes lost in the initial examination. Thus, the Sifting Process extracts important information from the signal which may be overlooked by traditional techniques. In fact, the Sifting Process can recover low amplitude riding waves, which may appear as gentle humps in the original signal, with repeated siftings.

Still another complication is that the envelope mean 40 may be different from the true local mean for nonlinear data. Consequently, some asymmetric wave forms can still exist no matter how many times the data are sifted. This must be accepted because, after all, the inventive method is an approximation as discussed before.

Other than these theoretical difficulties, on the practical side, serious problems of the spline fitting can occur near the ends, where the cubic spline being fit can have large swings. Left by themselves, the end swings can eventually propagate inward and corrupt the whole data span especially in the low frequency components. A numerical method has been devised to eliminate the end effects details of which will be given later. Even with these problems, the Sifting Process can still extract the essential scales from the data.

The Sifting Process serves two purposes: to eliminate riding waves and to make the wave profiles more symmetric. Toward these ends, the Sifting Process has to be repeated. Because only the first component signal $h_1$ has been generated so far, the decision step 260, which tests successive component signals to see if they satisfy the definition of an IMF, is bypassed during the first iteration.

Thus, step 265 is performed which treats the component signal as the physical signal in the next iteration. The next iteration is then performed by executing steps 200–250. In step 250, the second component signal $h_{11}$ is generated by subtracting the envelope mean from the physical signal (in this iteration, the first component signal $h_1$ is treated as the physical signal). In more formal terms:

$$h_1-m_{11}=h_{11}. \quad (2)$$

FIG. 3(d) shows the second component signal $h_{11}$. Although the second sifting shows great improvement in the signal with respect to the first sifting, there is still a local maximum below the zero line. After a third sifting, the result (third component signal $h_{12}$) is shown in FIG. 3(d). Now all the local maxima are positive, and all the local minima are negative, but to ensure this configuration is stable, the Sifting Process should be further repeated. In general, the Sifting Process is repeated at least 3 more times and, in general, K times to produce $h_{1k}$. If no more new extrema are generated, then $h_{1k}$ is an IMF. In formal terms:

$$h_{1(k-1)}-m_{1k}=h_{1k}; \quad (3)$$

The resulting first IMF component is shown in FIG. 3(f) after 9 siftings. The first IMF component of the physical signal may be designated as such in step 270 and stored in step 275 in memory 415:

$$C_1=h_{1k}, \quad (4)$$

As mentioned above, all these manipulations are carried out numerically in a computer 410. There is not explicit close form analytic expression for any of the computer implemented steps.

As described above, the process is indeed like sifting of the data by the computer 410 because it separates the finest (shortest time scale) local mode from the data first based only on the characteristic time scale. The Sifting Process, however, has two effects:

a. to eliminate riding waves, and b. to ensure the envelopes generated by maxima and minima are symmetric.

While the first condition is necessary for the instantaneous frequency to be meaningful (as discussed below), the second condition is also necessary in case the neighboring wave amplitudes have too large a disparity.

Unfortunately, the effects of the second condition, when carried to the extreme, could obliterate the physically meaningful amplitude fluctuations. Therefore, the Sifting Process should be applied with care, for carrying the process to an extreme could make the resulting IMF a pure frequency modulated signal of constant amplitude.

To guarantee that the IMF component retains enough physical sense of both amplitude and frequency modulations, a stopping criterion is employed to stop the generation of the next IMF component.

This stopping criterion is part of the computer implemented method and is shown as step 260 in FIG. 1(c). Step 260 is a decision step that decides whether the stopping criteria has been satisfied. The preferred stopping criteria determines whether three successive component signals satisfy the definition of IMF. If three successive component signals all satisfy the definition of IMF, then the Sifting Process has arrived at an IMF and should be stopped by proceeding to step 270. If not, step 260 starts another iteration by proceeding to step 265 as described above.

Alternatively, another stopping criteria could be used that determines whether successive component signals are substantially equal. If successive component signals are substantially equal, then the Sifting Process has arrived at an IMF and should be stopped by proceeding to step 270. If not, step 260 starts another iteration by proceeding to step 265 as described above.

Determining whether successive component signals are substantially equal in the alternative stopping criteria limits the size of the standard deviation, sd, computed from the two consecutive sifting results as follows:

$$sd = \sum_{t=0}^{T} \left[ \frac{|(h_{1(k-1)}(t) - h_{1k}(t))|^2}{h_{1(k-1)}^2(t)} \right]. \tag{5}$$

A very rigorous and preferred value for sd is set between 0.2 and 0.3. Of course, if faster processing is desired, then a trade-off such as a less rigorous value for sd may be used.

Overall, the first IMF component $C_1$ should contain the finest scale or the shortest period component of the physical signal 10.

Before extracting the next IMF component, a test should be conducted to determine if the Sifting Process should stop. The stopping criteria is shown in Step 300. Step 300 determines whether the component signal has more than 2 extrema. If not, all of the IMF's have been extracted and the Sifting Process is stopped by proceeding to step 310. If so, then additional IMF's may be extracted by continuing the process in step 320.

Step 270 recognizes that an IMF component has been successfully generated by the Sifting Process by setting the component signal equal to an intrinsic mode function. More specifically, step 270 causes the computer 410 to store the component signal h1k as an intrinsic mode function in memory 415.

Then, the first IMF is separated from the physical signal in step 290 to generate a residual signal. In particular, a residual signal is generated by subtracting the intrinsic mode function from the physical signal. In formal terms:

$$X(t) - C_1 = r_1. \tag{6}$$

Because the residue, $r_1$, still includes information of longer period components, it is treated as the new physical data and subjected to the same Sifting Process as described above. Step 320 performs this function by treating the residual signal as the physical signal in the next iteration. Thereafter, the next iteration is performed beginning with the execution of step 200 as described above.

The Sifting Process is analogous to a mechanical sieve, except it is implemented here in specially programmed computer and applied to any digital data numerically rather than mechanically.

The Sifting Process is repeated for all the subsequent $r_j$'s. This iterative procedure may be expressed as:

$$r_1 - C_2 = r_2,$$

$$\ldots$$

$$r_{n-1} - C_n = r_n. \tag{7}$$

Step 300 stops the Sifting Process by proceeding to stop step 310 if the residual signal $r_n$ has more than 2 extrema. Otherwise, the method proceeds to step 320.

In other words, Step 310 stops the Sifting Process if the residual signal $r_n$ is monotonically increasing or decreasing. This stopping criterion is based on the fact that an IMF cannot be extracted from a monotonic function. If $r_n$ is not monotonically increasing/decreasing, then a next iteration is performed beginning with step 320.

Even for data with zero mean, the final residue still can be different from zero. For data with a trend, the final residue should be that trend.

In summary, the Sifting Process decomposes the physical signal X(t) into a series of intrinsic mode functions and a residue which may be expressed as:

$$X(t) = \sum_{i=1}^{n} c_i + r_n. \tag{8}$$

In other words, the invention extracts a series of IMFs by Sifting the physical signal with a computer implemented Empirical Mode Decomposition method. This IMF series cannot be generated or derived by any analytic method. It can only be extracted by the invention through a specially programmed computer through the Sifting Process.

EMD Filtering and Curve Fitting

FIG. 1(*d*) illustrates the inventive method of performing filtering and curve fitting. The method begins, as in FIG. 1(*a*), with sensing the physical phenomenon or inputting a signal representative thereof in step 100. The optional smoothing 105 may then be applied to eliminate excess noise.

Then, the signal is Sifted with the Empirical Mode Decomposition Process to extract the intrinsic mode functions in step 120. The IMFs may then be directly displayed 130, stored 132 or transmitted 134.

As mentioned above, fitting a curve to a signal is not always possible. The reasons include too many data points for efficient curve fitting and nonlinear data that does not admit an acceptable curve fit. The IMFs, however, extract important information from the original signal while reducing the number of data points and simplifying the resulting signal. By properly selecting only the most relevant IMFs, one can construct a filtered version of the original signal.

Step 350 performs this process of constructing a filtered signal from a subset of the IMFs. Selecting which IMFs should in the subset and which should not may be an empirical or intuitive process. Typically, the IMFs having the lowest frequency components are chosen as part of the selected subset with the higher frequency components excluded therefrom. In this way, a simplified (filtered) version of the original signal can be constructed which eliminates unnecessary and, hopefully, not physically components (IMFs).

More specifically, step 350 performs a summation of the selected IMFs. The selection of IMFs can be automated, e.g. the n lowest frequency IMFs, or manual.

Generating the filtered signal typically permits curve fitting to be successful and efficient. Once the filtered signal is generated, conventional curve fitting techniques (step 360) such as a least squares estimation process can be utilized.

The fitted curve may then be outputted 362, displayed 364, stored 366 or transmitted 368.

The filtered signal may also be subjected to further processing in step 370. Namely, the oscillatory energy about the mean is calculated in step 370. This calculation is essentially the same as the instantaneous energy density calculation explained below, with the calculation being performed for a subset (k) of the IMFs. Further details and an example are discussed below. The result of step 370 is a signal that may be subjected to the Sifting Process to extract a set of IMFs in step 120. Although FIG. 1(*d*) illustrates an infinite loop (steps 120, 350 and 370), at some point it will not be appropriate or possible extract further IMFs. Thus, this loop is not really infinite and is typically performed one or two times.

Computer for Implementing Inventive Method

A computer suitable for programming with the inventive method is diagrammatically shown in the block diagram of FIG. 2. The computer 410 is preferably part of a computer system 400. To allow human interaction with the computer 410, the computer system includes a keyboard 430 and mouse 435. The computer programmed with the inventive method is analogous to a mechanical sieve: it separates digital data into series of IMF's according to their time scales in a manner analogous to a mechanical sieve which separates aggregated sand particles according to their physical size.

Because the invention is applied to analyze physical signals, the computer system 400 also includes an input device 440, sensor 442 and/or probe 444 which are used to sample a physical phenomenon and generate physical signal representative thereof. More particular examples of such inputs (440, 442 and 444) are described in relation to FIGS. 21–25.

To output the results of the computer implemented method, the computer system 400 also includes a display 450 such as a cathode ray tube or flat panel display, printer 460 and output device 470. Each of these outputs (450, 460, 470) should have the capability to generate or otherwise handle color outputs because, for example, the Hilbert Spectrum may be in color.

The generalized output device 470 may also include a network connection to connect the computer 400 to a local or wide area network. In this way, the physical signal may be inputted from the network. Furthermore, all outputs can be sent to another location via such a network connection.

Furthermore, the computer system 400 also includes a mass storage device 420. The mass storage device 420 may be a hard disk, floppy disc, optical disc, etc. The mass storage device 420 may be used to store a computer program which performs the invention when loaded into the computer 410. As an alternative, the input device 440 may be a network connection or off-line storage which supplies the computer program to the computer 410.

More particularly, the computer program embodiment of the invention may be loaded from the mass storage device 420 into the internal memory 415 of the computer 410. The result is that the general purpose computer 410 is transformed into a special purpose machine that implements the invention.

Even more particularly, each step of inventive method will transform at least a portion of the general purpose computer 410 into a special purpose computer module implementing that step. For example, when the sifting step 120 is implemented on the computer 410, the result is a computer implemented sifting apparatus (sifter) that performs the sifting functions of sifting step 120.

Other embodiments of the invention include firmware embodiments and hardware embodiments wherein the inventive method is programmed into firmware (such as EPROM, PROM or PLA) or wholly constructed with hardware components. Constructing such firmware and hardware embodiments of the invention would be a routine matter to one of ordinary skill using known techniques.

Article of Manufacture

Still further, the invention disclosed herein may take the form of an article of manufacture. More specifically, the article of manufacture is a computer-usable medium, including a computer-readable program code embodied therein wherein the computer-readable code causes computer 410 to execute the inventive method.

A computer diskette such as disc 480 in FIG. 2 is an example of such a computer-usable medium. When the disc 480 is loaded into the mass storage device 480, the computer-readable program code stored therein is transferred into the computer 410. In this way, the computer 410 may be instructed to perform the inventive methods disclosed herein.

Illustration of Sifting Process

Figure 4A:
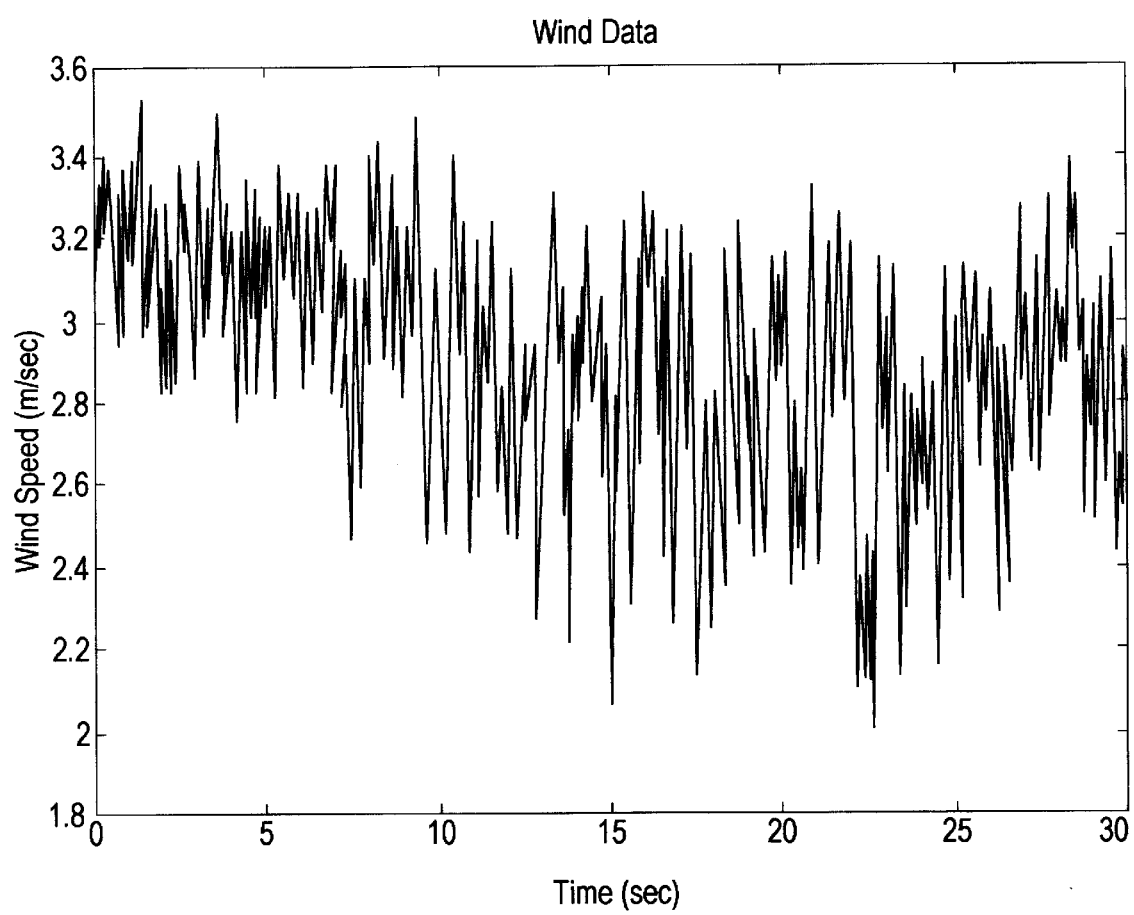

To further illustrate the Sifting Process, consider FIG. 4(a) which shows a physical signal representing wind data collected in a laboratory wind-wave tunnel with a high frequency response Pitot tube located 10 cm above the mean water level. The wind speed was recorded under the condition of an initial onset of water waves from a calm surface. Clearly, the physical signal is quite complicated with many local extrema but no zero-crossings such that the time series represents all positive numbers.

Although the mean can be treated as a zero reference, defining it is difficult, for the whole process is transient. This example illustrates the advantage of adopting the successive extrema for defining the time scale and the difficulties of dealing with nonstationary data. In fact, a physically meaningful mean for such data is impossible to define using standard methods. The EMD eliminates this difficulty.

Figure 4B:
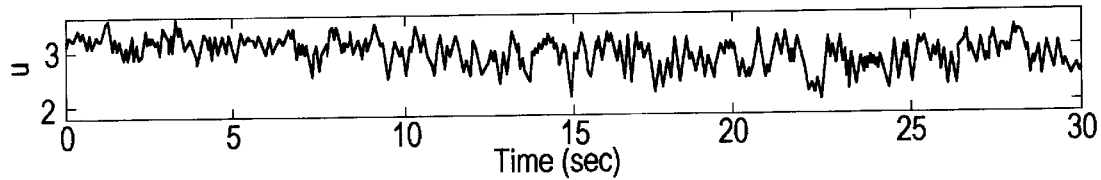
Figure 4C:
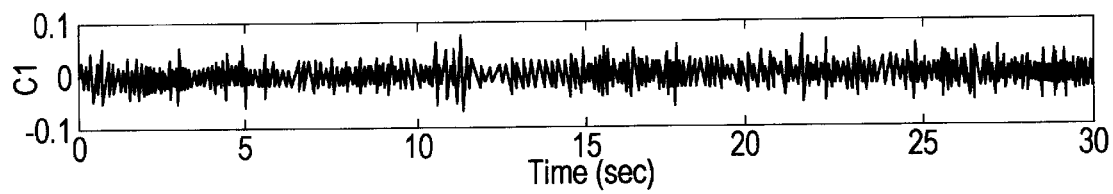
Figure 4D:
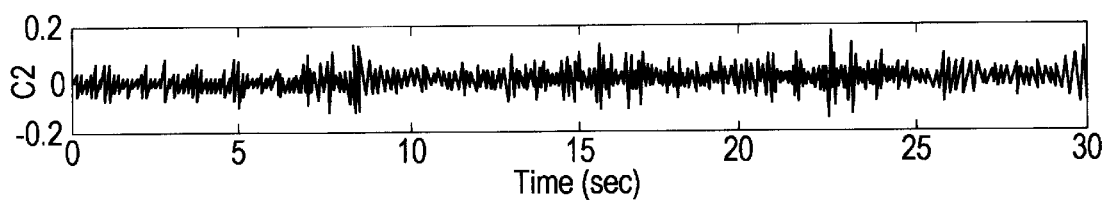
Figure 4E:
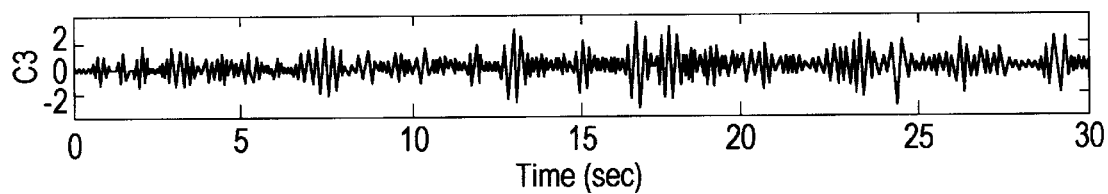
Figure 4F:
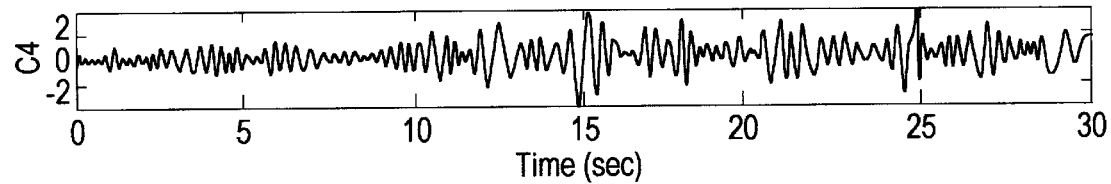
Figure 4G:
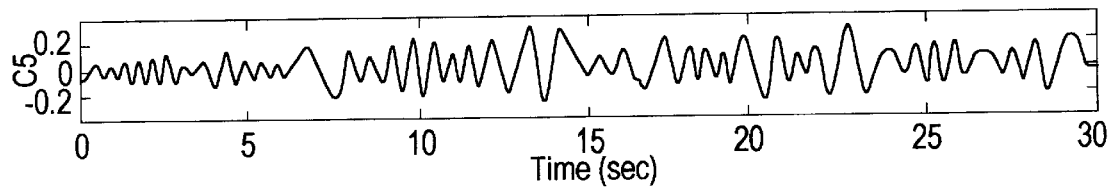
Figure 4H:
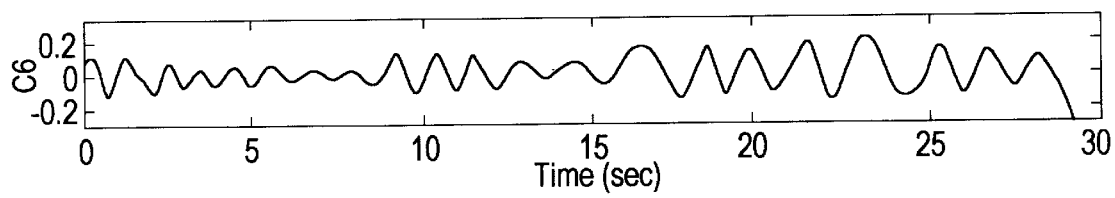
Figure 4I:
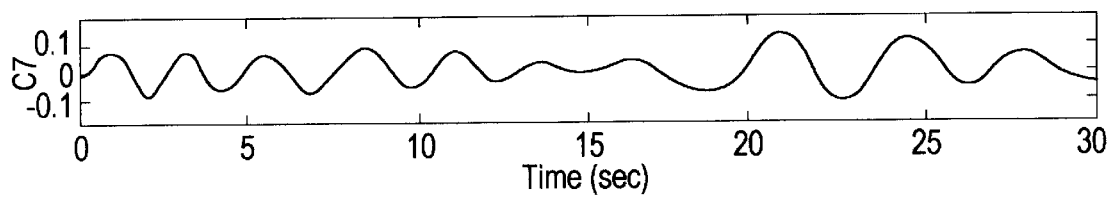
Figure 4J:
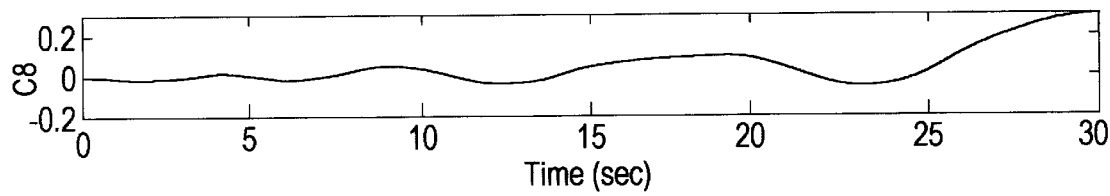
Figure 4K:
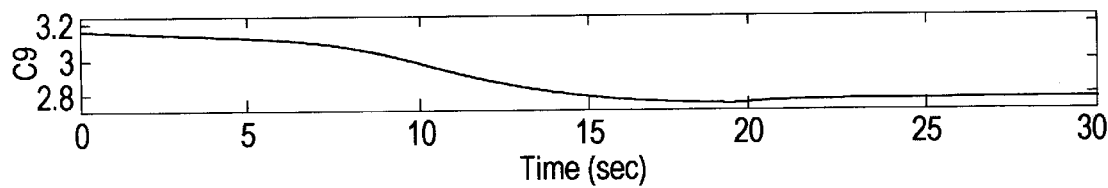

FIG. 4(b) shows the wind speed signal of FIG. 4(a) on a different scale for comparison purposes. FIGS. 4(c)–(k) show all the IMFs obtained from repeatedly sifting the wind speed signal in FIG. 4(b). The efficiency of the invention is also apparent: the Sifting Process produces a total of 9 intrinsic mode function components while the Fourier transform needs components which number as many as half of the total number of points in a given window to represent the wind data with the same accuracy.

The separation of the wind speed data into locally non-overlapping time scale components is clear from FIGS. 4(c)–(k). In some components, such as $C_1$, and $C_3$, the signals are intermittent, then the neighboring components might include oscillations of the same scale, but signals of the same time scale would never occur at the same locations in two different IMF components.

The components of the EMD are usually physical, for the characteristic scales are physically meaningful.

Figure 5A:
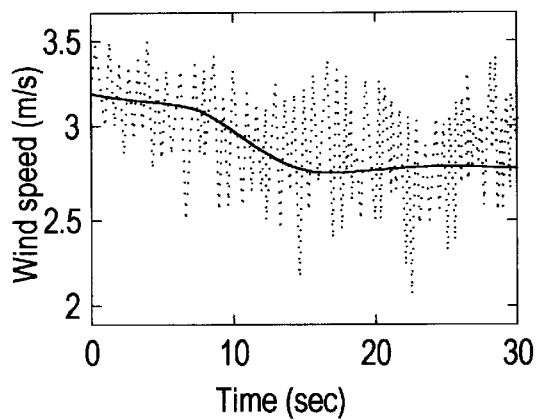

To confirm the validity and completeness of the Sifting Process, the wind speed signal can be reconstructed from the IMF components. FIGS. 5(a)–(i) show this reconstruction process starting from the longest period IMF to the shortest period IMF in sequence. For example, FIG. 5(a) shows the wind speed signal and the longest period component, $C_9$, which is actually the residue trend, not an IMF.

By itself, the fitting of the trend is quite impressive, and it is very physical: the gradual decrease of the mean wind speed indicates the lack of drag from the calm surface initially and the increasing of drag after the generation of wind waves. As the mean wind speed deceases, the amplitude of the fluctuation increases, another indication of wind-wave interactions.

Figure 5B:
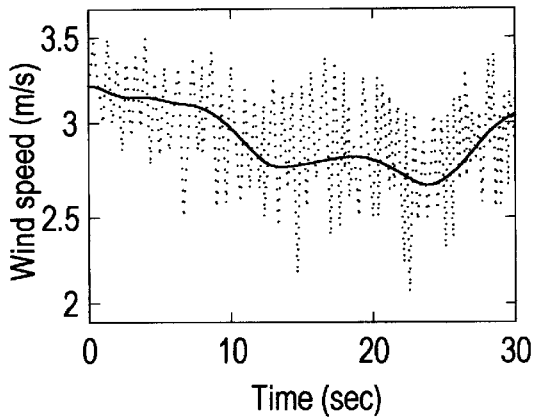
Figure 5C:
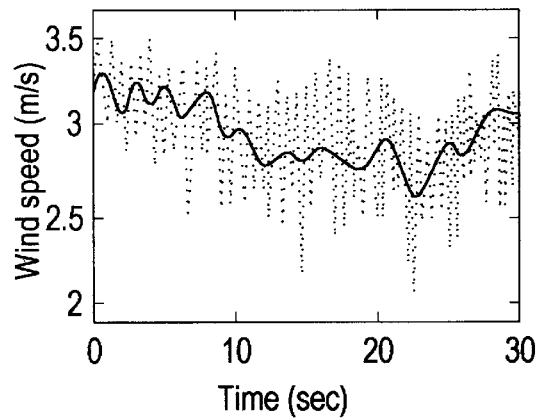
Figure 5D:
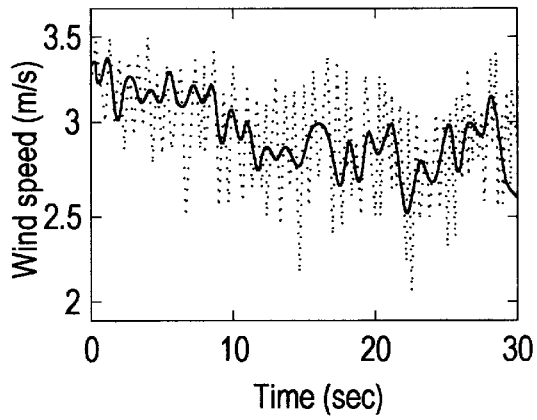
Figure 5E:
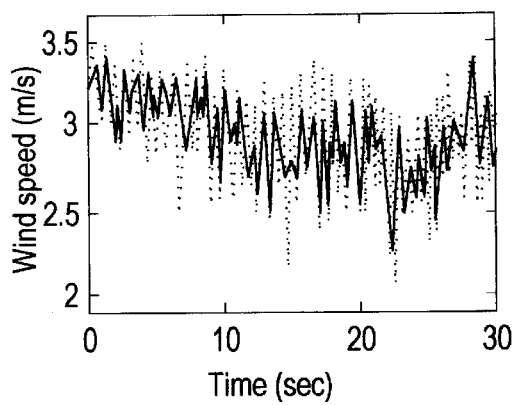
Figure 5F:
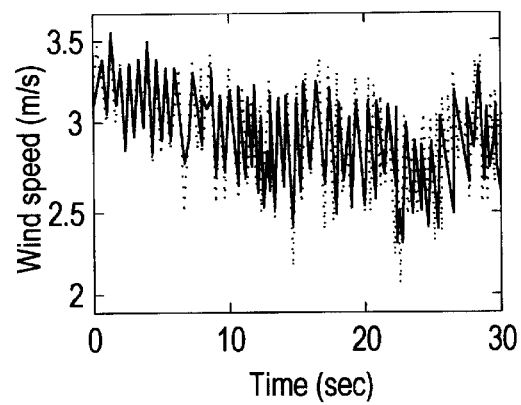
Figure 5G:
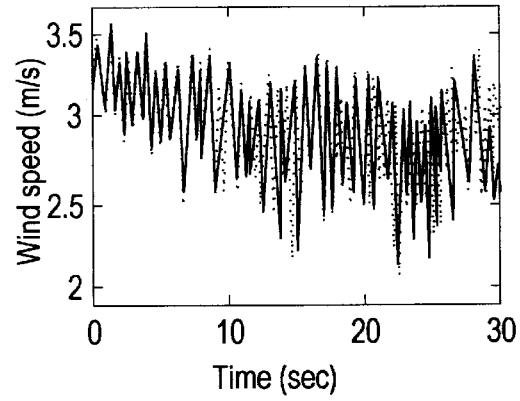
Figure 5H:
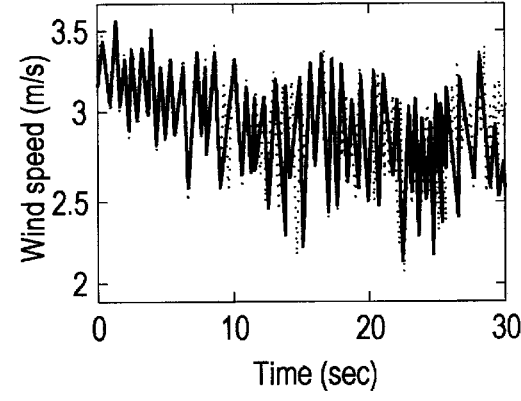
Figure 5I:
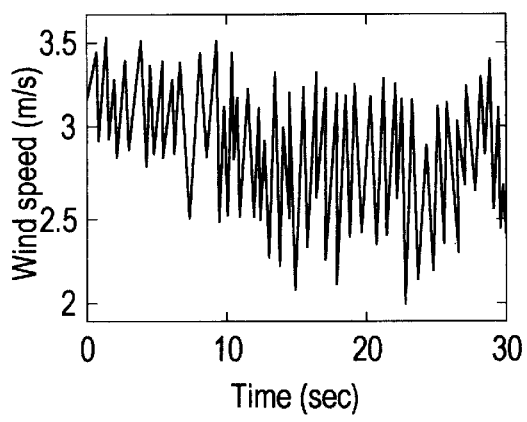
Figure 5J:
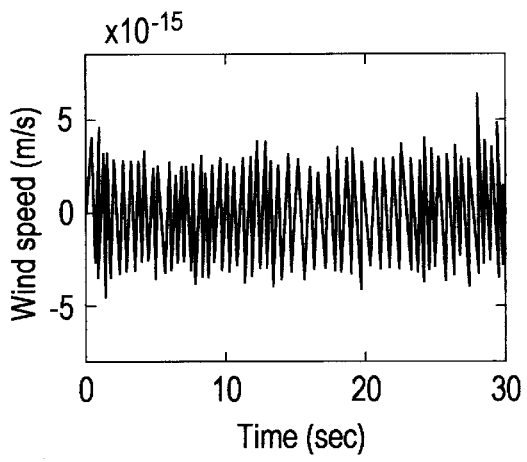

By adding the next longest period component, $C_8$, the trend of the sum, $C_9+C_8$, takes a remarkable turn, and the fitting to the wind speed signal looks greatly improved as shown in FIG. 5(b). Successively adding more components with increasing frequency results in the series of FIGS. 5(c)–(i). The gradual change from the monotonic trend to the final reconstruction is illustrative by itself. By the time the sum of IMF components reaches $C_3$ in FIG. 5(g), essentially all the energy contained in the wind speed signal is recovered. The components with the highest frequencies add little more energy, but they make the data look more complicated.

In fact, the highest frequency component is probably not physical, for the digitizing rate of the Pitot tube is too slow to capture the high frequency variations. As a result, the data are jagged artificially by the digitizing steps at this frequency. The difference between the original data and the re-constituted set from the IMF's is given in FIG. 5(j). The magnitude of the difference is $10^{-15}$, which is the limit of the computer 410.

The Hilbert Spectrum

Having obtained the Intrinsic Mode Function components (through either the local extrema or curvature extrema Sifting Processes), the next step in the computer implemented method is to apply the Hilbert Transform to each component and generate the Hilbert Spectrum as shown in step 140 in FIG. 1(a).

A brief tutorial on the Hilbert transform with emphasis on its physical interpretation can be found in Bendat and Piersol, 1986, *"Random Data: Analysis and Measurement Procedures"*, 2nd Ed., John Wiley & Sons, New York, N.Y. Essentially, the Hilbert transform is the convolution of X(t) with 1/t. This convolution emphasizes the local properties of X(t). In more formal terms, given a time series X(t), the Hilbert Transform Y(t) can be expressed as $$Y(t) = \frac{1}{\pi} P \int_{-\infty}^{\infty} \frac{X(t')}{t-t'} dt' \tag{9}$$

where P indicates the Cauchy principal value.

With this definition, X(t) and Y(t) form a complex conjugate pair. This complex conjugate pair Z(t) may be expressed as:

$$Z(t) = X(t) + iY(t) = a(t) e^{i\theta(t)}, \tag{10}$$

in which $$a(t) = [X^2(t) + Y^2(t)]^{1/2}, \tag{11}$$

$$\theta(t) = \arctan \frac{X(t)}{Y(t)}. \tag{12}$$

After performing the Hilbert transform to each IMF component, we can express the time series data X(t) in the following form:

$$X(t) = \sum_{j=1}^{n} a_j(t) e^{i \int \omega_j(t) dt}. \tag{13}$$

In Equation (13), the residue, $r_n$, is purposefully omitted, for it is either a monotonic function, or a constant. Although the Hilbert transform can treat the monotonic trend as part of a longer oscillation, the energy involved in the residual trend could be overpowering. In consideration of the uncertainty of the longer trend, and in the interest of information contained in the other low energy and higher frequency components, the final non-IMF component should be left out. It, however, could be included, if physical considerations justify its inclusion.

Note that Equation (13) gives both amplitude and frequency of each component as functions of time. It should be pointed out that no analytical method can generate the expression in Equation (13). Instead, all the components may be extracted only by a specially programmed computer applying the inventive Sifting Process and the Hilbert transform. The variable amplitude and frequency have not only greatly improved the efficiency of the expansion, but also enabled the expansion to accommodate nonstationary data. With IMF expansion, the amplitude and the frequency modulations are also clearly separated.

Equation (13) also enables the computer implemented method to represent the amplitude and frequency as functions of time in a three-dimensional plot, in which the amplitude can be contoured on the frequency-time plane. This frequency-time distribution of the amplitude is designated as the Hilbert Amplitude Spectrum, $H(\omega,t)$, or simply Hilbert Spectrum. Thus we have:

$$H(\omega, t) = \sum_{j=i}^{n} a_j(t) e^{i \int \omega_j(t) dt} \tag{14}$$

In which $H(\omega,t)$ is the Hilbert spectrum of the frequency ($\omega$) and time (t) and $a_j(t)$ is the j-th component of the IMF.

In the presentation, the amplitude (with or without smoothing) can be expressed in color maps, black-grey maps, or contour maps. Color maps, however, greatly increase the operator's ability to fully analyze the spectrum. In some cases, a color map will permit the operator to discern relationships and trends that would not be apparent in black-grey maps thereby making a color display a necessary component in some cases.

If amplitude squared is more desirable to represent energy density, then the squared values of amplitude can be substituted to produce a Hilbert Energy Spectrum just as well.

Figure 6A:
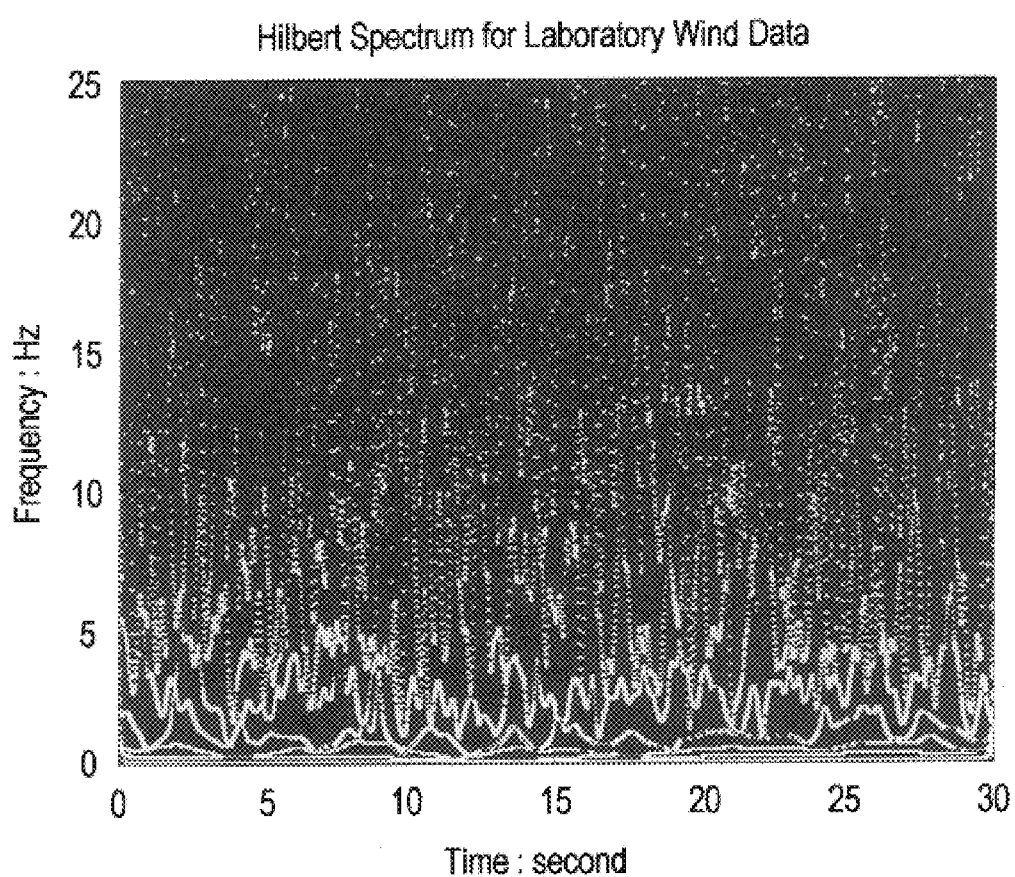
Figure 6B:
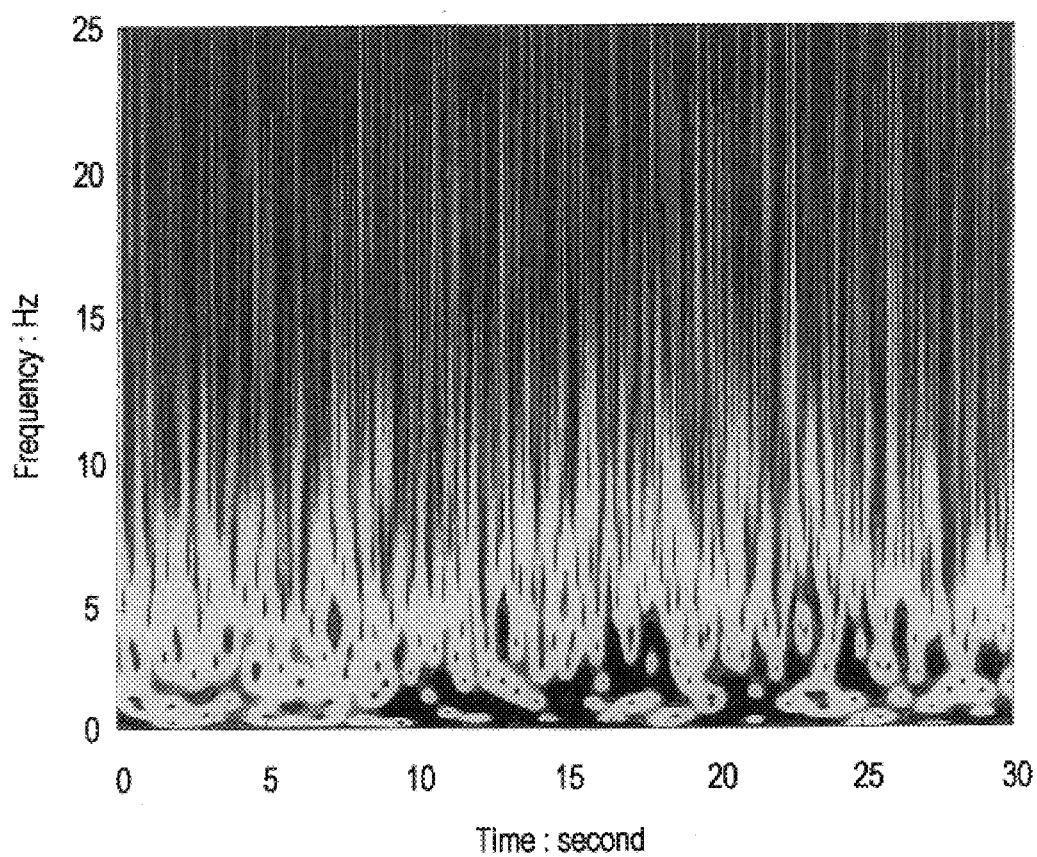

Various forms of Hilbert spectra presentations can be generated by the computer in the display step 190: both color coded maps and contour maps may be employed to present the Hilbert spectra with or without smoothing. The Hilbert Spectrum in the color map format for the wind data is shown in FIG. 6(a). The Hilbert spectrum in FIG. 6(a) gives a very different appearance when compared with the corresponding Wavelet spectrum shown in FIG. 6(b). While the Hilbert Spectrum in FIG. 6(a) appears only in the skeleton form with emphasis on the frequency variations of each IMF, the Wavelet analysis result gives a smoothed energy contour map with a rich distribution of higher harmonics.

Figure 6C:
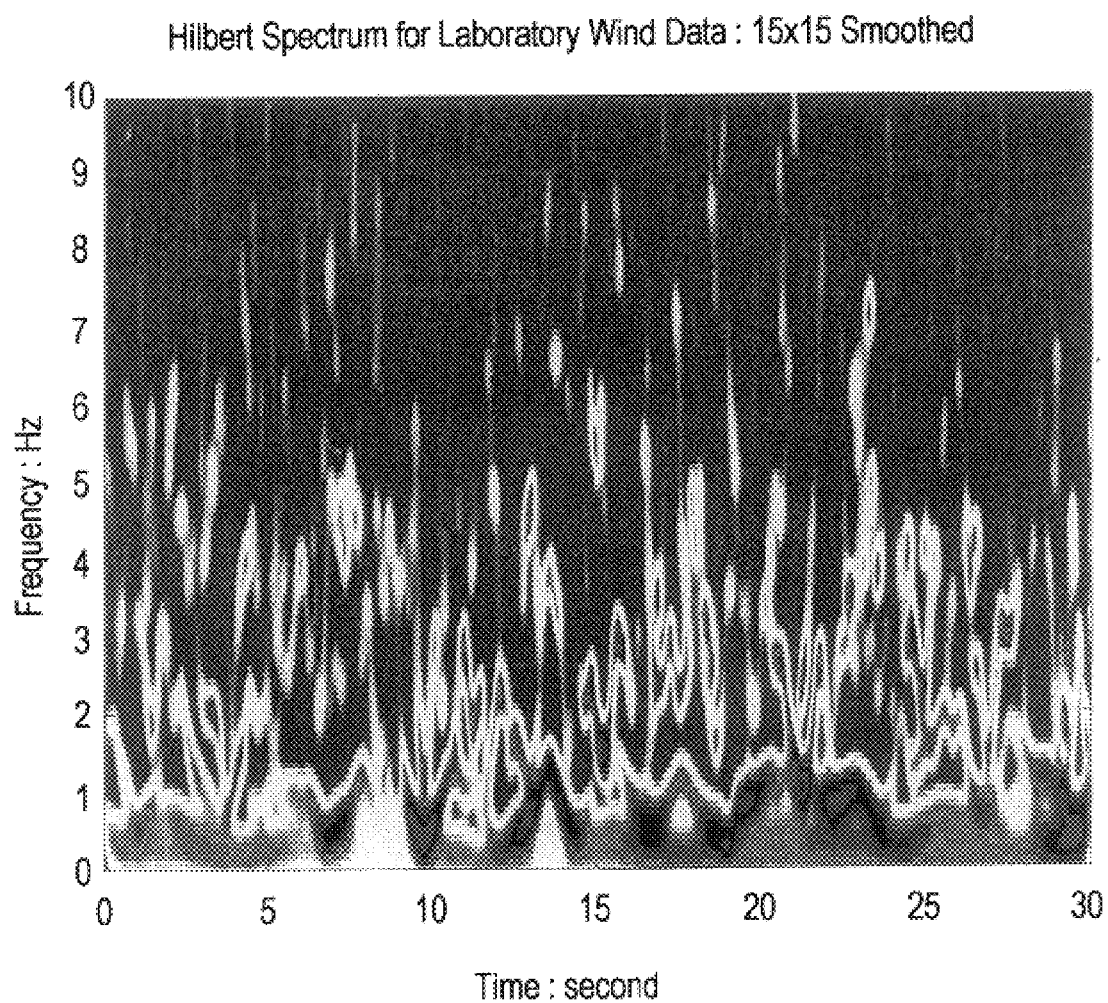

If a more continuous form of the Hilbert Spectrum is preferred, a smoothing method can be optionally applied in step 155. The first type of a smoothing method which may be used in the invention is a weighted spatial filter which averages over a range of cells. For example, a 15 by 15 weighted Gaussian filter may be employed in step 155 as is known in the art to smooth this data. FIG. 6(c) shows the result of applying the 15 by 15 Gaussian filter.

Although smoothing step 155 degrades both frequency and time resolutions, the energy density and its trends of evolution as functions of frequency and time are easier to identify. In general, if more quantitative results are desired, the original skeleton presentation is better. If more qualitative results are desired, the smoothed presentation is better. As a guide, the first look of the data is better in the smoothed format.

The alternative of the spatial smoothing is to select a lower frequency resolution and leave the time axis undisturbed. The advantages of this approach are the preservation of events' locations and a more continuous frequency variation. Furthermore, a lower frequency resolution saves computation time for the computer implemented method.

To optimize such computation time, the optimal frequency resolution in the Hilbert spectrum can be computed as follows. Let the total data length be T, and the digitizing rate of the sensor be Δt. Then, the lowest frequency that can be extracted from the data is 1/T Hz, which is also the limit of frequency resolution for the data. The highest frequency that can be extracted from the data is 1/(n Δt) Hz, in which n represents the minimum number of Δt needed to define the frequency accurately.

Because the Hilbert transform defines instantaneous frequency by differentiation, more data points are needed to define an oscillation. The absolute minimum number of data points is five for a whole sine wave. Although a whole sine wave is not needed to define its frequency, many points within any part of the wave are needed to find a stable derivative. Therefore, the maximum number of the frequency cells, N, of the Hilbert spectrum should be $$N = \frac{\frac{1}{n\Delta t}}{\frac{1}{T}} = \frac{T}{n\Delta t}. \tag{15}$$

In order to make the derivative stable, the data is averaged over three adjacent cell values for the final presentation.

To illustrate, consider the wind data of FIG. 4(a) which was digitized at a rate of 0.01 seconds and has a total length of 30 seconds. Therefore, the highest frequency that can be extracted is 25 Hz. The total cell size could be 600, but they have been averaged to 200 in FIG. 6(a).

Marginal Spectrum

The marginal spectrum offers a measure of total amplitude (or energy) contribution from each frequency value. In other words, the marginal spectrum represents the cumulated amplitude over the entire data span.

As shown in FIG. 1(a), the marginal spectrum is calculated by the computer implemented method in step 145 after applying the Hilbert Transform in step 140. The marginal spectrum is the Hilbert Spectrum integrated through all time. In this simplification, the time coordinate is lost as in the Fourier spectral analysis, which leaves a summary of the frequency content of the event. Therefore, this presentation should only be used when the phenomena being analyzed is stationary. Formally, the marginal spectrum h(ω) is defined as:

$$h(\omega) = \int_0^T H(\omega, t) dt. \tag{16}$$

Because there is no analytic expression for H(ω,t), the integration can only be performed in a computer as a sum.

An example of a marginal spectrum is shown in FIG. 7. More particularly, FIG. 7 shows the corresponding marginal spectrum of the Hilbert Spectrum given in FIG. 6(a).

The frequency in either H(ω,t) or h(ω) has a totally different meaning from results generated by applying Fourier spectral analysis. In the Fourier representation, the existence of energy at a frequency, ω, means a component of a sine or a cosine wave persisted through the time span of the data.

In contrast, the existence of energy at the frequency, ω, means only that, in the whole time span of the data, there is a higher likelihood for such a wave to have appeared locally. In fact, the Hilbert Spectrum is a weighted, non-normalized, joint amplitude-frequency-time distribution. The weight assigned to each time-frequency cell is the local amplitude. Consequently, the frequency in the marginal spectrum indicates only the likelihood of an oscillation with such a frequency exists. The exact occurrence time of that oscillation is given in the full Hilbert spectrum.

To illustrate this difference, the corresponding Fourier Spectrum of the wind speed signal is also given in FIG. 7 using a dotted line. As can be observed, there is little similarity between the Fourier spectrum and the marginal spectrum. While the Fourier spectrum is dominated by the DC term because of the non-zero mean wind speed, the marginal spectrum gives a nearly continuous distribution of energy. The Fourier spectrum is meaningless physically, because the data is not stationary. In contrast, the marginal spectrum provides a physically meaningful interpretation of the wind speed signal.

Instantaneous Frequency

There are two types of frequency modulation: the inter-wave and the intra-wave modulations. The first type is familiar because the frequency of the oscillation gradually changes as the waves disperse. Technically, in dispersive waves, the frequency is also changing within one wave, but that is generally not emphasized either for convenience, or for lack of a more precise frequency definition. The second type is less familiar, but it is also a common phenomenon: if the frequency changes from time to time within a wave its profile can no longer be a simple sine or cosine function. Therefore, any wave profile deformation from the simple sinusoidal form implies intra-wave frequency modulation.

In the past, such phenomena were treated as harmonic distortions. Nevertheless, such deformations should be viewed as intra-wave frequency modulation because the intra-wave frequency modulation is a more physically meaningful term.

In order to understand these frequency modulations, the invention applies a unique definition of instantaneous frequency. This definition stems from the EMD method and requires the signal to be reduced into IMF components. After extracting the IMF components, an instantaneous frequency value can be assigned to each IMF component. Consequently, for complicated data in which more than one IMF may be extracted by EMD, there can be more than one instantaneous frequency at a time locally.

With the Hilbert Transform, a unique definition of instantaneous frequency may be applied by the computer implemented method as illustrated by step 160. Step 160 calculates the instantaneous frequency which is formally defined as follows:

$$\omega(t) = \frac{d\theta(t)}{dt}. \tag{17}$$

By calculating instantaneous frequency, step 160 of the invention permits the frequency value to be defined for every point with the value changing from point to point.

The validity and the implications of the instantaneous frequency for nonlinear signals may be analyzed by examining an idealized Stokes wave in deep water. The wave profile of such a Stokeian wave is modeled by $$X(t) = \cos(\omega t + \epsilon \sin \omega t) \tag{18}$$

Therefore, it is a intra-wave frequency modulated signal. Approximately, equation (18) can be shown to be:

$$X(t) = (1 + \epsilon/2)\cos \omega t + \epsilon \cos 2\omega t + \ldots \tag{19}$$

The wave profile is also shown in FIG. 9(a). Because the intra-wave frequency can only be approximated by harmonics in Fourier analysis, we can still have the same profile, but not the same frequency content. The wave form shows sharpened crests and rounded off troughs, which make the crests and troughs asymmetric with respect to the mean surface.

Processed with computer implemented EMD, this data yields only one IMF component as shown in FIG. 9(b), with a constant offset component (not shown). Although this wave has only one characteristic scale or IMF, the Wavelet analysis result shown in FIG. 9(c). FIG. 9(c) has many harmonics with two visible bands of energy corresponding to the highest order of approximations of the possible harmonics.

In contrast, the IMF data can be processed by the inventive method to give the Hilbert Spectrum shown in FIG. 9(d). The Hilbert Spectrum has only one frequency band centered around 0.03 Hz, the fundamental frequency of the wave train, but there is an intra-wave frequency modulation with a magnitude range of 0.02 to 0.04 Hz as the model truly represents. This intra-wave frequency modulation has been totally ignored in the past, for the traditional definition of frequency is based on the reciprocal of periodicity and Fourier Analysis.

Instantaneous Energy Density

Furthermore, the computer implemented method may also calculate the instantaneous energy density in step 150. The instantaneous energy density, IE, is defined as:

$$IE(t) = \int_\omega H^2(\omega, t) d\omega \ldots \quad (20)$$

Still further, this instantaneous energy density depends on time. Therefore, the IE can be used to check energy fluctuations.

Stationarity

To quantitatively measure the stationarity of a physical signal, the invention utilizes step 165 to calculate various stationarity measurements. Before introducing the preferred stationarity measurements, a brief review of conventional stationarity measurements is presented.

The classic definitions of stationarity are dichotomous: a process is either stationary or nonstationary. This crude definition is only qualitative in nature. Such definitions are both overly stringent and useless at the same time: few data sets can satisfy the rigor of these definitions; consequently, no one even bothers using them to check stationarity of the signal. As a result, data as nonstationary as earthquake and seismological signals are routinely treated as stationary (see, for example, Hu, et al., 1996., *Earthquake Engineering*. Chapman & Hall, London).

Sometimes, for some obviously nonstationary data, two less stringent definitions are invoked: piece-wise stationary and asymptotically stationary. These definitions are still dichotomous.

To quantify the statistical processes further, an index is needed to give a quantitative measure of how far the process deviates from stationarity. A prerequisite for such a definition is a method to present the data in the frequency-time space.

With the energy-frequency-time distribution (Hilbert Spectrum) described above, stationarity of the physical signal may be quantitatively determined. Therefore, the invention introduces an index of stationarity as follows and calculates a Degree of Stationarity in step 165.

The first step in defining the Degree of Stationarity, DS($\omega$), is to find the mean marginal spectrum, n($\omega$), as $$n(\omega) = \frac{1}{T} h(\omega) \quad (21)$$

Then, the Degree of Stationarity may be defined as:

$$DS(\omega) = \frac{1}{T} \int_0^T \left(1 - \frac{H(\omega, t)}{n(\omega)}\right)^2 dt, \quad (22)$$

Again, the value of DS($\omega$) can be determined by the computer. Therefore, the specialized computer 410 according to the invention can be treated as a stationarity meter.

For a stationary process, the Hilbert spectrum cannot be a function of time. Then, the Hilbert Spectrum will consist of only horizontal contour lines and DS($\omega$) will then be identically zero. Only under this condition will the marginal spectrum be identical to the Fourier spectrum, then the Fourier spectrum will also make physical sense. On the other hand, if the Hilbert spectrum depends on time, the index will not be zero, then the Fourier spectrum will cease to make physical sense.

Figure 8A:
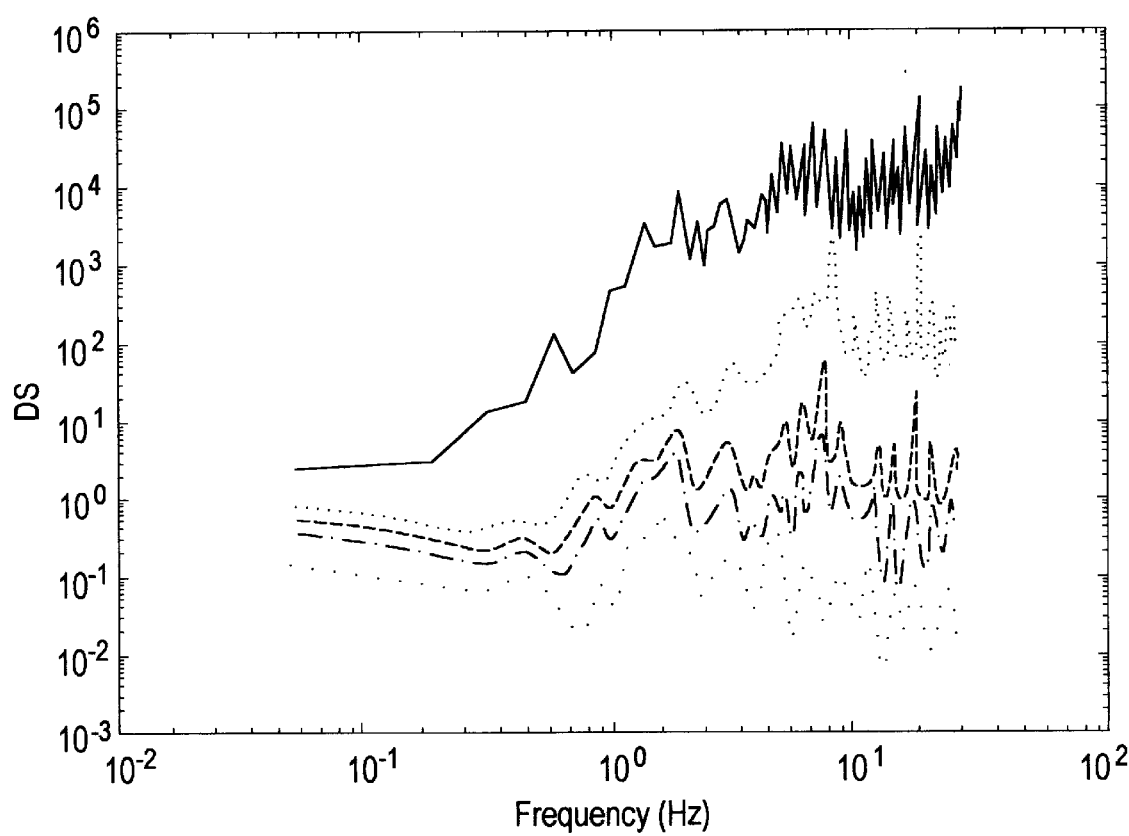
Figure 8B:
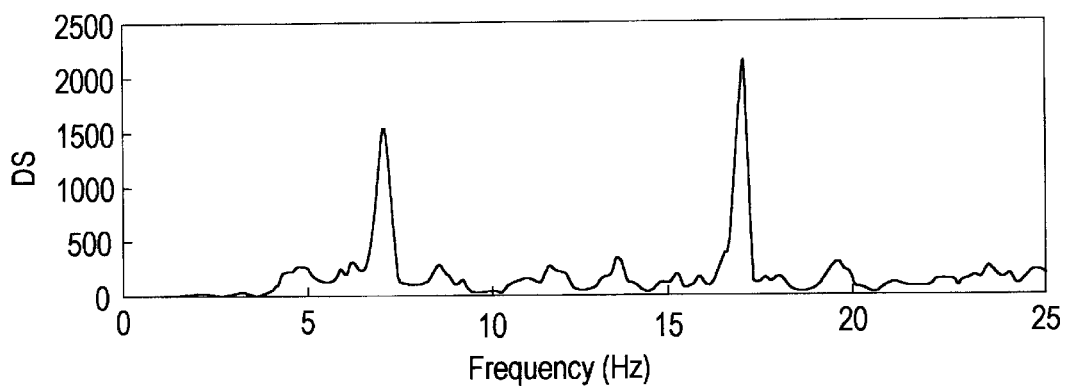
Figure 8C:
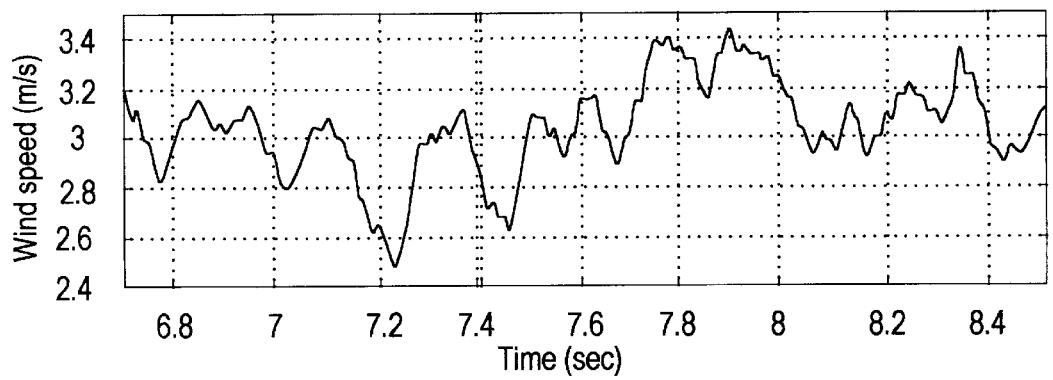

In general, the higher the index value, the more nonstationary is the process. The DS for the wind data is shown in FIG. 8(a). As the index shows, the data are highly nonstationary especially for the high frequency components.

Eq. (22) defines the stationarity as a function of frequency. This is necessary because certain frequency components can be nonstationary while other components remain stationary. An example is sporadic riding wind-generated waves on otherwise uniform swell: the low frequency swell component is stationary, while the high frequency wind waves are intermittent, and hence nonstationary.

The degree of stationarity can also be a function of time implicitly, for the definition depends on the time length of integration in Eq. (22). Therefore, a process can be piecewise stationary. On the other hand, for a singular outburst in an otherwise stationary signal, the process can be regarded as almost stationary if a long time integral is performed, but nonstationary the integral only encompasses the immediate neighborhood of the outburst.

Stationarity can be a complicated property of the process: for any signal shorter than a typical long wave period, the process may look transient. Yet as the signal length gets longer, the process can have many longer wave periods and becomes stationary. On the other hand, the signal can be locally stationary while in a long time sense nonstationary. An index is therefore not only useful but also necessary to quantify the process and give a measure of the stationarity.

The invention also calculates a Degree of Statistic Stationarity in step 165. The degree of stationarity defined in Eq. (22) can be modified slightly to include statistically stationary signals, for which the Degree of Statistic Stationarity, DSS($\omega,\Delta T$), is defined as $$DSS(\omega, \Delta T) = \frac{1}{T} \int_0^T \left(1 - \frac{\overline{H(\omega, t)}}{n(\omega)}\right)^2 dt, \quad (23)$$

where the over-line indicates averaging over a definite but shorter time span, $\Delta T$, than the overall time duration of the data, T. For periodic motions, the $\Delta T$ can be the period. Such a time scale, however, is hard to define precisely for high dimensional, nonstationary dynamic systems.

Even with this difficulty, the definition for DSS could be more useful in characterizing random variables from natural phenomena. Furthermore, DSS will depend on both frequency and the averaging time span. For the wind data taken as an example, the DSS is given in FIG. 8(a) with ΔT=10, 50, 100, and 300 time steps respectively. The results show that while the high frequency components are nonstationary, they can still be statistically stationary. Two frequency bands at 7 and 17 Hz are highly nonstationary as the DSS averaged at 100 time steps shown in FIG. 8(b). These components are intermittent as can be seen in the IMF components and the marginal spectrum. A section of the original wind data is also plotted in FIG. 8(c) to demonstrate that there are indeed prominent 7 and 17 Hz time scale oscillations.

Display of Selected Results

The invention displays various results of the above-described computer implemented method in step 190. These displays are extremely useful in analyzing the underlying physics of the physical phenomenon being studied as described above. Furthermore, particular examples of these displays and the increased understanding of the underlying physics which these displays permit are discussed in the following section.

For example, the invention generates various Hilbert spectra displays in the display step 190. As mentioned above, both color coded maps and contour maps may be employed to display the Hilbert spectra in display step 190. In addition, the color coded maps convey information to the operator in a uniquely accessible way permitting a more thorough and deeper understanding of the physical phenomenon and may be considered as necessary to analyze some physical phenomena.

The displays generated by the invention in display step 190 are central to the invention because they allow an operator to analyze the underlying physics of the physical phenomenon being studied.

The display step 190 outputs displays to display 450. As mentioned above, display 450 includes devices such as a cathode ray tube and a flat panel display. As an alternative, display step 290 may generate a hard copy output by utilizing printer 460 or may send the generated display to output device 470.

Biological Signal Processing

The above description provides a foundation of signal analysis methodologies which has broad applicability to a wide variety of signal types. Once such applicable signal type is biological signals which are signals measured or otherwise representative of a particular biological phenomenon.

For example, any given physiological process has a number of quantities that can be measured to produce a signal or otherwise be represented by a signal. The invention can be applied to such signals in an effort to better understand the underlying biological phenomenon. For example, the relationships between different biological variables can be studied with a precision and depth of understanding not possible before.

The invention can also be used to arrive at an analytical function representative of the biological phenomenon. By using the inventive filtering methods, the biological signal can be simplified to eliminate components not particularly relevant to the analysis and to thereby make it possible to represent the signal with a function.

Blood pressure data, such as the data shown in FIGS. 9(a)–(g), are examples of the invention's applicability to analyzing and characterizing biological signals. This blood pressure data and the analysis that follows focusses on changes in blood pressure over the course of day.

To collect this data, a pressure probe was implanted into the pulmonary artery of a rat. Measurements were taken with the rat under controlled conditions (e.g. rat breathing normal atmosphere at sea level, quiet room, lit for 12 of the 24 hour time span, etc.). In the experiment, a Statham P23ID transducer was utilized, data collected by the computer 400, and also recorded on a chart recorder. A standard A/D converter was utilized to converted the transduced analog signal to digital data for storage and processing by the computer 400. It is to be understood that this particular set-up is exemplary in nature and illustrates one of the various ways in which the biological data can be obtained for processing by the invention.

FIG. 9(a) shows the results of measuring the rat's blood pressure for a 24-hour period with the pressure waveform being sampled at a rate of 100 points/second. A one hour strip of this data is shown in FIG. 9(b). Two separate 10-second strips of this data are shown in FIGS. 9(c)–(d) with 9(c) exhibiting less regularity than 9(d). FIGS. 9(e)–(f) are the systolic peaks and diastolic troughs for the one hour record shown in FIG. 9(b), obtained by connecting the successive peaks and successive valleys, respectively.

In order to compare the invention against conventional methodologies, FIG. 10(a) is presented which shows the conventional Fourier Spectrum for the one-hour data of FIG. 9(b). FIG. 10(a) shows this Fourier Spectrum from which one can easily identify spectral peaks at 1.5, 6.5 and 13 Hz. The 6.5 Hz peak represents the heartbeats which necessarily affect blood pressure. The 13 Hz peak is the harmonic of the 6.5 Hz heartbeat peak. The 1.5 Hz peak is probably related to respiration.

Figure 10D:
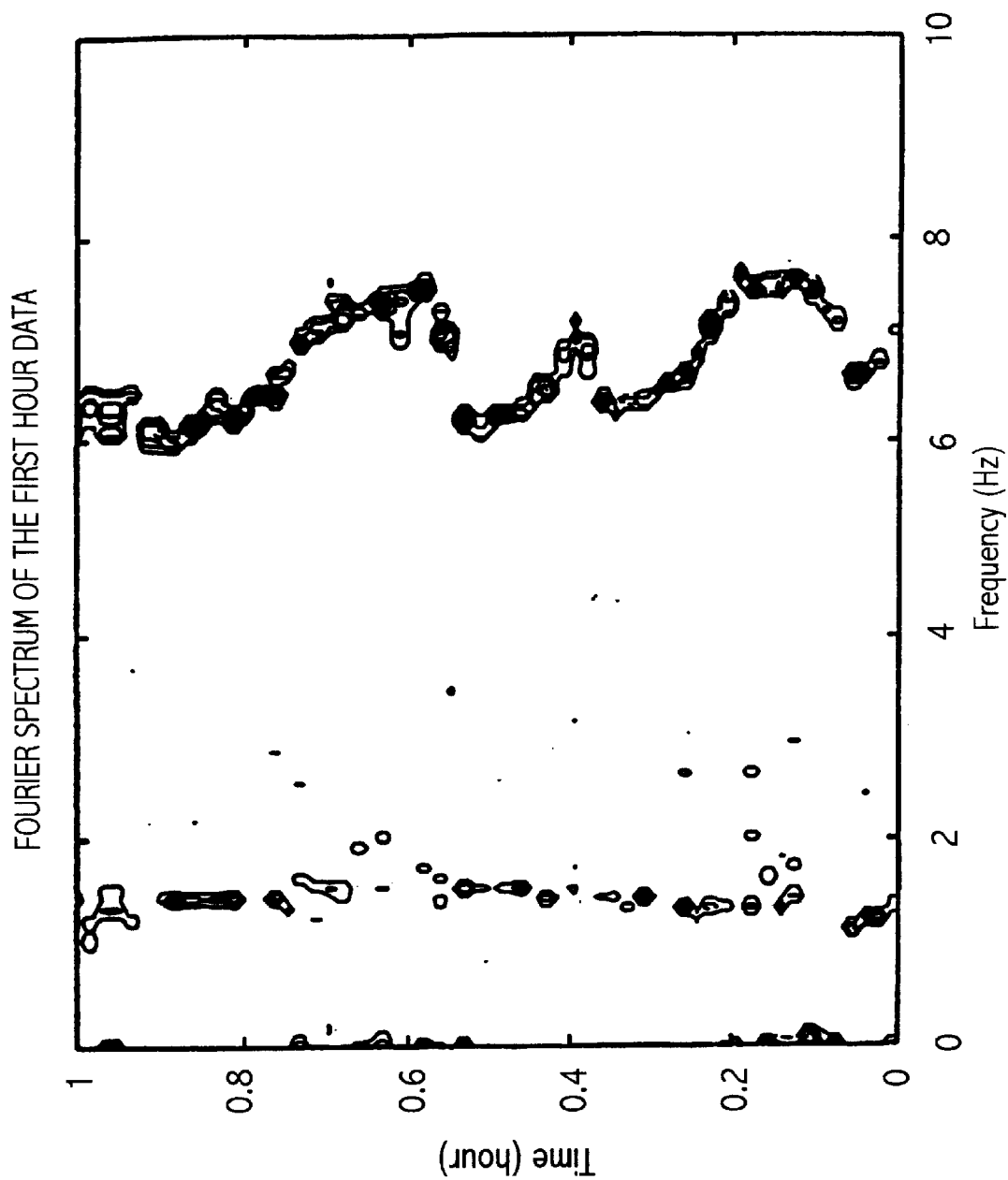
Figure 10E:
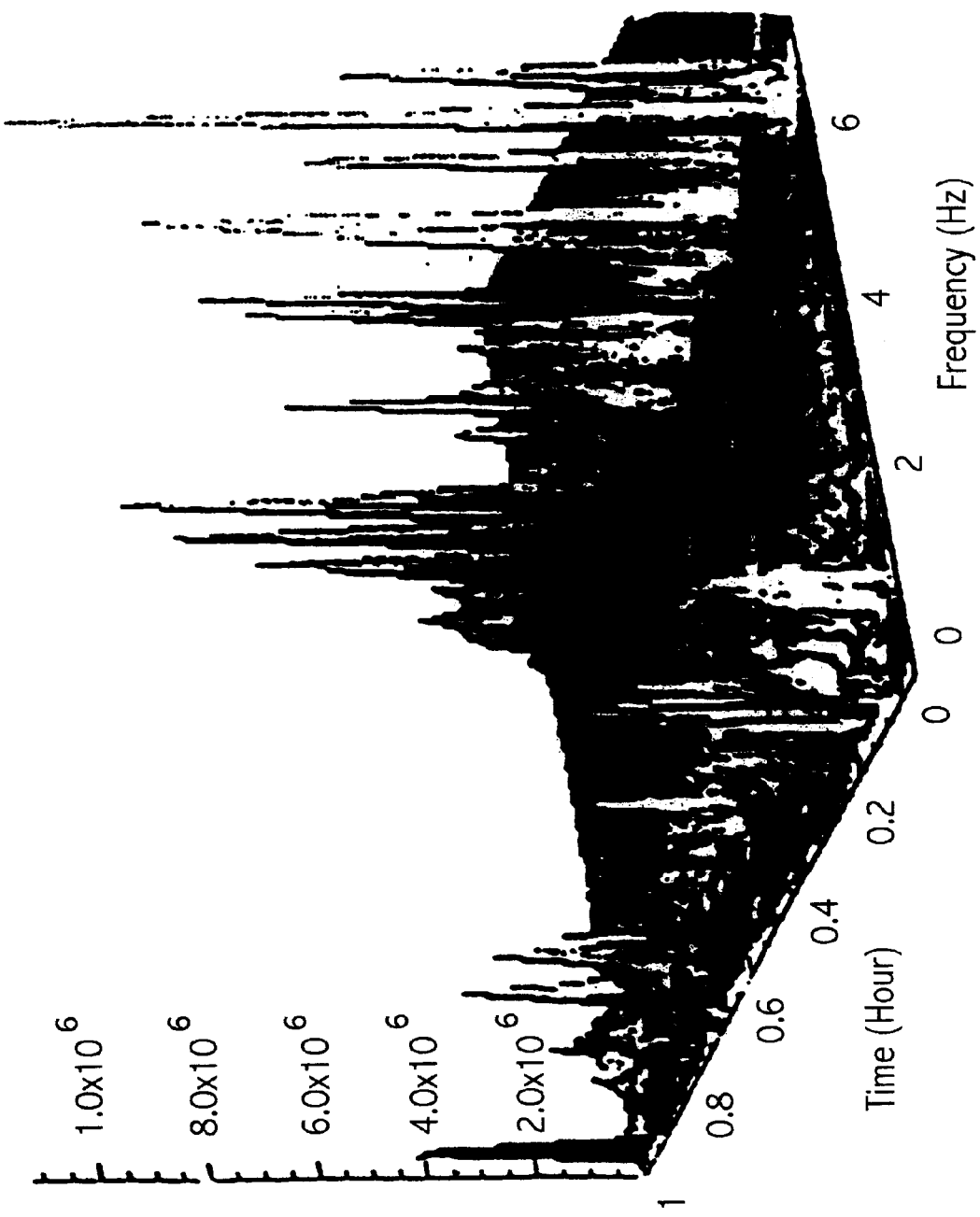
Figure 10F:
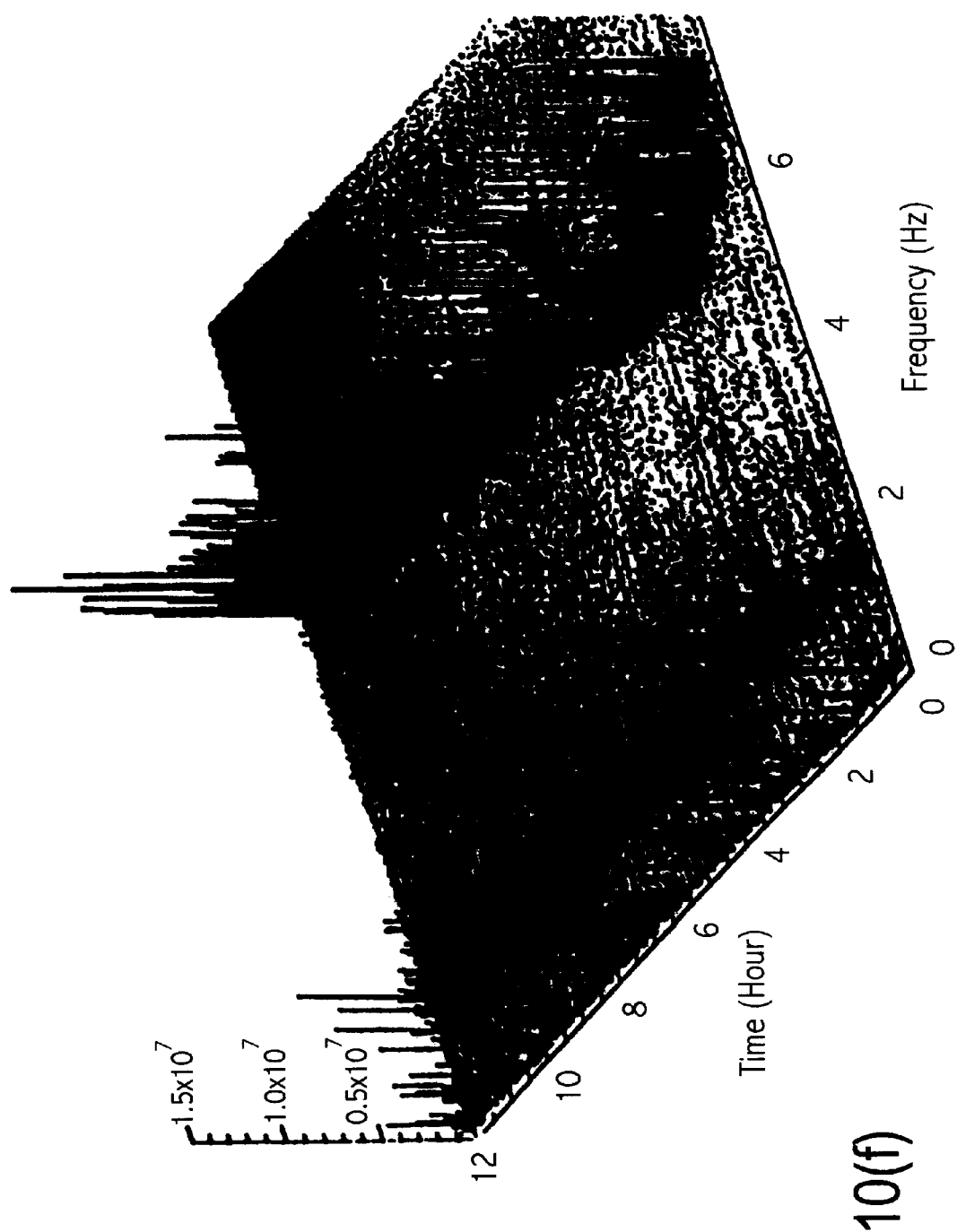

FIGS. 10(b)–(c) show conventional Fourier spectra for the two 10-second sections of data (FIGS. 9(c)–(d)). Fourier analysis for the one-hour data of FIG. 9(b) is shown in FIG. 10(d) in which the locations of the highest peaks of the Fourier spectra in every 1-minute window are plotted on the time-frequency plane. A perspective view of the windowed 1-hour and 10-sec Fourier results Fourier results are given in FIGS. 10(e) and 10(f), respectively and show the variation of the amplitudes of the signals.

Figure 10G:
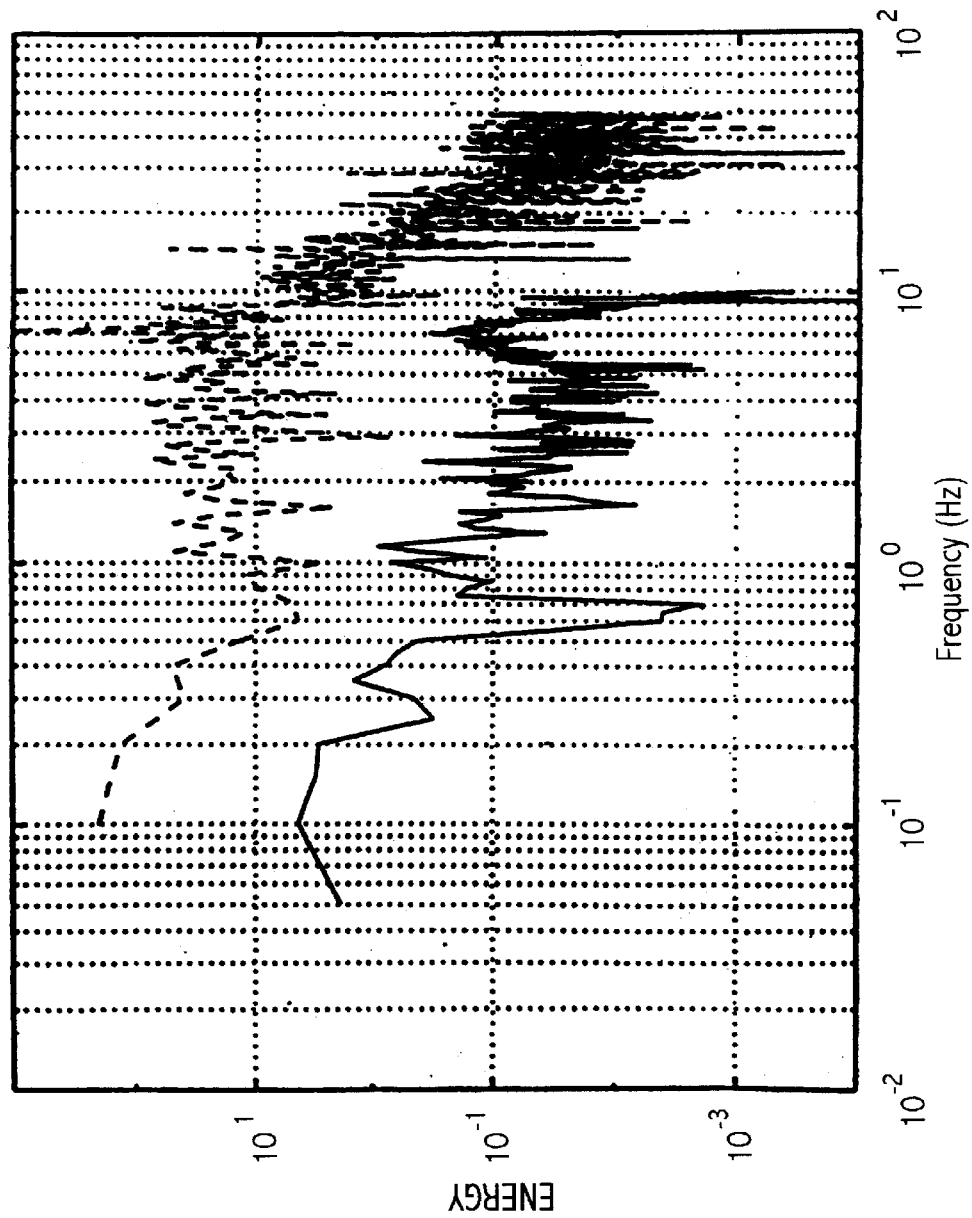

FIG. 10(g) directly compares the inventive results against conventional techniques. In FIG. 10(g), the Fourier (dotted line) spectra and the Marginal Hilbert (solid line) spectra of the blood pressure data from FIG. 9(c) are plotted together. As can be seen from this comparison, the Fourier spectra devotes a great deal of energy to the higher-harmonic components.

As explained above, the invention adopts the spacing of extrema values to analyze the data. Specifically, the sifting process is applied to the data to extract a set of intrinsic mode functions.

FIGS. 11(a)–(h) show the results of applying the empirical mode decomposition method of the invention to the blood pressure data of FIG. 9(c). As shown therein, the invention produces eight IMFs from this blood pressure data. The residual IMF $R_8$ is constant.

FIGS. 12(a)–(h) show the results of applying the Empirical Mode Decomposition method of the invention to the blood pressure data of FIG. 9(d). As shown therein, the invention produces eight IMFs ($C_1$–$C_8$) from this blood pressure data. The residual IMF $C_8$ (a.k.a $R_8$) is constant.

In FIGS. 12(a)–(h), the IMF components have very different amplitudes. The IMFs having the most energy are $C_2$, $C_3$ and $C_4$. The amplitude and periodicity of these three main components closely approximate their respective, constant levels.

By recognizing the main or most significant IMFs, one can reconstruct a filtered version of the signal that eliminates undesired components while continuing to faithfully represent the original signal. For example, FIG. 13(b) shows a combination of IMFs $C_2$, $C_3$ and $C_4$. The sum of these components faithfully represents the original signal as can be seen by comparing the IMF sum in FIG. 13(b) with the original signal in FIG. 9(c).

Of course, other filters can be constructed with the IMFs. One such example is FIG. 13(a) which shows a summation of IMFs $C_1$, $C_2$ and $C_3$ that were calculated from the blood pressure signal of FIG. 9(c).

Another filtering example is shown in FIG. 13(c) which is a sum of IMFs $C_4$, $C_5$, $C_6$, $C_7$ and $C_8$ shown in solid line. These components are the lower-frequency components and their sum recovers the slow variation of the pressure signal. The dotted line in FIG. 13(c) shows the original pressure signal.

FIGS. 14(a)–(b) show the Hilbert spectrums of the IMF components derived from the FIGS. 9(d) and 9(c) blood pressure signals, respectively. Specifically, The Hilbert spectrum of FIG. 14(a) shows that the most prominent energy bands are centered at 6.5, 3.0 and 1.5 Hz. As shown, there are intra-wave frequency modulations in this spectrum which are indications of nonlinear dynamics. The wide fluctuations of frequency values in the FIG. 14(b) Hilbert spectrum make any visual mean estimation exceedingly difficult.

By further applying the inventive methodologies, a marginal Hilbert Spectrum can be calculated by integrating the Hilbert Spectrum. An example is shown in FIG. 10(g) which uses a solid line to plot the marginal Hilbert spectrum of the FIG. 9(c) blood pressure signal. Prominent spectral peaks occur at 7 and 1.3 Hz.

FIG. 10(g) also uses a dotted line to plot the corresponding Fourier Spectrum. By comparing these spectra, one can see that the mean peaks line up. However, the Hilbert spectrum clearly depicts the fluctuation of energy over frequencies without allowing the frequency of oscillation to be variable in the whole time window.

One basic difference between the conventional spectra of FIG. 10(d) and the inventively derived spectra of FIG. 14(a) lies in the stationarity hypothesis. In FIG. 10(d), the Fourier spectrum assumes stationary oscillation. In FIG. 14(a), the Hilbert spectra, does not make this assumption and is valid for nonstationary oscillations.

By using the invention, one can more readily and accurately recognize the various features of blood pressure signals. Moreover, the invention offers a more comprehensive view of the blood pressure fluctuation than the classical Fourier analysis.

The invention may also be used to study the effect of one variable on another variable. Specifically, by changing one variable of a system, measuring the effect on another variable, and then applying the invention one can arrive at a much deeper understanding of underlying system. The invention also permits the modelling or representation of data with an analytic function that was not possible with conventional techniques.

Biological systems are examples of systems which can be better understood and modelled by applying the invention. Biological systems are often studied by changing one variable and recording the changes of other variables The resulting data is often oscillatory, stochastic and nonstationary. Data having these properties are particularly susceptible to processing by the invention.

A particular example elaborated upon here is the effect of changing the breathing gas concentration of oxygen on the blood pressure of an animal. Analyzing such stochastic data to obtain crystal clear results describing the effects of oxygen concentration changes on blood pressure has been impossible with conventional techniques such as Fourier analysis.

Concrete data illustrating this example is shown in FIGS. 15(a)–(d). Specifically, the pulmonary blood pressure in the arterial trunk of two rats breathing normal air at sea level is shown in the upper trace of FIGS. 15(a)–(b) with the lower trace showing the oxygen concentration.

Figure 15C:
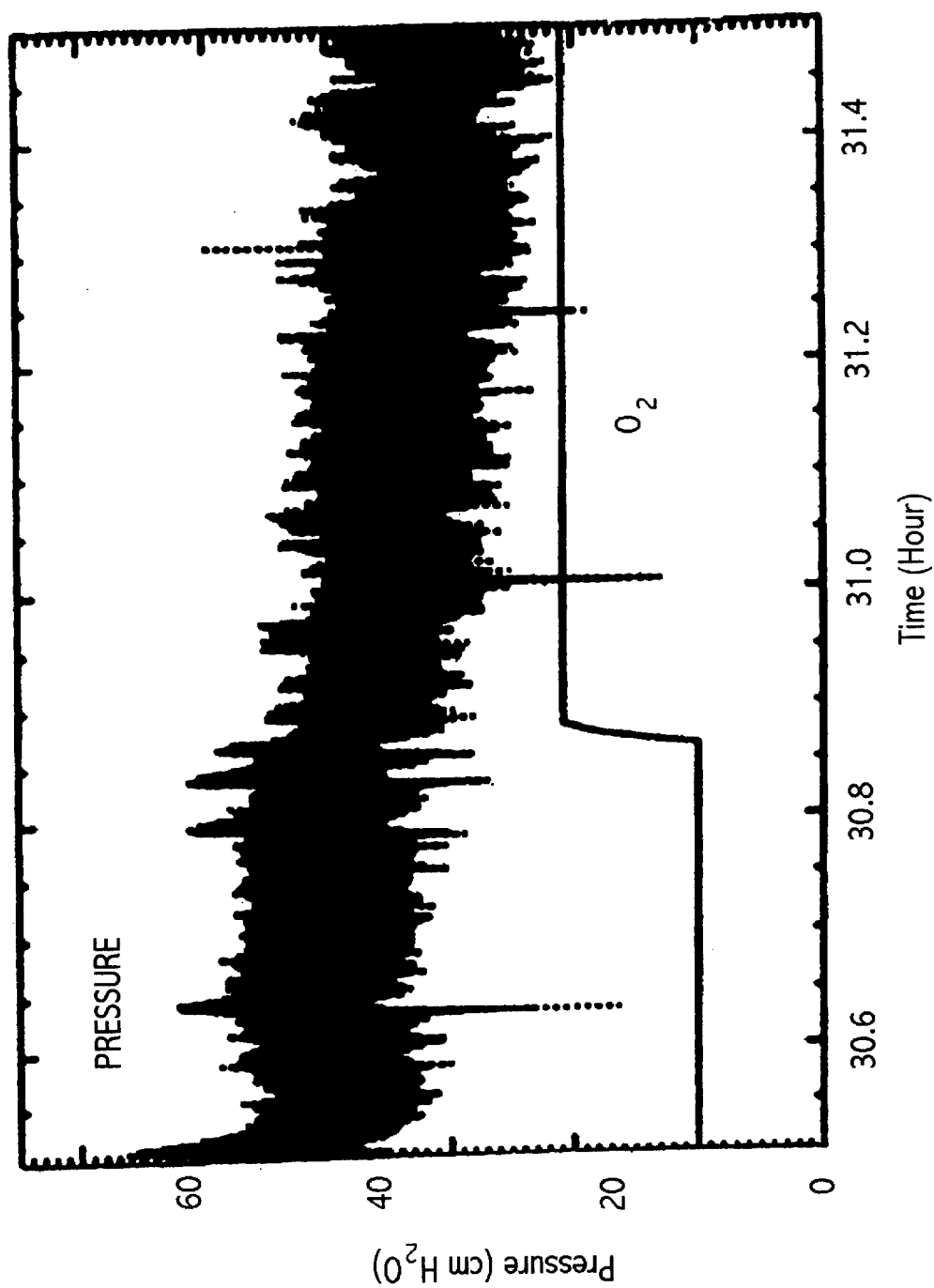
Figure 15D:
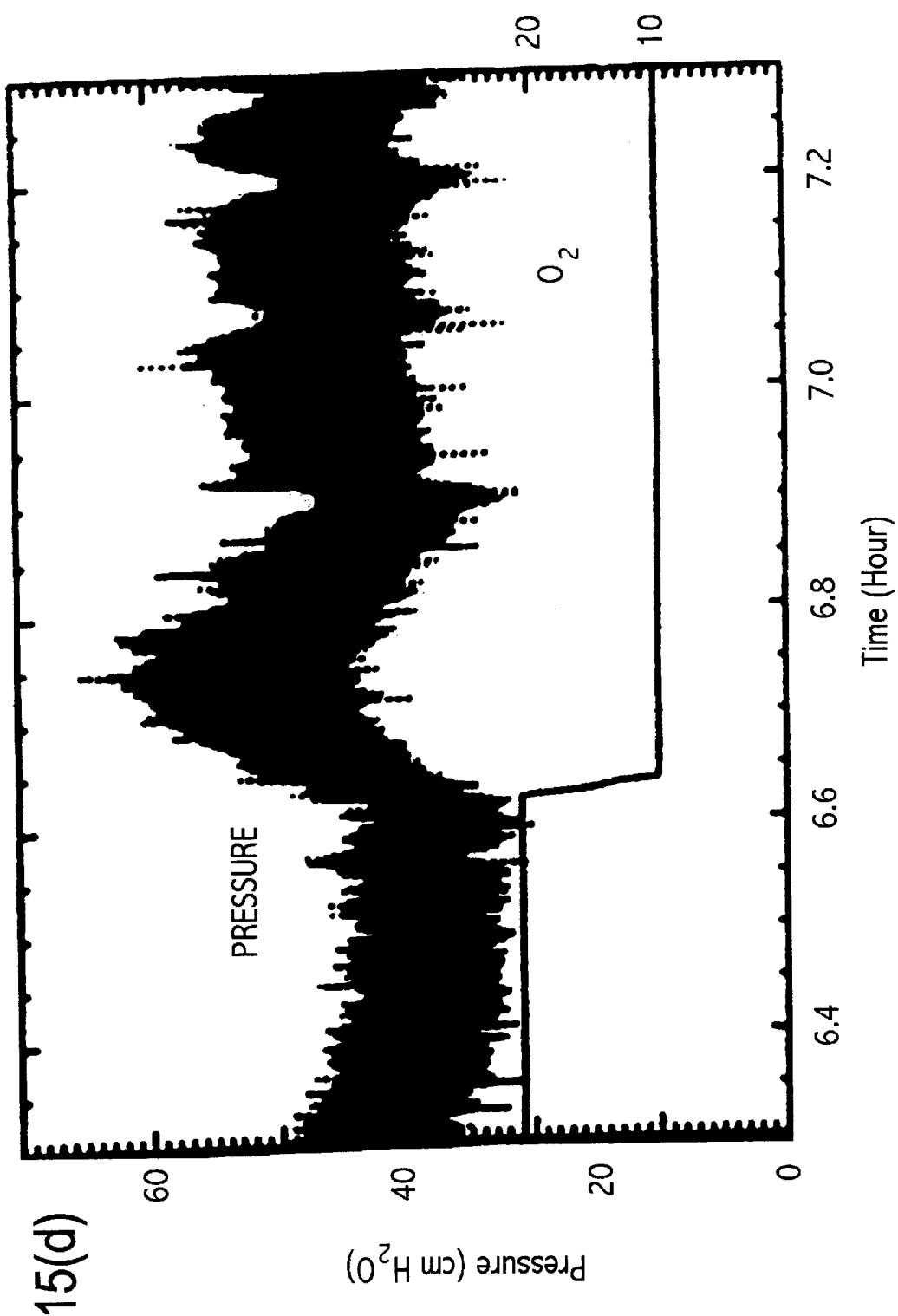

These same rats where then subjected to step changes in oxygen concentration: FIG. 15(c) shows a step increase and 15(d) shows a step decrease in oxygen concentration and the effect thereof on blood pressure. From this raw data, one can see certain trends. However, there is no definitive way to handle this overwhelmingly complex data to reveal the underlying physiological variations. Fourier analysis simply does not work for such nonstationary signals. By applying the invention, however, which works particularly well with nonstationary signals, one can arrive at a much deeper understanding of the underlying physiology.

Figure 15E:
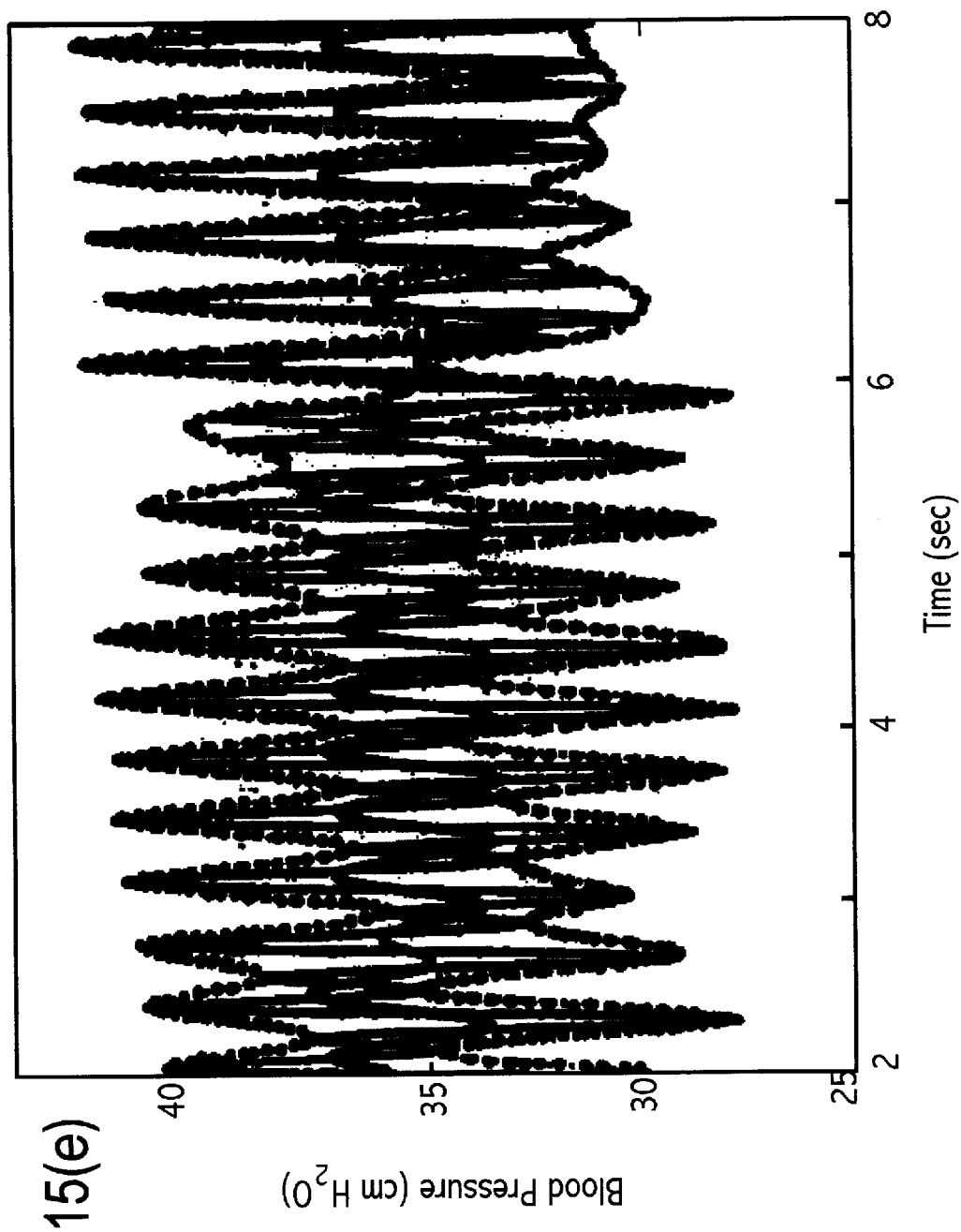
Figure 15F:
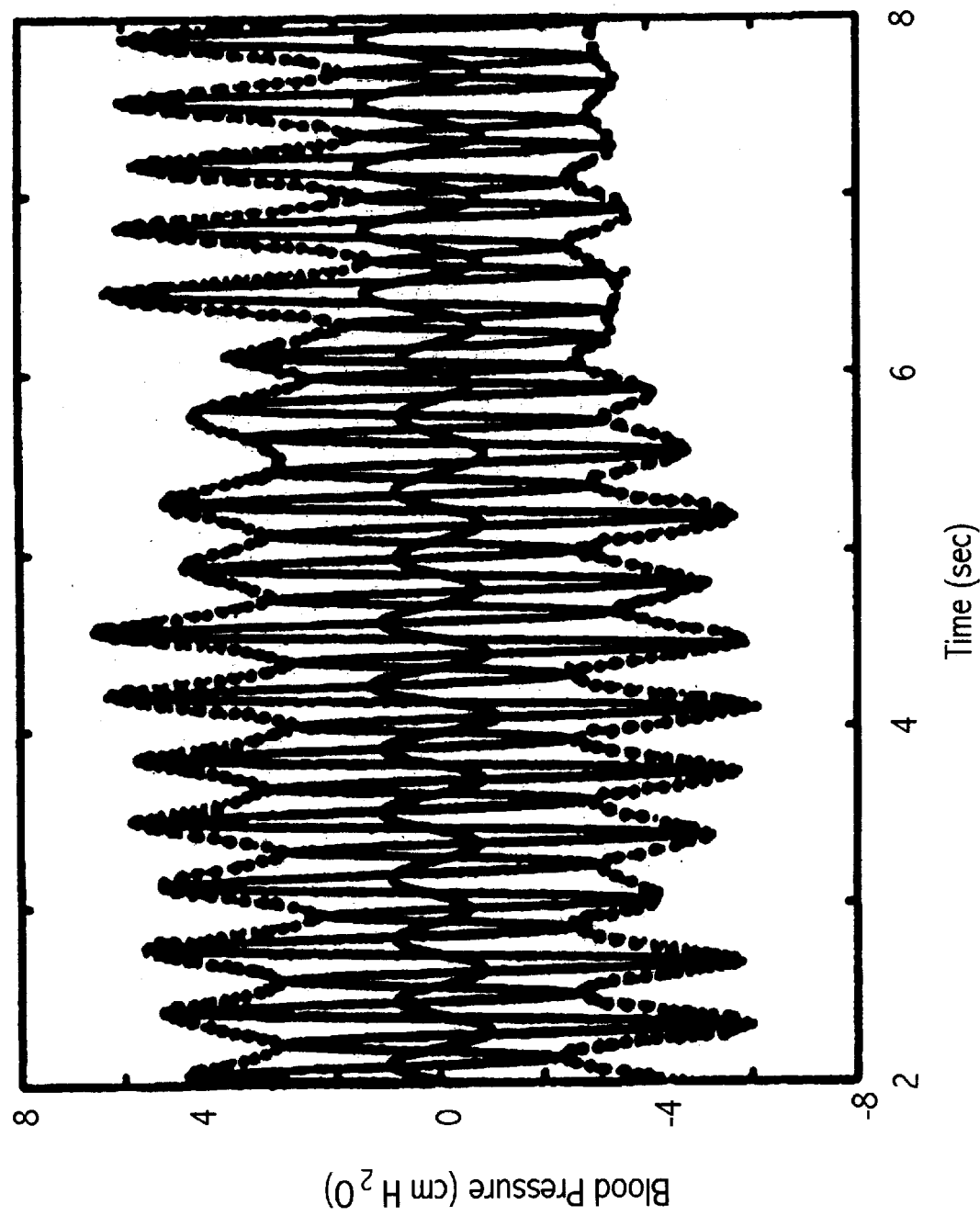
Figure 15G:
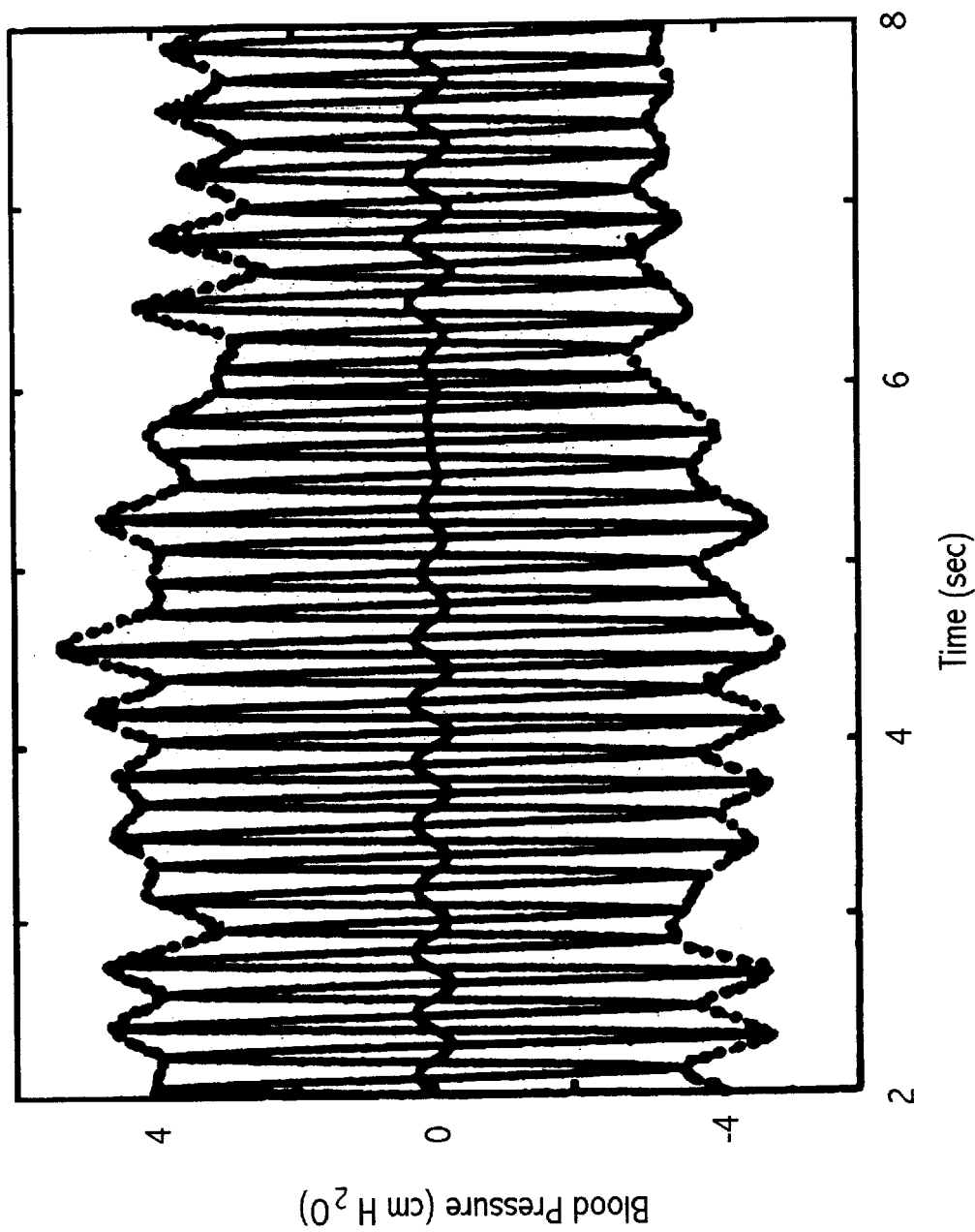
Figure 15H:
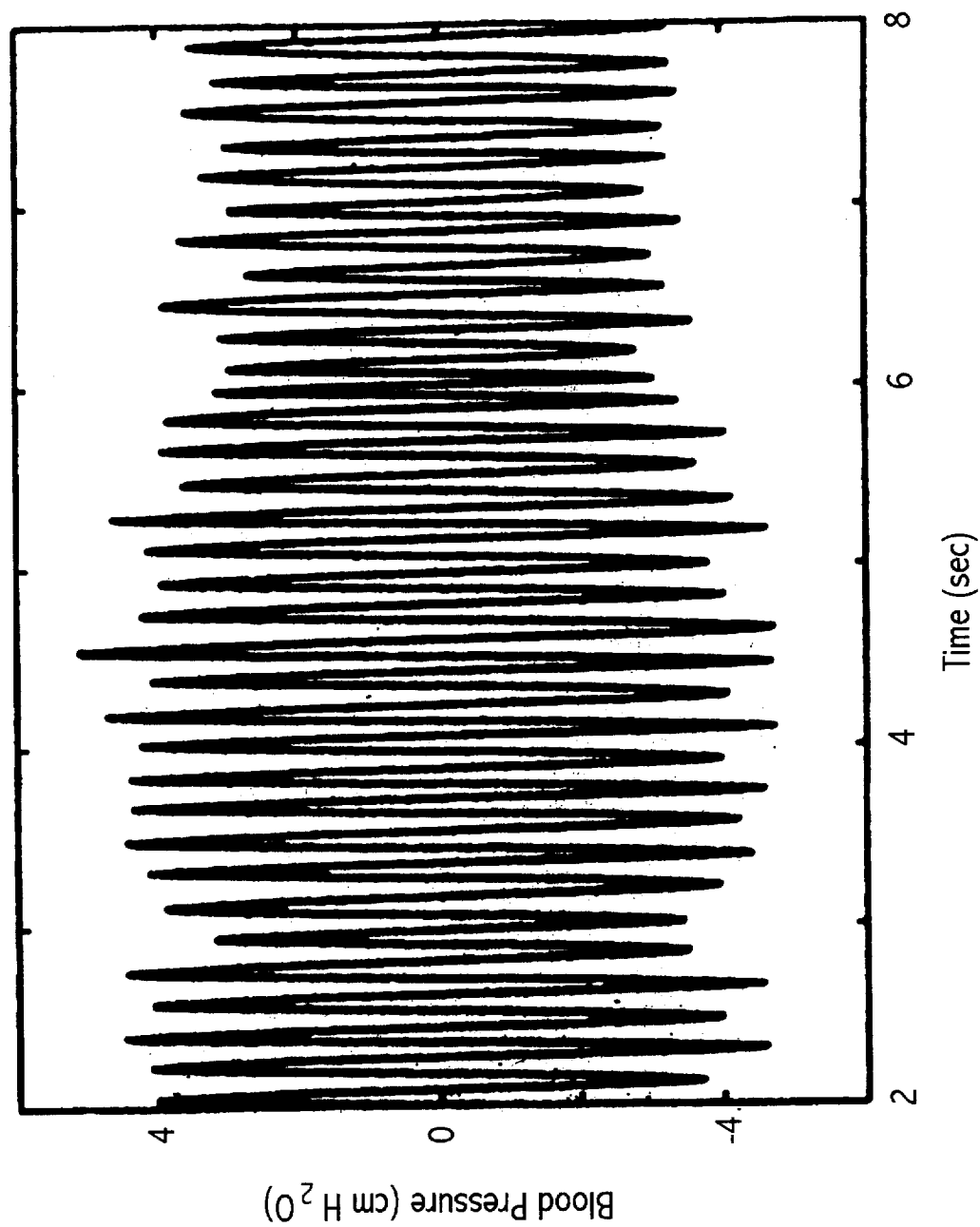

As described above in detail, the invention applies a unique Sifting Process. FIGS. 15(e)–(h) illustrate this Sifting Process as it is applied to the blood pressure signal of FIG. 15(b). Specifically, FIG. 15(e) illustrates generating the envelopes (dot-dash line) by connecting successive extremas (peaks and troughs) of the signal (solid line) with cubic splines. The mean of these two envelopes is shown in FIG. 15(e) with a thick solid line and is denoted by the symbol $m_1(t)$ The difference, $X(t)-m_1(t)$ is designated $h_1(t)$ as is shown in FIG. 15(f). From this figure, it can be seen that $h_1(t)$ has a few negative local maxima and positive local minima, suggesting that further Sifting needs to be performed before the first intrinsic mode is generated by the invention and that the quantity $h_1(t)$ is not yet a true representation of an "oscillation about the mean."

To improve this situation, two definitive requirements are imposed for a function that represents the "oscillations about the mean": (i) in the whole data set, the number of extrema and the number of zero-crossings must either be equal or differ at most by one, and (ii) at any time, the mean value of the envelope of the local maxima and the envelope of he local minima must be zero. As oscillatory function that is processed to satisfy these definitions is called an intrinsic mode function (IMF) as more fully described above.

The function $h_1(t)$ shown in FIG. 15(f) does not satisfy this definition or the requirements of an IMF. Thus, further Sifting is performed by treating $h_1(t)$ as the new data set and repeating the Sifting Process including determining the new upper and lower envelopes, computing their new mean $m_{11}(t)$.

The difference $h_1(t)-m_{11}(t)$ is designated at $h_{11}(t)$ which is treated as the new data set. The process is repeated a number of times (FIGS. 16(g)–(h)) until it converges. The convergent result, FIG. 16(g), is designated by $C_1(t)$ and is the first intrinsic mode function, which has a zero local mean.

The difference between $X(t)$ and $C_1(t)$ is a function of time representing a "mean tread" after the first round of Sifting. It is designated as the "first residue" $R_1(t)$: $X(t)-C_1(t)=R_1(t)$ The first residue, $R_1(t)$, is again oscillatory and can be analyzed as new data by another round of Sifting in the Empirical Mode Decomposition Process, yielding the second intrinsic mode function $C_2(t)$ and the second residue $R_2(t)$. The process is continued until either the residue of the intrinsic mode function becomes less than a predetermined small number of the residue becomes nonoscillatory. The resulting IMFs are shown in FIGS. 16(a)–(p).

If the process takes n steps, the original signal X(t) can be represented as follows:

$$X(t) = C_1(t) + C_2(t) + \ldots C_n(t) \tag{24}$$

The last term $C_n(t)$ represents the nonoscillatory mean trend of the signal. As such, important information exists in this mean trend particularly for certain types of data.

The other terms $C_{n-1}$, $C_{n-2}$, etc represent the oscillatory portion of the mean trend. Each term represents a different spectral portion of the mean trend.

With the IMFs in hand, further processing is possible. One such processing technique is filtering in which certain IMFs are combined or summed while leaving out other IMFs.

For example, a low-pass filter or low-frequency representation $M_k(t)$ of the mean trend of the signal X(t) can be generated as follows:

$$M_k(t) = C_k + C_{k+1}l + \ldots C_n \tag{25}$$

where 2<k<n

The lower the value of k, the more oscillations $M_k(t)$ contains. By adjusting the values of k and n, a variety of filters may be constructed each having desired characteristic(s).

Representing the original data, e.g. of FIG. 15(a), with an analytic expression is not always possible or practicable. The invention, however, offers a technique of accurately representing the physically meaningful portions of a signal with an analytic function.

For example, when one examines the indicial functions that represent the changes of the signal X(t) in response to step changes in oxygen concentration, one looks for changes in the mean treads $M_n(t)$, $M_{n-1}(t)$, and . . . with respect to changes in $O_2$ level. To do this, it is helpful to fit the experimental result on $M_k(t)$ with an analytic function.

Particularly, if one takes the origin of time t=0 at the time of imposing a step change in oxygen concentration, the resulting change in the mean blood pressure in response thereto for t>0 can be represented as:

$$M_k(t) = A_1 + A_2 e^{-\lambda_2 t} + A_3 t e^{-\lambda_3 t} + A_m t e^{-mt} \tag{26}$$

where constants $A_1$, . . . $A_m$, and $\lambda_2$, . . . $\lambda_m$ may be determined with a conventional least-squares estimation technique.

The above estimation is greatly affected by the choices of k and m. By appropriately selecting k and m, different degrees of detail can be presented.

In reality, one can only approximate a step function change of $O_2$. The dropping step of FIG. 15(d) and the rising step of FIG. 15(c) cause different changes in blood pressure. Hence, two different empirical functions are utilized. For the first case, the equation is:

$$M_k(t) = p_m(t_0)\left[1 + A_1(t-t_0)e^{-\lambda_1 \frac{t-t_0}{T_1}} + A_2(t-t_0)e^{-\lambda_2 \frac{t-t_0}{T_2}} + A_3\left[1 - e^{-\lambda_3 \frac{t-t_0}{T_3}}\right]\right] \tag{27}$$

for $t_0 \leq t$, where $t_0$ is the instant of time when $O_2$ concentration drops suddenly, and $p_m(t_0)$ is the measured value of $M_k(t_0)$. For the second case the following equation appears good enough:

$$M_k(t) = p_m(t_1)[1 + A_4[e^{-\lambda_4(t-t_1)} - 1]] \tag{29}$$

for $t_1 \leq t$, where $t_1$ is the time when the $O_2$ concentration increases suddenly. The variables $A_1$, $A_2$, $A_3$ and $A_4$ are dimensionless.

Taking the analysis into the spectral domain, the invention offers further tools. As defined above, the Hilbert transform of X(t) is Y(t). Hilbert has shown that the complex variable Z(t)=X(t)+iY(t) is an analytic function of t and can be written in polar coordinates as a(t)exp{iθ(t)}, thus defining the amplitude a(t) and phase angle θ(t).

As further defined above, an instantaneous frequency ω(t) can be calculated from the derivative of θ(t) with respect to time. Knowing the amplitude a(t) and frequency ω(t) as functions of time, one can plot contour maps as shown in FIG. 23(a). The contour maps of the amplitude as functions of frequency and time are called the Hilbert amplitude spectrum, H(ω,t).

The vanishing of the local means of the IMF's $C_1$, . . . $C_{n-1}$ is a very important result because the amplitude a(t) and phase angle θ(t) of the Hilbert spectrum are sensitive to the local means.

Using the definition above $\{M_k(t) = C_k + C_{k+1} + \ldots C_n$, where 2<k<n} to represent the mean trend, the invention further defines the corresponding sum as follows:

$$X_k(t) = C_1(t) + C_2(t) + \ldots C_k(t) \tag{30}$$

to represent the oscillations about the mean trend $M_{k+1}(t)$. The Hilbert amplitude spectrum of $X_k(t)$ may be designated as $H_k(\omega,t)$. The square of $H_k(\omega,t)$ represents an oscillatory energy density. Thus, the invention also defines the oscillatory energy about the mean, $E_k(t)$, by an integration over all frequencies as follows:

$$E_k(t) = \int_\omega H_k^2(\omega, t) d\omega \tag{31}$$

The variations of $E_k(t)$ and $M_k(t)$ with oxygen level $O_2(t)$ yield the desired summary of information about the transient response of X(t) to $O_2(t)$.

The oscillatory energy about the mean $E_k(t)$ is quite similar to the instantaneous energy instantaneous energy density, IE, described above. The difference is that the $E_k(t)$ is calculated from a subset (k) of the IMFs while IE is calculated from the full set of IMFs. In other words, the oscillatory energy about the mean is derived from a filtered version of the original signal in which a subset (k) of the IMFs is utilized to construct the filtered signal. This contrasts with instantaneous energy density which is derived from the full set of IMFs.

The oscillatory energy about the mean $E_k(t)$ is another nonstationary stochastic variable that can be treated in the same manner as outlined above. Specifically, the progression from steps 350 to 370 to 120 in FIG. 1(d) provide a process for applying EMD to $E_k(t)$ to generate another set of IMFs. The IMFs thus generated may be further processed according to the techniques disclosed herein. The process may be repeated as many times as desired as indicated by the loop in FIG. 1(d).

From the IMF's shown in FIGS. 16(a)–(p), one can compute the mean trend functions $M_k$ from equation 25 set forth above. The results are shown in FIGS. 17(a)–(f) which are the main results to be used for the indicial response determination.

The next step (360 FIG. 1(d)) is to generate analytic functions or otherwise perform a curve fitting process. This is a chief advantage of the present invention because for many data sets, such as the blood pressure data in FIGS.

15(a)–(d), deriving analytic functions is impossible. By applying the inventive methodologies, however, deriving such analytic functions is possible. Specifically, the mean trend data extracts relevant data and removes unnecessary or irrelevant data thereby producing a simplified data set for which it is possible to derive an analytic function. The degree of simplification and extraction can be controlled by properly selecting which IMF components are included in the mean trend data.

The analytic representation of the indicial response functions of FIGS. 17(a)–(f) by equations 26–28 was done with a least-squares error method. The results are shown in FIGS. 18(a)–(c) and 19(a)–(c). These are the primary results of interest for tissue engineering analysis and design.

Specifically, the results shown in FIGS. 18(a)–(c) and 19(a)–(c) provide indicial response functions of the mean pulmonary blood pressure at the arterial trunk in response to a step decrease or a step increase in breathing gas oxygen concentration. A similar analysis can be directed toward the oscillation modes defined by equation 29.

The oscillation modes for k=1, 2, 4, and 6 are respectively shown in FIGS. 20(a)–(d). The signals shown in these figures contain a lot of information that needs to be extracted into simple, understandable terms. This can be done by applying the Hilbert transform and generating the Hilbert spectrum. The results are shown in FIGS. 21, 22(a)–(h), 23(a)–(b). Specifically, FIG. 21 is a plot of the oscillatory energy defined by equation 29 as a function of time. This spectrum is analyzed as a nonstationary random signal by the invention to resolve it into oscillatory IMF modes and mean trend functions $M_k(t)$, with the associated analytic functional representation as illustrated in FIGS. 22(a)–(h) for k=9, 10, . . . , and 16.

To further analyze the data, the results of calculating the instantaneous frequency and amplitude of oscillations of the pressure signal X(t), made possible by the Hilbert transformation, can be plotted against time in a three-dimensional manner as sown in FIG. 23(a). The same can be plotted two-dimensionally dimensionally on the plane of time and frequency by the contour lines of equal amplitudes, as show in FIG. 23(b).

FIG. 24 is a conventional FFT amplitude spectrum of the pressure signal in 1-min segments under the assumption that the process is stationary in each segment. This conventional spectrum provides a basis of comparison against the Hilbert spectra generated by the invention.

As mentioned above, Fourier analysis is based on the hypothesis of segmental stationary random oscillation, the principle of linear superposition of sine waves, and a global average of waveform convolution over each time segment. The HHT is based on the hypothesis of nonstationary processes, the principle of linear superposition of nonlinear IMF's, and local determinations of amplitude and frequency (through differentiation rather than convolution) of each IMF. In terms of the IMF, the first k modes can be added together the represent oscillations about the mean trend $M_{k+1}(t)$.

The Fourier series cannot represent time variation of a nonstationary signal and does not have a property or capability to separate a signal into two parts, one part representing a mean trend while the other part represents oscillations about the mean. The number of intrinsic modes, n, is finite: in general, $n<\log_2 N$, where N is the total number of data points. The number of harmonics in Fourier analysis is N/2.

Comparison of the Hilbert and Fourier spectra respectively shown in FIGS. 23(b) and 24 shows that both spectra display a major frequency component at approximate 5 Hz where the energy is concentrated. This is close to the heart rate of the rat subject. This rate decreases when the oxygen concentration is decreased. These two spectra are in different vertical scales. The Hilbert spectrum contains no energy with frequency>10 Hz, and it also has fewer yet more diffused frequency bands that the Fourier spectrum. This is because the Hilbert spectrum gives only the global mean. The mean values certainly will show less variations.

The Fourier spectrum of FIG. 24 contains more frequency bands because any deviation of the waveform from the basic sinusoidal harmonic will result in strong higher harmonics whereas the Hilbert spectrum allows variation of instantaneous frequencies, hence the fuzzy spread in the frequencies. This calls attention to the fact that the heart rate is also a stochastic variable, which could be studied by the inventive methods disclosed herein. The strong higher harmonic band with frequency>10 Hz in the Fourier spectrum is probably spurious. In other words, the Fourier components above 10 Hz (staring at around 15 Hz at time 0) have no physical meaning.

In contrast, the inventive results of FIG. 23(b) show a rich variety of low frequency components thereby conveying important information not available in the conventional result of FIG. 24. Thus, the invention is capable of more a more accurate physical representation of the underlying phenomenon than conventional Fourier-based analysis. Moreover, the clarity of the set of mean trends and the corresponding set of the oscillations is a unique contribution of the invention.

Thus, the invention provides useful tools for concisely and precisely describing the affect of changing one variable on another variable. The effect on blood pressure caused by changing the $O_2$ concentration provides a good illustrative example of these tools.

To further illustrate the broad applicability of the invention and its potential as a diagnostic tool, an abnormal condition (disease) was chosen. The particular abnormal condition chosen for illustration purposes is sleep apnea. This is a common condition in which the airway is temporarily obstructed during sleep causing the subject to eventually gasp for air.

To study this condition, heart rate data was taken from a subject as shown in FIG. 25. More accurately, the data is a measure of the time interval between pulses (pulse interval) of the heart plotted against time. Thus, small values indicate a fast heart rate and large values indicate a slow heart rate. This data includes a normal data section and an abnormal data section, both of which are labelled.

As will be shown in detail below, the invention provides powerful tools for studying this condition. Although the results to date are preliminary, they do indicate that the invention is capable of diagnosing this condition. Of course, further studies are necessary before a reliable diagnosis can be made using the invention.

To improve the analysis, the data of FIG. 25 was processed to make the spacing between data points even. Furthermore, a section of the normal data (no apnea episode) was extracted for separate analysis. A blowup of the normal data having even spacing between data points is shown in FIG. 26. A further blowup is shown in FIG. 28.

The data of FIG. 26 was then subjected to the inventive EMD to produce eight IMFs, $C_1$–$C_8$, as shown in FIGS. 27(a)–(h). The resulting IMFs provide important, and heretofore unavailable, data to a person attempting to gain a better understanding of sleep apnea particularly when these normal IMFs are compared against abnormal (apnea) IMFS.

The IMFs of FIGS. 27(a)–(h) were then utilized to construct the Hilbert Spectrum shown in FIG. 29. This Hilbert Spectrum provides additional information about normal sleep patterns and how they are reflected in the subject's heart rate.

To continue the analysis, an abnormal data section (FIG. 30) was subjected to the inventive EMD to produce eight IMFs, $C_1$–$C_8$, as shown in FIGS. 31(a)–(h). The third IMF $C_3$ is believed to be particularly important in analyzing and perhaps even diagnosing sleep apnea.

FIG. 32 is a blowup of the abnormal data of FIG. 30. The abnormality is apparent around second 5005 where the airway is temporarily blocked thereby causing the heart to race in an effort to extract the diminishing oxygen still available in the lungs. The sharp spike just after second 5005 illustrates the gasping breath and the resulting sharp increase in the pulse rate interval (corresponding to a decrease in the heart rate).

FIG. 33 is the resulting Hilbert Spectrum of the abnormal data of FIG. 30. Comparisons between the normal Hilbert Spectrum of FIG. 39 with the abnormal Hilbert Spectrum of FIG. 30 yields further information for studying and understanding sleep apnea.

To further illustrate the wide applicability of the invention, it was applied to study epilepsy. Epileptic seizures occur when the brain's neurons fire in synchronism. The sequence starts from an epicenter and then propagates to an entire hemisphere of the brain. Even at this stage, the patient can still function in a relatively normal manner. When the synchronization propagates to both hemispheres of the brain, then the patient will suffer a seizure.

To study epilepsy, heart beat rate data was chosen. FIG. 34 shows heart rate data (beats per minute) that was collected from a patient before, during and after a seizure. The time 0 is the starting point of the seizure.

FIGS. 35(a)–(i) show the IMF generated by the inventive EMD method applied to the FIG. 34 data. These IMFs reveal important and physiologically meaningful data not available to a researcher before the application of the present invention.

FIGS. 36(a) and (c) illustrate two IMFs (modes 1 and 3) which may be utilized to correlate the data and study epilepsy. These IMFs are shown in alignment with the original heart rate data (FIG. 36(b)). As is apparent from these figures, the first and third have components that appear to correlate with the onset of a seizure.

The Hilbert Spectrum of FIG. 37 was generated by the invention from the data of FIG. 34. The trace along 18 to 20 cycles/min appears to be an indicator of epilepsy. To compare the invention against conventional techniques, a corresponding Wavelet Spectrum is shown in FIG. 38.

As can be seen by the above illustrative examples, the invention is a powerful tool capable of analyzing data and producing new, quantitative measurements that enhance the understanding of the underlying phenomenon producing the data. The IMFs themselves are important results of the inventive data analysis techniques and permit one to gain a level of understanding not possible with conventional techniques.

Although blood pressure, heart pulse interval, and heart rate data provide good examples of the invention's applicability to biological signals, it is to be understood that a large variety of other biological signals may be processed by the invention to gain a better understanding of the underlying biological process(es). Other examples include plethysmogram signals, electro-encephalogram (EEG) signals and temperature signals. Furthermore, the signal need not be taken from a living body and include in vitro studies such as current flow across membranes (patch clamping), fluorescence in confocal microscopy, spectroscopic signals, etc.

As mentioned above, the invention is also not limited to biological signal processing and includes the full range of real-world, data representative of an electrical, chemical, mechanical, optical, geophysical processes or phenomenon or combinations thereof all of which fall under the term "physical signal" as it was defined in the parent application.

Even further, the invention provides tools for studying the influence of one variable on another variable in a multi-variable system. The effect of hypoxia on blood pressure provides one illustrative example of this analysis. However, it is to be understood that any physical signal in a process or phenomenon having multiple variables of which the physical signal is one can be analyzed with the invention.

Alternative Embodiments

As described above, the invention constructs upper and lower envelopes 20, 30 with a cubic spline in steps 210 and 230, respectively and in step 560. This cubic spline fitting, however, has both overshoot and undershoot problems. These problems can be alleviated by using sore sophisticated spline methods, such as the taut spline in which the tension of the spline curve can be adjusted.

Another alternative is higher-order spline fitting. Although such higher-order spline fitting may be more accurate, it will, however, introduce more inflection points or extrema, and consume more computing time. Therefore, it is not recommended as a standard operation. Only in special cases, it may be tried.

As the spline fitting procedure is time consuming, more efficient methods can be devised by using simple mean values of successive extrema instead of computing the envelope-mean. In this way, only one spline fitting is required rather than two. Although this alternative is easier and faster to implement, the shortcomings are more severe amplitude averaging effects when the neighboring extrema are of different magnitudes. The successive-mean method will have a stronger forcing to reach uniform amplitudes, in which the true physics associated with amplitude will be destroyed. Therefore, the successive-mean method should only be applied where the amplitudes of the physical signal components are constants.

Either the envelope mean or the successive mean method, when applied with the requirement of absolute symmetry, will produce the absurd result of uniform amplitude IMF's. Therefore, the criteria in the Sifting Process should be chosen judiciously. One should avoid too stringent a criterion that we would get uniform amplitude IMF's. On the other hand, one should also avoid too loose a criterion that would produce components deviating too much from IMF's.

It is well known that the most serious problem of spline fitting is at the ends, where cubic splines can have wide swings if left unattended. As an alternative, the invention may utilize a method of adding characteristic waves at the ends of the data span. This confines the large swings successfully.

The method of adding characteristic waves is not conventional. In contrast, the conventional window that is often applied to Fourier transform data results in loss of useful data. To avoid this data loss and to confine swings at the ends of the data span, the invention extends the data beyond the actual data span by adding three additional characteristic waves at each end of the data span.

The characteristic waves are defined by the last wave within the data span at the end of the data span. In other words, a characteristic wave is added to each end of the data span having an amplitude and period matching the last wave within the data span. This characteristic wave is a sinusoidal waveform that is extended three sinusoidal wave periods beyond the data span at each end. This process is repeated at the other end of the data span. In this way, spline fitting at the end of the data span, which can otherwise have a wide swing, is confined. In other words, by adding the extra characteristic waves at the ends beyond the data span, the spline curve will be tied down so that it will not have wild or excessive swings that would otherwise corrupt the data processing and analysis that utilizes these cubic splines.

Other than the spline fitting, the Hilbert transform may also have end effects. Because the first and the last points of the data are usually of different values, the Fourier transform will introduce additional components to bridge over the difference resulting in the well-known Gibbs phenomena. To eliminate it in the Fourier transform, various windows have been adopted (see, for example, Brigham, 1974, *"The fast Fourier Transform"*, Prentice-Hall, Englewood Cliffs, N.J.).

Instead of a window which will eliminate some useful data at the end, the invention again adds two characteristic waves at either end. These waves all start from zero at the beginning, and end at zero at the end. Thus, the annoying Gibbs phenomena are greatly reduced.

Still further, the Hilbert transform needs over-sampled data to define the instantaneous frequency precisely. In Fourier analysis, the Nyquist frequency is defined by two points per wave, but the frequency is defined for a wave covering the whole data span. In the invention, the instantaneous frequency is defined through a differentiation process, and thus more data points will help defining the frequency more accurately. Based on the inventor's experience, a minimum number of data points to define a frequency is five (or four $\Delta t$'s ). The lack of fine time steps can be alleviated through interpolating more points between available data. As a spline interpretation would also not create nor annihilate scales, it can also be used for the interpolation when the data is very jagged from under-sampled data. The smoothed data though have a longer length and are sometimes easier to process. The interpolation may give better frequency definition.

Particular Limitations of the Invention

The dependence on the existence of scale for mode definition has one limitation: the decomposition method cannot separate signals when their frequencies are too close. In this case, there would not be any characteristic scale: therefore, physically they are identical. This may be the most severe limitation of the invention, but even here, the invented method can still work as well as the Fourier Analysis.

Particular Advantages of the Invention

The strength of the EMD method should be reiterated. EMD is built on the idea of identifying the various scales in the data which are quantities of great physical significance. Therefore, in the local extrema and curvature extrema Sifting Processes, orthogonality is not a consideration, but scales are. Since orthogonal decomposition is a characteristic for linear systems, violating this restriction is not a shortcoming but a breakthrough. Therefore, the decomposed IMF's may or may not be orthogonal. As such, this method can be applied to nonlinear data. Though the IMF's in most cases are practically orthogonal, it is a coincidence rather than a requirement of the EMD.

Another advantage of the method is the effective use of all the data representing the physical phenomenon. In the Sifting Processes, the longest scale is defined by the full length of the data. As a result, EMD can define many long period oscillations. As is well known, the Hilbert transform without sifting tends to identify the highest frequency (Boashash, 1992, *"Estimating and Interpreting the Instantaneous Frequency of a Signal, Part I: Fundamentals"*, Proc. IEEE, 80, 520–538.), the extraction of the long period components is indeed a new feature of the EMD.

Finally, though the EMD method will give IMF components, the individual component does not guarantee well-defined physical meaning. This is true for all decompositions, especially for the methods with a priori basis. In most cases, however, the IMF's do carry physical significance. Great caution should be exercised in making such attempts. The rule for interpreting the physical significance of the IMF's is that the scales should be clearly separated. Together with the Hilbert spectrum, the totality of the presentation should give a much more detailed representation of the physical processes than conventional methods.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A computer implemented method of analyzing a signal, comprising:

inputting the signal;

recursively sifting the signal via Empirical Mode Decomposition to extract an intrinsic mode function indicative of an intrinsic oscillatory mode;

generating a residual signal by subtracting the intrinsic mode function from the signal;

treating the residual signal as the signal during a next iteration of said recursive sifting step iterating to perform said recursive sifting to generate an n-th intrinsic mode function indicative of an n-th intrinsic oscillatory mode until a stopping condition is met; and constructing a filtered signal from a subset of the intrinsic mode functions.

2. The computer implemented method of analyzing a signal according to claim 1, further comprising:

transforming the intrinsic mode function with a Hilbert transform.

3. The computer implemented method of analyzing a signal according to claim 1, said recursive sifting including:

identifying local maximum values in the signal, constructing an upper envelope of the signal from the identified local maximum values, identifying local minimum values in the signal, constructing a lower envelope of the signal from the identified local minimum values, determining an envelope mean from the upper and lower envelopes, generating a component signal by subtracting the envelope mean from the signal, treating the component signal as the signal, and recursively performing said sifting until successive component signals are substantially equal.

4. The computer implemented method of analyzing a signal according to claim 3, said recursively performing including testing the component signal against a definition of intrinsic mode functions, and said sifting being recursively performed until three successive component signals satisfy the definition of intrinsic mode functions.

5. The computer implemented method of analyzing a signal according to claim 3, said recursively performing including computing a standard deviation between successive component functions and comparing the standard deviation to a predetermined threshold value, and said sifting being recursively performed until the standard deviation falls below the predetermined threshold value.

6. The computer implemented method of analyzing a signal according to claim 3, said recursive sifting further including:

testing the local maximum values for an intermittency in the signal;

said constructing an upper envelope step treating local maximum values failing said testing step as local minimum values to construct the upper envelope of the signal;

said testing step testing the local minimum values for an intermittency in the signal;

said constructing a lower envelope step treating local minimum values failing said testing step as local maximum values to construct the lower envelope of the signal.

7. The computer implemented method of analyzing a signal according to claim 1, wherein the stopping condition is the residual signal having less than two extrema.

8. The computer implemented method of analyzing a signal according to claim 1, wherein the stopping condition is the residual signal being monotonically increasing or decreasing.

9. The computer implemented method of analyzing a signal according to claim 1, further comprising:

fitting a curve to the filtered signal.

10. The computer implemented method of analyzing a signal according to claim 1, said fitting including a least-squares approximation.

11. The computer implemented method of analyzing a signal according to claim 1, further comprising:

applying a Hilbert transform to the intrinsic mode function to generate a Hilbert spectrum, and displaying the Hilbert spectrum.

12. The computer implemented method of analyzing a signal according to claim 11, further comprising:

calculating a marginal spectrum from the Hilbert spectrum, and displaying the marginal spectrum.

13. The computer implemented method of analyzing a signal according to claim 11, further comprising:

calculating an instantaneous frequency from the transformed intrinsic mode functions, and displaying the instantaneous frequency.

14. The computer implemented method of analyzing a signal according to claim 11, further comprising:

calculating an instantaneous energy density from the transformed intrinsic mode functions, and displaying the instantaneous energy density.

15. The computer implemented method of analyzing a signal according to claim 11, further comprising:

calculating a measure of stationarity from the transformed intrinsic mode functions, and displaying the measure of stationarity.

16. The computer implemented method of analyzing a signal according to claim 1, wherein the signal is a biological signal representative of a biological phenomenon.

17. The computer implemented method of analyzing a signal according to claim 16, the method further comprising:

detecting the biological phenomenon with a sensor to generate an analog signal, and converting the analog signal to a digital signal representative of the biological phenomenon.

18. The computer implemented method of analyzing a signal according to claim 16, wherein the biological phenomenon is a physiological phenomenon.

19. The computer implemented method of analyzing a signal according to claim 18, wherein the physiological phenomenon includes blood pressure, heart rate and heart pulse interval.

20. The computer implemented method of analyzing a signal according to claim 1, further comprising:

processing the intrinsic mode function.

21. The computer implemented method of analyzing a signal according to claim 20, wherein said processing includes displaying the intrinsic mode function.

22. The computer implemented method of analyzing a signal according to claim 20, wherein said processing includes storing the intrinsic mode function.

23. The computer implemented method of analyzing a signal according to claim 20, wherein said processing includes transmitting the intrinsic mode function.

24. An apparatus for analyzing a signal, comprising:

an input device inputting the signal;

a sifter operatively connected to said input device, said sifter recursively performing a Sifting Process on the signal using Empirical Mode Decomposition to extract an intrinsic mode function indicative of an intrinsic oscillatory mode;

a residual signal generator generating a residual signal by subtracting the intrinsic mode function from the signal, wherein the residual signal is treated as the signal during a next iteration of the Sifting Process performed by said sifter;

an iterator iterating the Sifting Process performed by said sifter to generate an n-th intrinsic mode function indicative of an n-th intrinsic oscillatory mode until a stopping condition is met; and a filter constructing a filtered signal from a subset of the intrinsic mode functions.

25. The apparatus according to claim 24, further comprising:

a Hilbert transformer transforming the intrinsic mode function with a Hilbert transform.

26. The apparatus according to claim 24, said sifter including:

a local maximum identifier identifying local maximum values in the signal, an upper envelope constructor constructing an upper envelope of the signal from the identified local maximum values, a local minimum identifier identifying local minimum values in the signal, a lower envelope constructor constructing a lower envelope of the signal from the identified local minimum values, an envelope mean determiner determining an envelope mean from the upper and lower envelopes, a component signal generator generating a component signal by subtracting the envelope mean from the signal, wherein the component signal is treated as the signal during said sifters next recursive Sifting Process, and wherein said sifter recursively performs the Sifting Process until successive component signals are substantially equal.

27. The apparatus according to claim 26, further comprising:

a comparator comparing the component signal against a definition of intrinsic mode functions, said sifter recursively performing the Sifting Process until said comparator determines that three successive component signals satisfy the definition of intrinsic mode functions.

28. The apparatus according to claim 26, further comprising:

a standard deviation calculator calculating a standard deviation between successive component functions, a comparator comparing the standard deviation to a predetermined threshold value, said sifter recursively performing the Sifting Process until the standard deviation exceeds the predetermined threshold value.

29. The apparatus according to claim 26, further comprising:

a tester testing the local maximum values for an intermittency in the signal;

said upper envelope constructor constructing an upper envelope step by treating local maximum values failing said tester as local minimum values to construct the upper envelope of the signal;

said tester testing the local minimum values for an intermittency in the signal;

said lower envelope constructor constructing a lower envelope by treating local minimum values failing said tester as local maximum values to construct the lower envelope of the signal.

30. The apparatus according to claim 24, wherein the stopping condition is the residual signal having less than two extrema.

31. The apparatus according to claim 24, wherein the stopping condition is the residual signal being monotonically increasing or decreasing.

32. The apparatus according to claim 24, further comprising:

a curve fitter for fitting a curve to the filtered signal constructed by said filter.

33. The apparatus according to claim 32, said curve fitter utilizing least-squares approximation.

34. The apparatus according to claim 26, further comprising:

a Hilbert Spectrum generator applying a Hilbert transform to the intrinsic mode function to generate a Hilbert spectrum.

35. The apparatus according to claim 34, further comprising:

a marginal spectrum calculator calculating a marginal spectrum from the Hilbert spectrum, and a display device for displaying the marginal spectrum.

36. The apparatus according to claim 34, further comprising:

an instantaneous frequency calculator calculating an instantaneous frequency from transformed intrinsic mode functions, and a display device for displaying the instantaneous frequency.

37. The apparatus according to claim 34, further comprising:

an instantaneous energy density calculator calculating an instantaneous energy density from the transformed intrinsic mode functions, and a display device for displaying the instantaneous energy density.

38. The apparatus according to claim 34, further comprising:

a stationarity calculator calculating a measure of stationarity from the transformed intrinsic mode functions, and a display device for displaying the measure of stationarity.

39. The apparatus according to claim 24, wherein the signal is a biological signal representative of a biological phenomenon.

40. The apparatus according to claim 39, further comprising:

a sensor for detecting the biological phenomenon to generate an analog signal, and an A/D converter converting the analog signal to a digital signal representative of the biological phenomenon.

41. The apparatus according to claim 39, wherein the biological phenomenon is a physiological phenomenon.

42. The apparatus according to claim 41, wherein the physiological phenomenon includes blood pressure, heart rate and heart pulse interval.

43. The apparatus according to claim 24, further comprising:

a processor operatively connected to said sifter, said processor processing the intrinsic mode function.

44. The apparatus according to claim 43, wherein said processor is a display device processing the intrinsic mode function for display thereon.

45. The apparatus according to claim 43, wherein said processor includes a storage device for storing the intrinsic mode function.

46. The apparatus according to claim 43, wherein said processor includes a transmitter transmitting the intrinsic mode function.

47. An article of manufacture, comprising:

a computer-usable medium including computer-readable program code means, embodied therein, for causing a computer to analyze a signal, the computer-readable program code means comprising:

computer-readable program code means for inputting the signal;

computer-readable program code means for recursively sifting the signal via Empirical Mode Decomposition to extract an intrinsic mode function;

computer-readable program code means for processing the intrinsic mode function;

computer-readable program code means for generating a residual signal by subtracting the intrinsic mode function from the signal;

computer-readable program code means for treating the residual signal as the signal during a next iteration of the operations performed by said recursive sifting means;

computer-readable program code means for iterating said recursive sifting means to generate an n-th intrinsic mode function indicative of an n-th intrinsic oscillatory mode until a stopping condition is met; and computer-readable program code means for constructing a filtered signal from a subset of the intrinsic mode functions.

48. The article of manufacture according to claim 47, further comprising:

computer-readable program code means for transforming the intrinsic mode function with a Hilbert transform.

49. The article of manufacture according to claim 47, said recursive sifting means including:

computer-readable program code means for identifying local maximum values in the signal, computer-readable program code means for constructing an upper envelope of the signal from the identified local maximum values, computer-readable program code means for identifying local minimum values in the signal, computer-readable program code means for constructing a lower envelope of the signal from the identified local minimum values, computer-readable program code means for determining an envelope mean from the upper and lower envelopes, computer-readable program code means for generating a component signal by subtracting the envelope mean from the signal, computer-readable program code means for treating the component signal as the signal, and computer-readable program code means for recursively operating said sifting means until successive component signals are substantially equal.

50. The article of manufacture according to claim 49, said recursively operating means including:

computer-readable program code means for testing the component signal against a definition of intrinsic mode functions, and wherein the operations performed by said sifting means are recursively performed until three successive component signals satisfy the definition of intrinsic mode functions.

51. The article of manufacture according to claim 49, said recursively operating means including:

computer-readable program code means for computing a standard deviation between successive component functions and comparing the standard deviation to a predetermined threshold value, and wherein the operations performed by said sifting means are recursively performed until the standard deviation falls below the predetermined threshold value.

52. The article of manufacture according to claim 49, said recursive sifting means further including:

computer-readable program code means for testing the local maximum values for an intermittency in the signal;

said constructing an upper envelope means treating local maximum values failing said testing step as local minimum values to construct the upper envelope of the signal;

said testing means testing the local minimum values for an intermittency in the signal;

said constructing a lower envelope means treating local minimum values failing said testing step as local maximum values to construct the lower envelope of the signal.

53. The article of manufacture according to claim 47, wherein the stopping condition is the residual signal having less than two extrema.

54. The article of manufacture according to claim 47 wherein the stopping condition is the residual signal being monotonically increasing or decreasing.

55. The article of manufacture according to claim 47, further comprising:

computer-readable program code means for fitting a curve to the filtered signal.

56. The article of manufacture according to claim 47, said fitting means utilizing a least-squares approximation.

57. The article of manufacture according to claim 47, further comprising:

computer-readable program code means for applying a Hilbert transform to the intrinsic mode function to generate a Hilbert spectrum.

58. The article of manufacture according to claim 57, further comprising:

computer-readable program code means for calculating a marginal spectrum from the Hilbert spectrum, and computer-readable program code means for displaying the marginal spectrum.

59. The article of manufacture according to claim 57, further comprising:

computer-readable program code means for calculating an instantaneous frequency from the transformed intrinsic mode functions, and computer-readable program code means for displaying the instantaneous frequency.

60. The article of manufacture according to claim 57, further comprising:

computer-readable program code means for calculating an instantaneous energy density from the transformed intrinsic mode functions, and computer-readable program code means for displaying the instantaneous energy density.

61. The article of manufacture according to claim 57, further comprising:

computer-readable program code means for calculating a measure of stationarity from the transformed intrinsic mode functions, and computer-readable program code means for displaying the measure of stationarity.

62. The article of manufacture according to claim 47, wherein the signal is a biological signal representative of a biological phenomenon.

63. The article of manufacture according to claim 62, wherein the biological phenomenon is a physiological phenomenon.

64. The article of manufacture according to claim 63, wherein the physiological phenomenon includes blood pressure, heart rate and heart pulse interval.

65. The article of manufacture according to claim 47, further comprising:

computer-readable program code means for processing the intrinsic mode function.

66. The article of manufacture according to claim 65, said processing means including:

computer-readable program code means for displaying the intrinsic mode function.

67. The article of manufacture according to claim 65, said processing means including:

computer-readable program code means for storing the intrinsic mode function.

68. The article of manufacture according to claim 65, said processing means including:

computer-readable program code means for transmitting the intrinsic mode function.

* * * * *